US012711900B2

(12) United States Patent
Zhai

(10) Patent No.: US 12,711,900 B2
(45) Date of Patent: Aug. 18, 2026

(54) PIXEL CIRCUIT, DISPLAY PANEL, AND DISPLAY APPARATUS

(71) Applicant: Tianma Advanced Display Technology Institute (Xiamen) Co., Ltd., Xiamen (CN)

(72) Inventor: Yingteng Zhai, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/757,470

(22) Filed: Jun. 27, 2024

(65) Prior Publication Data

US 2024/0363057 A1 Oct. 31, 2024

(30) Foreign Application Priority Data

Mar. 29, 2024 (CN) ......................... 202410372041.7

(51) Int. Cl.
*G09G 3/32* (2016.01)

(52) U.S. Cl.
CPC ......... *G09G 3/32* (2013.01); *G09G 2310/061* (2013.01); *G09G 2310/08* (2013.01); *G09G 2320/0233* (2013.01); *G09G 2320/0247* (2013.01)

(58) Field of Classification Search
CPC ..... G09G 3/32–3291; G09G 2310/061; G09G 2310/08; G09G 2320/0233; G09G 2320/0247
See application file for complete search history.

(56) References Cited

U.S. PATENT DOCUMENTS

| | | | | |
|---|---|---|---|---|
| 11,508,289 | B2 * | 11/2022 | Xuan | G09G 3/32 |
| 2021/0225264 | A1 * | 7/2021 | Xuan | G09G 3/32 |
| 2022/0101783 | A1 * | 3/2022 | Han | G09G 3/32 |

FOREIGN PATENT DOCUMENTS

| | | | |
|---|---|---|---|
| CN | 114333685 | A | 4/2022 |
| CN | 115798399 | A | 3/2023 |
| CN | 115985228 | A | 4/2023 |

* cited by examiner

*Primary Examiner* — Gene W Lee
(74) *Attorney, Agent, or Firm* — Versch Law Group

(57) ABSTRACT

A pixel circuit, a display panel, and a display apparatus are provided. The pixel circuit includes a first driving circuit, a second driving circuit, and a first capacitor. The first capacitor includes a first plate electrically connected to an output terminal of the first driving circuit and a second plate electrically connected to the second driving circuit. The first driving circuit is configured to generate a control current based on a first data signal, and the second driving circuit is configured to generate a driving current based on a second data signal and control a flowing period of the driving current based on the control current. A light-emitting element is electrically connected to the second driving circuit to receive the driving current.

10 Claims, 25 Drawing Sheets

PIXEL CIRCUIT, DISPLAY PANEL, AND DISPLAY APPARATUS

CROSS-REFERENCE TO RELATED APPLICATIONS

The present application claims priority to Chinese Patent Application No. 202410372041.7, filed on Mar. 29, 2024, the content of which is incorporated herein by reference in its entirety.

TECHNICAL FIELD

The present disclosure relates to the field of display technologies, and in particular, to a pixel circuit, a display panel, and a display apparatus.

BACKGROUND

A pixel circuit is disposed in a display panel to drive a light-emitting element to emit light. To more accurately adjust a grayscale of the light-emitting element, the related art proposes a pixel circuit including a pulse width modulation (PWM) circuit and a pulse amplitude modulation (PAM) circuit. However, the pixel circuit provided in the related art still has some performance problems, which may affect the display effect in applications.

SUMMARY

In a first aspect, embodiments of the present disclosure provide a pixel circuit. The pixel circuit includes a first driving circuit, a second driving circuit, and a first capacitor. The first capacitor includes a first plate electrically connected to an output terminal of the first driving circuit and a second plate electrically connected to the second driving circuit. The first driving circuit is configured to generate a control current based on a first data signal, and the second driving circuit is configured to generate a driving current based on a second data signal and control a flowing period of the driving current based on the control current. A light-emitting element is electrically connected to the second driving circuit to receive the driving current.

In a second aspect, embodiments of the present disclosure provide a display panel, and the display panel includes a pixel circuit. The pixel circuit includes a first driving circuit, a second driving circuit, and a first capacitor. The first capacitor includes a first plate electrically connected to an output terminal of the first driving circuit and a second plate electrically connected to the second driving circuit. The first driving circuit is configured to generate a control current based on a first data signal, and the second driving circuit is configured to generate a driving current based on a second data signal and control a flowing period of the driving current based on the control current. A light-emitting element is electrically connected to the second driving circuit to receive the driving current.

In a third aspect, embodiments of the present disclosure provide a display apparatus, and the display apparatus includes a display panel. The display panel includes a pixel circuit. The pixel circuit includes a first driving circuit, a second driving circuit, and a first capacitor. The first capacitor includes a first plate electrically connected to an output terminal of the first driving circuit and a second plate electrically connected to the second driving circuit. The first driving circuit is configured to generate a control current based on a first data signal, and the second driving circuit is configured to generate a driving current based on a second data signal and control a flowing period of the driving current based on the control current. A light-emitting element is electrically connected to the second driving circuit to receive the driving current.

BRIEF DESCRIPTION OF DRAWINGS

In order to more clearly explain the embodiments of the present disclosure or the technical solution in the related art, the drawings to be used in the description of the embodiments or the related art will be briefly described below. The drawings in the following description are some embodiments of the present disclosure. For those skilled in the art, other drawings may also be obtained based on these drawings.

DESCRIPTION OF EMBODIMENTS

In order to more clearly illustrate objectives, technical solutions, and advantages of the embodiments of the present disclosure, the technical solutions in the embodiments of the present disclosure are clearly and completely described in details with reference to the accompanying drawings. The described embodiments are merely part of the embodiments of the present disclosure rather than all of the embodiments. All other embodiments obtained by those skilled in the art based on the embodiments of the present disclosure without paying creative labor shall fall into the protection scope of the present disclosure.

Figure 1:
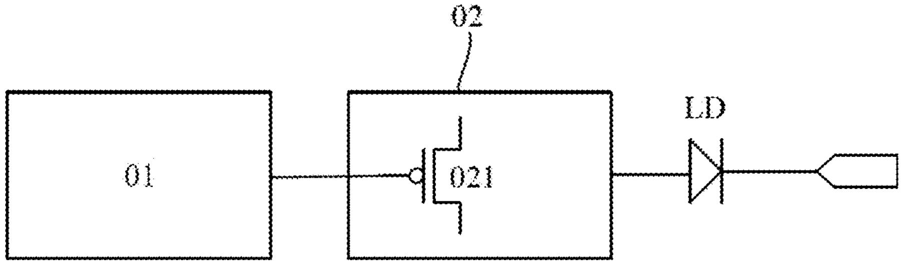
FIG. 1 is a schematic diagram of a pixel circuit in the related art.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise. FIG. 1 is a schematic diagram of a pixel circuit in the related art. As shown in FIG. 1, the pixel circuit includes a PWM circuit 01 and a PAM circuit 02. The PWM circuit 01 is configured to control, based on a pulse width modulation data voltage, a pulse width of a driving current provided for a light-emitting element LD, and the PAM circuit 02 is configured to control, based on a pulse amplitude modulation data voltage, an amplitude of the driving current provided for the light-emitting element LD. The pulse width of the driving current is understood as duration of the driving current, and the amplitude of the driving current is understood as a current value of the driving current. In the related art, an output terminal of the PWM circuit 01 is connected to a gate of a transistor 021 in the PAM circuit 02. An output signal of the PWM circuit 01 is directly written into the gate of the transistor 021 to control a potential change of the gate of the transistor 021, and then the transistor 021 is turned off to implement modulation on the pulse width of the driving current. In this manner, a voltage value of the gate of the transistor 021 is directly correlated to a voltage value of the output signal of the PWM circuit 01, and consequently the pixel circuit still has some performance problems, which may affect the display effect in applications. In addition, the voltage value of the output signal of the PWM circuit 01 needs to have a certain magnitude relationship with a source voltage of the transistor 021, so that the transistor 021 can be controlled to be turned off.

Figure 2:
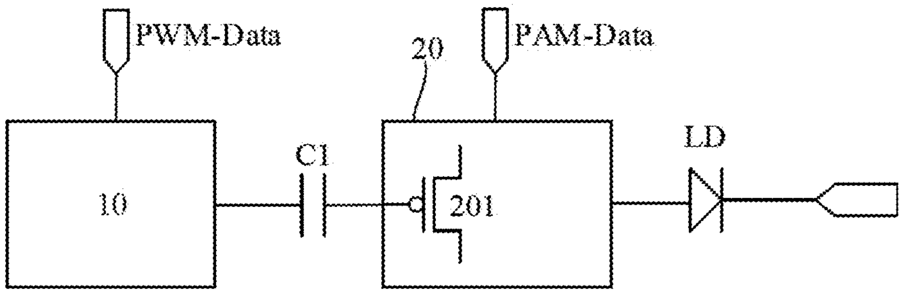
FIG. 2 is a schematic diagram of a pixel circuit according to an embodiment of the present disclosure.

FIG. 2 is a schematic diagram of a pixel circuit according to an embodiment of the present disclosure. As shown in FIG. 2, the pixel circuit includes a first driving circuit 10, a second driving circuit 20, and a first capacitor C1. The first driving circuit 10 is a pulse width modulation (PWM) circuit, and the second driving circuit 20 is a pulse amplitude modulation (PAM) circuit. The pixel circuit generates a driving current under control of the PAM circuit 20 and the PWM circuit 10. The PAM circuit 20 may be configured to control an amplitude of the driving current, and the PWM circuit 10 may be configured to adjust a pulse width of a voltage applied to a first electrode of a light-emitting element LD. The PWM circuit 10 adjusts the pulse width of the voltage applied to the first electrode of the light-emitting element LD, that is, the PWM circuit 10 adjusts an actual emission period in which a driving current is applied to the light-emitting element LD. In addition, the driving current applied to the light-emitting element LD may be kept at a constant level to adjust a grayscale or brightness displayed on the light-emitting element LD, instead of adjusting a magnitude of the driving current applied to the light-emitting element LD to adjust the grayscale or brightness displayed on the light-emitting element. Therefore, the PAM circuit 20 may provide the driving current for the light-emitting element so that the light-emitting element is driven with optimal light-emitting efficiency, and the PWM circuit 10 adjusts a light-emitting duty ratio of the light-emitting element (that is, an emission period of the light-emitting element), to adjust the grayscale or brightness displayed on the light-emitting element. The first capacitor C1 includes a first plate electrically connected to an output terminal of the first driving circuit 10 and a second plate electrically connected to the second driving circuit 20. FIG. 2 is a schematic diagram of a controlled transistor 201 in the second driving circuit 20. The second plate of the first capacitor C1 is connected to a gate of the controlled transistor 201. The controlled transistor 201 may be a driving transistor that generates a driving current in the second driving circuit 20, or may be a transistor that is connected in series with the driving transistor in the second driving circuit 20.

The first driving circuit 10 is configured to generate a control current based on a first data signal PWM-Data, and the second driving circuit 20 is configured to generate a driving current based on a second data signal PAM-Data and control a flowing period of the driving current based on the control current. The flowing period is also a pulse width of the driving current, and may also be referred to as duration for providing the driving current. The light-emitting element LD is electrically connected to the second driving circuit 20 to receive the driving current. The light-emitting element LD may be a light-emitting diode (LED) such as a mini LED, a micro LED, or the like.

In some embodiments of the present disclosure, the output terminal of the first driving circuit 10 is connected to the second driving circuit 20 through the first capacitor C1. If the control current provided by the output terminal of the first driving circuit 10 enables a voltage of the first plate of the first capacitor C1 to change by ΔV, a voltage of the second plate of the first capacitor C1 also changes by ΔV accordingly. A gate voltage of the controlled transistor 201 in the second driving circuit 20 changes by ΔV through a coupling action of the first capacitor C1, so that the controlled transistor 201 is turned off, and the second driving circuit 20 stops providing the driving current for the light-emitting element LD, thereby controlling the flowing period of the driving current. There is no direct correlation between the gate voltage of the controlled transistor 201 in the second driving circuit 20 and the control current provided by the first driving circuit 10, so that the controlled transistor 201 can be controlled more accurately to be turned off, thereby improving the performance stability of the pixel circuit. In addition, a magnitude relationship does not necessarily exist between a voltage value of a signal at the output terminal of the first driving circuit 10 and a source voltage of the controlled transistor 201, thereby reducing a correlation between signals required for operating of the first driving circuit 10 and operating of the second driving circuit 20.

In addition, when the transistor 021 in FIG. 1 is a driving transistor in the PAM circuit 02, the output signal of the PWM circuit 01 is directly provided for a gate of the driving transistor in the PAM circuit 02 to control the driving transistor to be turned off. When the output signal of the PWM circuit 01 is written into the gate of the driving transistor, partial damage is caused to threshold compensation information of the gate. In application, driving characteristics of pixel circuits at different positions on a display panel are different, thereby affecting the display effect. Especially, when display is performed at a low grayscale, a threshold difference between first driving transistors M7 at different positions on the display panel is presented in display, resulting in the problem of display uniformity.

In some embodiments of the present disclosure, when the first driving circuit 10 controls the driving transistor in the second driving circuit 20 through the first capacitor C1, an output signal of the first driving circuit 10 enables a potential of the first plate of the first capacitor C1 to change by ΔV. Because of a coupling action of the first capacitor C1, a potential of a gate of the driving transistor in the second driving circuit 20 jumps from $V_{PAM\text{-}Data}-|Vth|$ to $V_{PAM\text{-}Data}-|Vth|+\Delta V$. $V_{PAM\text{-}Data}$ is a data voltage written into the second driving circuit 20, and Vth is a threshold voltage of the driving transistor. When the output signal of the first driving circuit 10 controls the driving transistor in the second driving circuit 20 to be turned off, threshold compensation information in the gate of the driving transistor is protected. In application, the display effect at the low grayscale can be improved, and the problem of display heterogeneity caused by a threshold voltage difference between driving transistors in different second driving circuits 20 is eliminated.

Figure 3:
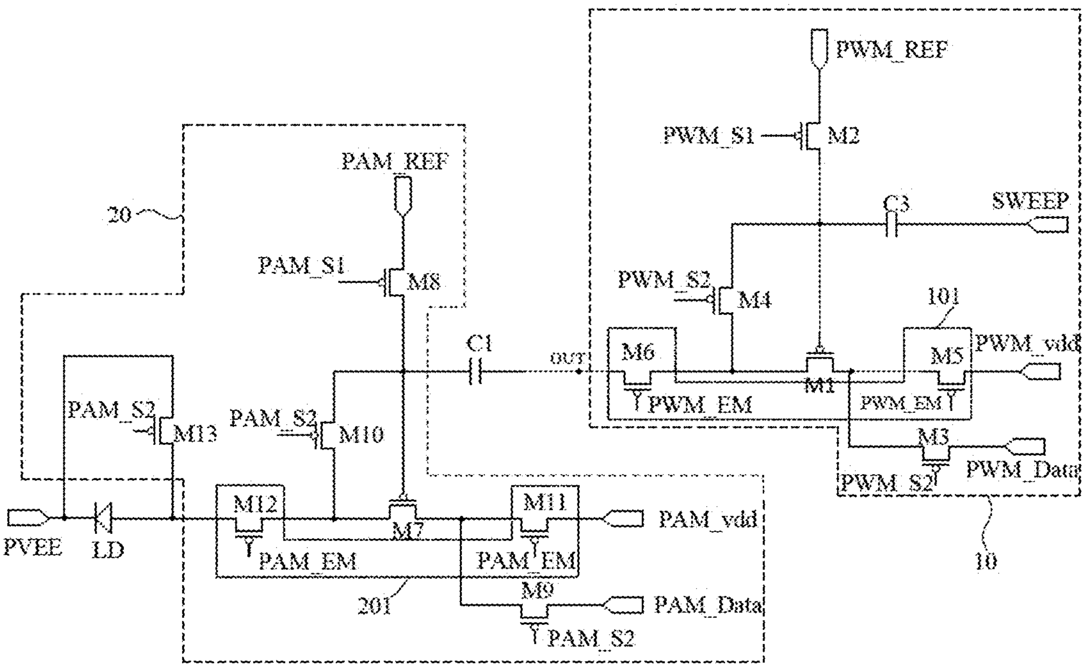
FIG. 3 is a schematic diagram of a pixel circuit according to another embodiment of the present disclosure.
Figure 4:
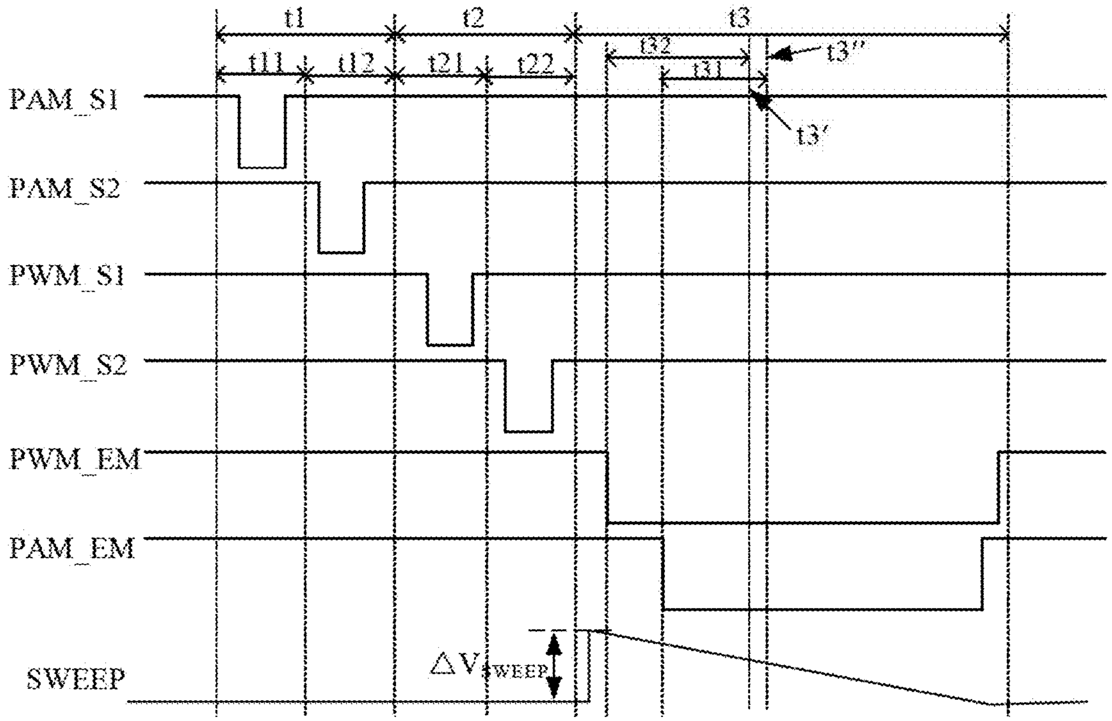
FIG. 4 is a signal timing diagram according to an embodiment of the present disclosure.

FIG. 3 is a schematic diagram of a pixel circuit according to another embodiment of the present disclosure. FIG. 4 is a signal timing diagram according to an embodiment of the present disclosure. In some embodiments of the present disclosure, signal timing provided in FIG. 4 can be used to drive the pixel circuit in the embodiment of FIG. 3.

As shown in FIG. 3, the first driving circuit 10 includes a second driving transistor M1, a first gate reset transistor M2, a first data writing transistor M3, a first compensation transistor M4, a first control transistor M6, a third control transistor M5, and a third capacitor C3. The third capacitor C3 is a storage capacitor in the first driving circuit 10, and may also be referred to as a first storage capacitor in the pixel circuit. The third control transistor M5 is connected between a second power voltage line PWM-vdd and a first electrode of the second driving transistor M1, and the first control transistor M6 is connected between a second electrode of the second driving transistor M1 and the output terminal OUT of the first driving circuit 10. The first data writing transistor M3 is connected to the first electrode of the second driving transistor M1, the first compensation transistor M4 is connected to the second electrode and a gate of the second driving transistor M1, and the first gate reset transistor M2 is connected to the gate of the second driving transistor M1. The third capacitor C3 includes a first plate connected to the gate of the second driving transistor M1 and a second plate connected to a sweep signal terminal SWEEP. A gate of the first gate reset transistor M2 receives a third scan signal PWM-S1, gates of the first data writing transistor M3 and the first compensation transistor M4 receives a fourth scan signal PWM-S2, and gates of the first control transistor M6 and the third control transistor M5 receive a first light-emitting control signal PWM-EM. The first control transistor M6 and the third control transistor M5 constitute a first light-emitting control module 101 in the first driving circuit 10.

In some embodiments of the present disclosure, the first driving circuit 10 includes a second driving transistor M1, a first gate reset transistor M2, a first data writing transistor M3, a first control transistor M6, a third control transistor M5, and a third capacitor C3. The third control transistor M5 is connected between a second power voltage line PWM-vdd and a first electrode of the second driving transistor M1, and the first control transistor M6 is connected between a second electrode of the second driving transistor M1 and the output terminal OUT of the first driving circuit 10. The first data writing transistor M3 is connected to the first electrode of the second driving transistor M1, and the first gate reset transistor M2 is connected to a gate of the second driving transistor M1. The third capacitor C3 includes a first plate connected to the gate of the second driving transistor M1 and a second plate connected to a sweep signal terminal SWEEP. A gate of the first gate reset transistor M2 receives a third scan signal PWM-S1, gates of the first data writing transistor M3 and the first compensation transistor M4 receive a fourth scan signal PWM-S2, and gates of the first control transistor M6 and the third control transistor M5 receive a first light-emitting control signal PWM-EM. Compared with the foregoing embodiments, the first compensation transistor M6 may not be disposed in the first driving circuit 10.

The second driving circuit 20 includes a first driving transistor M7, a second gate reset transistor M8, a second data writing transistor M9, a second compensation transistor M10, a second control transistor M11, a fourth control transistor M12, and an electrode reset transistor M13. The second control transistor M11 is connected between a first power voltage line PAM-vdd and a first electrode of the first driving transistor M7, and the fourth control transistor M12 is connected between a second electrode of the first driving transistor M7 and the light-emitting element LD. The first driving transistor M7 is configured to generate a driving current under control of a gate voltage of the first driving transistor M7. The second data writing transistor M9 is connected to the first electrode of the first driving transistor M7, the second compensation transistor M10 is connected to the second electrode and a gate of the first driving transistor M7, the second gate reset transistor M8 is connected to the gate of the first driving transistor M7, the electrode reset transistor M13 is connected to a first electrode of the light-emitting element LD, the fourth control transistor M12 is also connected to the first electrode of the light-emitting element LD, and a second electrode of the light-emitting element LD is connected to a third power voltage line PVEE. A gate of the second gate reset transistor M8 receives a first scan signal PAM-S1, gates of the second data writing transistor M9, the second compensation transistor M10, and the electrode reset transistor M13 receive a second scan signal PAM-S2, and gates of the second control transistor M11 and the fourth control transistor M12 receive a second light-emitting control signal PAM-EM. The second control transistor M11 and the fourth control transistor M12 constitute a second light-emitting control module 201 in the second driving circuit 20.

In some embodiments of the present disclosure, the second driving circuit 20 includes a first driving transistor M7, a second gate reset transistor M8, a second data writing transistor M9, a second control transistor M11, a fourth control transistor M12, and an electrode reset transistor M13. Compared with the foregoing embodiments, the second compensation transistor M6 may not be disposed in the second driving circuit 20.

FIG. 3 shows that a first electrode of the electrode reset transistor M13 is connected to the third power voltage line PVEE. In some embodiments of the present disclosure, a first electrode of the electrode reset transistor M13 receives a second reset signal PAM-REF, that is, the first electrode of the electrode reset transistor M13 and a first electrode of the second gate reset transistor M8 receive the same signal. In some embodiments of the present disclosure, a first electrode of the electrode reset transistor M13 is not connected to the third power voltage line PVEE, and the first electrode of the electrode reset transistor M13 and a first electrode of the second gate reset transistor M8 receive different signals. No drawing is shown again herein.

FIG. 3 illustrates that the first capacitor C1 includes the first plate connected to the first control transistor M6 in the first driving circuit 10 and the second plate connected to the gate of the first driving transistor M7 in the second driving circuit 20.

As shown in FIG. 3, each transistor in the pixel circuit is a p-type transistor. A gate of the transistor receives a low-level signal as an enable signal, and the enable signal can control the transistor to be turned on. Referring to FIG. 4, operating of the pixel circuit includes a first input stage t1, a second input stage t2, and a light-emitting stage t3.

In the first input stage t1, the second driving circuit 20 sequentially executes a gate reset stage t11 and a data writing stage t12. In the gate reset stage t11, the first scan signal PAM-S1 is at an enable level to control the second gate reset transistor M8 to be turned on, to write the second reset signal PAM-REF into the gate of the first driving transistor M7, and reset the gate of the first driving transistor M7. In the data writing stage t12, the second scan signal PAM-S2 is at an enable level to control the second data writing transistor M9 and the second compensation transistor M10 to be turned on to write the second data signal PAM-Data into the gate of the first driving transistor M7 and perform threshold compensation. In this stage, the electrode reset transistor M13 is turned on to reset an electrode of the light-emitting element LD.

In the second input stage t2, the first driving circuit 10 sequentially executes a gate reset stage t21 and a data writing stage t22. In the gate reset stage t21, the third scan signal PWM-S1 is at an enable level to control the first gate reset transistor M2 to be turned on, to write a third reset signal PWM-REF into the gate of the second driving transistor M1, and reset the gate of the second driving transistor M1. In the data writing stage t22, the fourth scan signal PWM-S2 is at an enable level to control the first data writing transistor M3 and the first compensation transistor M4 to be turned on to write the first data signal PWM-Data into the gate of the second driving transistor M1 and perform threshold compensation.

The light-emitting stage t3 is not an effective light-emitting stage of the light-emitting element LD, and the light-emitting stage includes an effective light-emitting period of the light-emitting element LD and a partial non-light-emitting period of the light-emitting element LD. The light-emitting stage t3 may be understood as a stage in which the second light-emitting control signal PAM-EM and the first light-emitting control signal PWM-EM are enable levels. In the light-emitting stage t3, the second light-emitting control signal PAM-EM controls the second control transistor M11 and the fourth control transistor M12 to be turned on, and the first driving transistor M7 generates the driving current under control of the gate voltage of the first driving transistor M7, so that the second driving circuit 20 provides the driving current for the light-emitting element LD. The first light-emitting control signal PWM-EM controls the first control transistor M6 and the third control transistor M5 to be turned on, and at the same time, a voltage value of a sweep signal SWEEP (using the same mark as the sweep signal terminal SWEEP) gradually changes, and a gate voltage of the second driving transistor M1 changes due to a coupling action of the third capacitor C3. When the gate voltage of the second driving transistor M1 is equal to (or smaller than) a difference between a source voltage of the second driving transistor M1 and an absolute value of a threshold voltage, the second driving transistor M1 is turned on, and the potential of the first plate of the first capacitor C1 is gradually raised. Finally, the second driving transistor M1 is turned on to supply a second power voltage PWM-vdd (using the same mark as the second power voltage line) to the first plate of the first capacitor C1 through the first control transistor M6, so that the voltage of the first plate of the first capacitor C1 changes. There is a process of charge accumulation in the voltage change on the first plate, which is equivalent to providing a control current for the first plate of the first capacitor C1. Further, the gate voltage of the first driving transistor M7 changes through a coupling action of the first capacitor C1, so that the first driving transistor M7 is turned off, thereby stopping providing the driving current for the light-emitting element LD. In the light-emitting stage t3, the control current is generated based on control of a first data voltage PWM-Vdata and the sweep signal SWEEP in the first driving circuit 10, so as to control a time for which the second driving circuit 20 provides the driving current, and adjust effective light-emitting duration of the light-emitting element LD, thereby controlling light-emitting brightness and grayscale of the light-emitting element LD.

To simplify a marking manner, in some embodiments of the present disclosure, a signal line and a signal provided by the signal line use a same mark, and a signal terminal and a signal provided by the signal terminal also use a same mark.

If the mark SWEEP is used for both the sweep signal and the sweep signal terminal, the mark PWM-vdd is used for both the second power voltage line and the second power voltage. In some embodiments of the present disclosure, the third control transistor M5 in the pixel circuit is connected to the second power voltage line PWM-vdd, or in other words, a first electrode of the third control transistor M5 receives a second power voltage signal PWM-vdd. Marking problems in the following embodiments are not enumerated herein, and reference may be made to the description herein.

In a related technology, the output terminal of the first driving circuit 10 is directly connected to the gate of the first driving transistor M7 in the second driving circuit 20, and a signal output by the output terminal of the first driving circuit 10 is directly written into the gate of the first driving transistor M7. For example, after data writing and threshold compensation, a gate voltage of the first driving transistor M7 is $V_{PAM\text{-}Data}-|Vth|$, where $V_{PAM\text{-}Data}$ represents a voltage value of the second data signal PAM-Data, and Vth represents a threshold voltage of the first driving transistor M7. When the second driving transistor M1 in the first driving circuit 10 is turned on, the potential of the first plate of the first capacitor C1 is gradually raised. Finally, the first driving circuit 10 writes the second power voltage PWM-vdd into the gate of the first driving transistor M7 to change the gate voltage. In this case, threshold compensation information |Vth| in the gate voltage of the first driving transistor M7 is covered by the second power voltage PWM-vdd. In application to a display panel, characteristics of first driving transistors M7 at different positions are different due to process limitations during production, and when the threshold compensation information of the first driving transistor M7 is covered, driving characteristics of pixel circuits at different positions on a display panel are different, thereby affecting the display effect. Especially, when display is performed at a low grayscale, a threshold difference between first driving transistors M7 at different positions on the display panel is presented in display, resulting in the problem of display uniformity.

In some embodiments of the present disclosure, the first driving circuit 10 is connected to the first driving transistor M7 in the second driving circuit 20 through the first capacitor C1. The control current provided by the first driving circuit 10 enables the gate voltage of the first driving transistor M7 to change through a coupling action of the first capacitor C1, to control the first driving transistor M7 to be turned off, thereby controlling the flowing period of the driving current. When a voltage on the first plate of the first capacitor C1 changes by ΔV, the gate voltage of the first driving transistor M7 also changes by ΔV. For the first driving transistor M7, after the first input stage t1, the gate voltage of the first driving transistor M7 is $V_{PAM\text{-}Data}-|Vth|$. In the light-emitting stage t3, because the gate voltage of the first driving transistor M7 changes to $V_{PAM\text{-}Data}-|Vth|+\Delta V$ due to the coupling action of the first capacitor C1, the threshold compensation information is reserved in the gate voltage of the first driving transistor M7. The display effect can be improved when it is applied in the display panel, and especially, the display effect of display at a low grayscale can be improved.

In some embodiments of the present disclosure, a magnitude relationship does not necessarily exist between a voltage value of a signal at the output terminal of the first driving circuit 10 and a source voltage of the first driving transistor M7, and therefore there may be no magnitude relationship between the second power voltage PWM-vdd and a first power voltage PAM-vdd. In this case, original voltages supplied to the first power voltage line PAM-vdd and the second power voltage line PWM-vdd may be the same. In this way, a quantity of pins disposed in the display panel can be reduced, thereby improving the uniformity of power voltage signals in the display panel. In some embodiments of the present disclosure, when the problem of pin quantity is not considered, original voltages supplied to the first power voltage line PAM-vdd and the second power voltage line PWM-vdd may be different.

Figure 5:
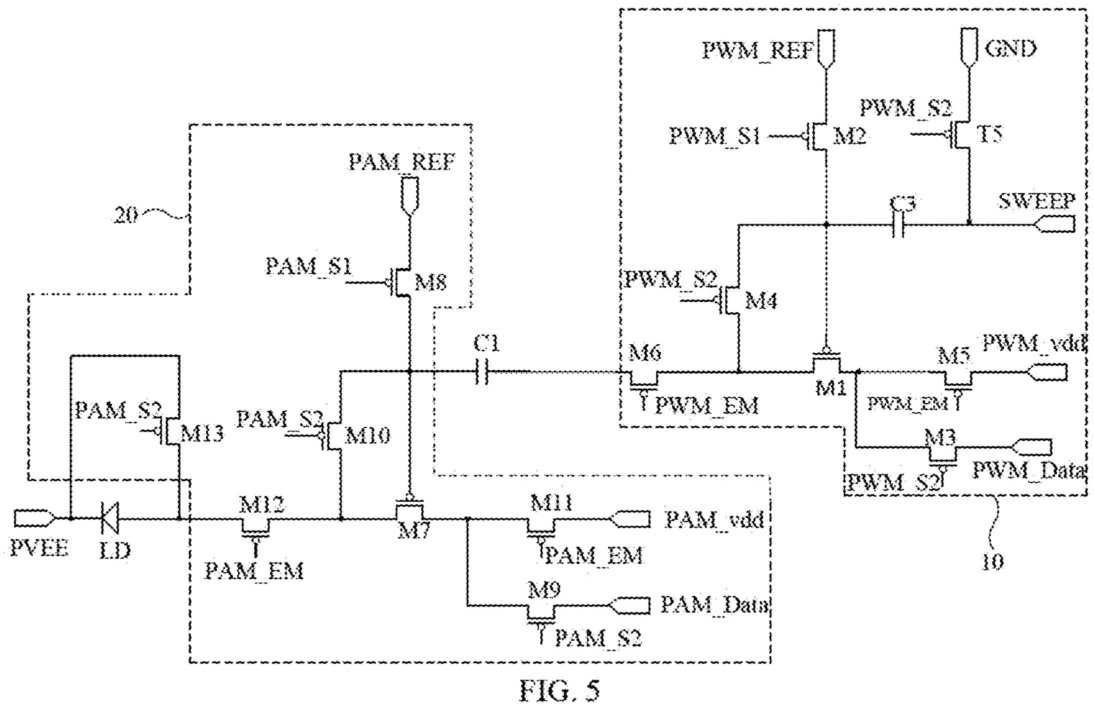
FIG. 5 is a schematic diagram of a pixel circuit according to another embodiment of the present disclosure.

FIG. 5 is a schematic diagram of a pixel circuit according to another embodiment of the present disclosure. As shown in FIG. 5, the first driving circuit 10 further includes a fifth transistor T5 based on the structure shown in FIG. 3. A first electrode of the fifth transistor T5 is grounded (connected to GND), and a second electrode of the fifth transistor T5 is connected to the second plate of the third capacitor C3. A gate of the fifth transistor T5 receives the fourth scan signal PWM-S2. Referring to FIG. 4, in a data writing stage in which the first driving circuit 10 operates, the fourth scan signal PWM-S2 provides an enable signal to control the fifth transistor T5 to be turned on.

In some embodiments of FIG. 3 and FIG. 5, the transistors are all p-type transistors. In some embodiments of the present disclosure, the transistors in the pixel circuit are all n-type transistors. No drawing is shown again herein.

In some embodiments of the present disclosure, at least one of the first gate reset transistor M2 and the first compensation transistor M4 is an n-type transistor, at least one of the second gate reset transistor M8 and the second compensation transistor M10 is an n-type transistor, and the other transistor is a p-type transistor. No drawing is shown again herein. It can be understood that when the first compensation transistor M4 is an n-type transistor and the first data writing transistor M3 is a p-type transistor, the two are controlled by different control signals. When the second compensation transistor M10 is an n-type transistor and the second data writing transistor M9 is a p-type transistor, the second compensation transistor M10 and the second data writing transistor M9 are controlled by different control signals.

In some embodiments of the present disclosure, an active layer of a transistor in the pixel circuit may be formed of any one of polysilicon, amorphous silicon, and an oxide semiconductor. When the active layer in the transistor is formed of polysilicon, the active layer may be formed by a low temperature polysilicon (LTPS) process. A transistor whose active layer is an oxide semiconductor is an oxide transistor, and in comparison with a silicon transistor, the oxide transistor has a lower leakage current. Setting active layers of some transistors to be oxide semiconductors can effectively reduce flickering of the display panel. Optionally, at least one of the first gate reset transistor M2 and the first compensation transistor M4 is an oxide transistor, and at least one of the second gate reset transistor M8 and the second compensation transistor M10 is an oxide transistor.

In some embodiments of the present disclosure, the first light-emitting control signal PWM-EM and the second light-emitting control signal PAM-EM may be a same signal. In this case, the first light-emitting control module 101 in the first driving circuit 10 and the second light-emitting control module 201 in the second driving circuit 20 in the pixel circuit are turned on at the same time.

In some embodiments of the present disclosure, the first light-emitting control signal PWM-EM and the second light-emitting control signal PAM-EM are different signals, and start moments and/or end moments of enable levels of the two may be set to be different. As shown in FIG. 4, a start moment at which the first light-emitting control signal PWM-EM is an enable signal is earlier than a start moment at which the second light-emitting control signal PAM-EM is an enable signal, and an end moment of the enable signal of the first light-emitting control signal PWM-EM is later than an end moment of the enable signal of the second light-emitting control signal PAM-EM. The start moment of the enable signal of the first light-emitting control signal PWM-EM is set to be earlier than the start moment of the enable signal of the second light-emitting control signal PAM-EM, so that the first driving circuit 10 is less likely to delay the provision of the control current for the second driving circuit 20, thus avoiding the phenomenon that the light-emitting element LD is secretly bright in a dark display state.

Figure 6:
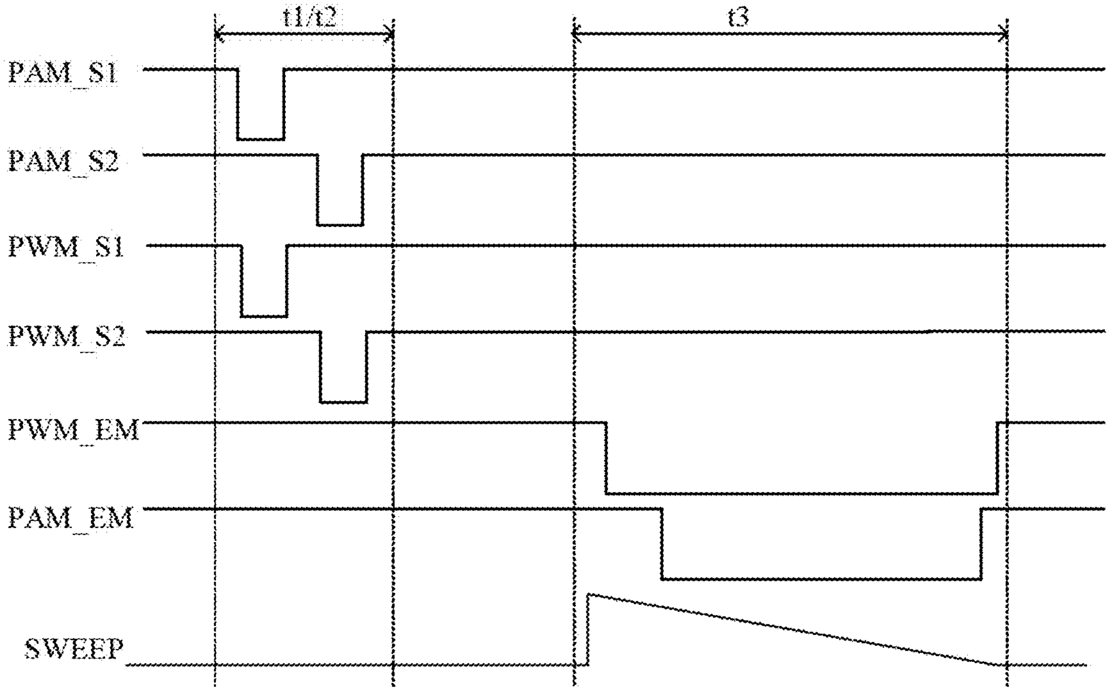
FIG. 6 is a signal timing diagram according to another embodiment of the present disclosure.

The present disclosure further provides another timing diagram, so that the pixel circuit provided in the embodiment of FIG. 3 can be driven. FIG. 6 is a signal timing diagram according to another embodiment of the present disclosure. As shown in FIG. 6, operating of the pixel circuit includes a first input stage t1, a second input stage t2, and a light-emitting stage t3. The first input stage t1 corresponding to the second driving circuit 20 at least partially overlaps the second input stage t2 corresponding to the first driving circuit 10.

In some embodiments of the present disclosure, as shown in FIG. 4, in at least a period in which the fourth scan signal PWM-S2 in the second input stage t2 provides an enable signal, a sweep signal SWEEP is at a low level. After the enabling signal period of the fourth scan signal PWM-S2 ends, the sweep signal SWEEP jumps from a low level to a high level, and a voltage value variation is $\Delta V_{SWEEP}$. Then in the light-emitting stage t3, the sweep signal SWEEP gradually changes from a high level to a low level. Because a sweep signal line SWEEP is connected to the gate of the second driving transistor M1 through the third capacitor C3, when the sweep signal SWEEP jumps from a low level to a high level, the gate voltage of the second driving transistor M1 is raised, and after the gate of the second driving transistor M1 writes the first data signal PWM-Data and performs threshold compensation, the voltage increases by $\Delta V_{SWEEP}$. If a target gate voltage of the second driving transistor M1 is fixed, the sweep signal SWEEP may reduce a voltage value of the first data signal PWM-Data through the timing illustrated in FIG. 4. Correspondingly, a setting amplitude of the voltage value of the first data signal PWM-Data may be relatively large. When the voltage value of the first data signal PWM-Data is fixed, the gate voltage of the second driving transistor M1 is raised due to the signal jumping of the sweep signal SWEEP after data writing, and when a level of the sweep signal SWEEP gradually changes to a fixed rate, a longer time is required to enable the gate of the second driving transistor M1 to decrease to meet a turn-on condition. In other words, in the light-emitting stage t3, a turn-off time of the second driving transistor M1 becomes longer, and correspondingly, duration in which the second driving circuit 20 provides the driving current becomes longer. In some embodiments of the present disclosure, a waveform design of the sweep signal SWEEP can improve a freedom of regulating the flowing period of the driving current.

Figure 7:
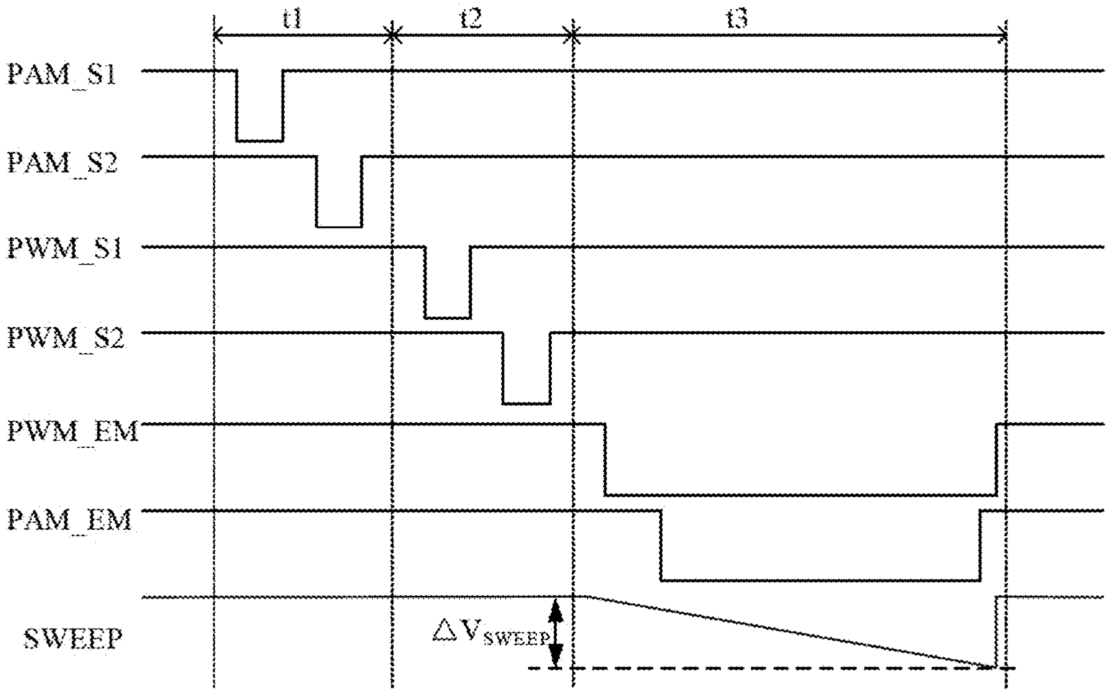
FIG. 7 is a signal timing diagram according to another embodiment of the present disclosure.

FIG. 7 is a signal timing diagram according to another embodiment of the present disclosure. In some embodiments of the present disclosure, as shown in FIG. 7, in the second input stage t2 and an initial period of the light-emitting stage t3, the sweep signal SWEEP is at a high level, and in the light-emitting stage t3, the sweep signal SWEEP gradually changes from a high level to a low level, and a voltage value variation is $\Delta V_{SWEEP}$.

Figure 8:
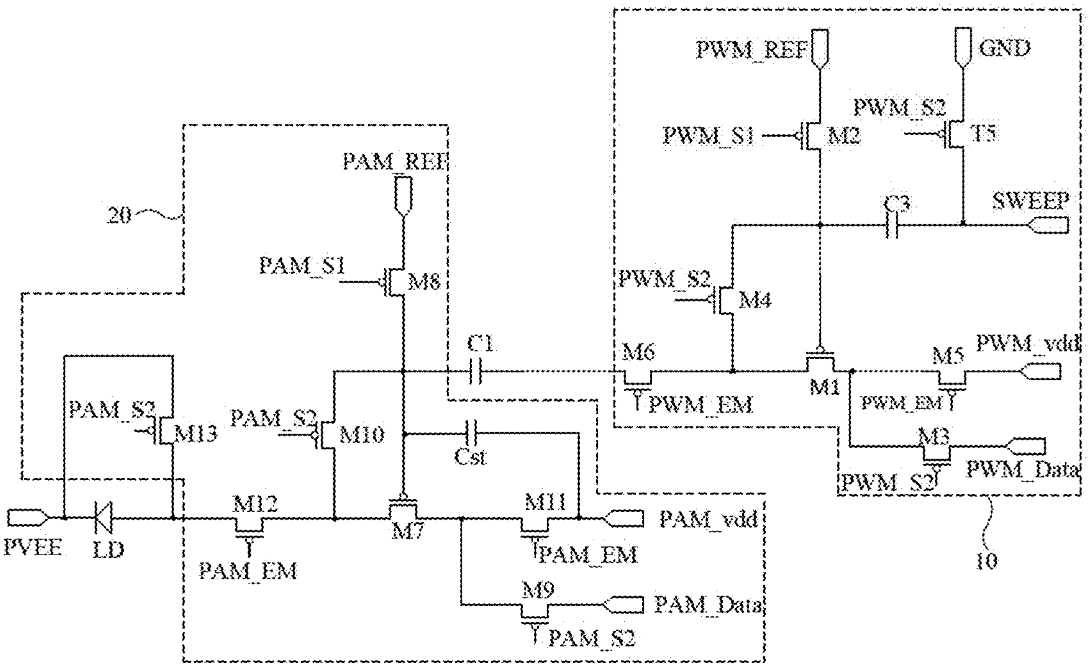
FIG. 8 is a schematic diagram of a pixel circuit according to another embodiment of the present disclosure.

FIG. 8 is a schematic diagram of a pixel circuit according to another embodiment of the present disclosure. In some embodiments of the present disclosure, as shown in FIG. 8, the second driving circuit 20 further includes a second storage capacitor Cst, that is, the second storage capacitor in the pixel circuit. One plate of the second storage capacitor Cst is connected to the first power voltage line PAM-vdd and the other plate is connected to the gate of the first driving transistor M7.

Figure 9:
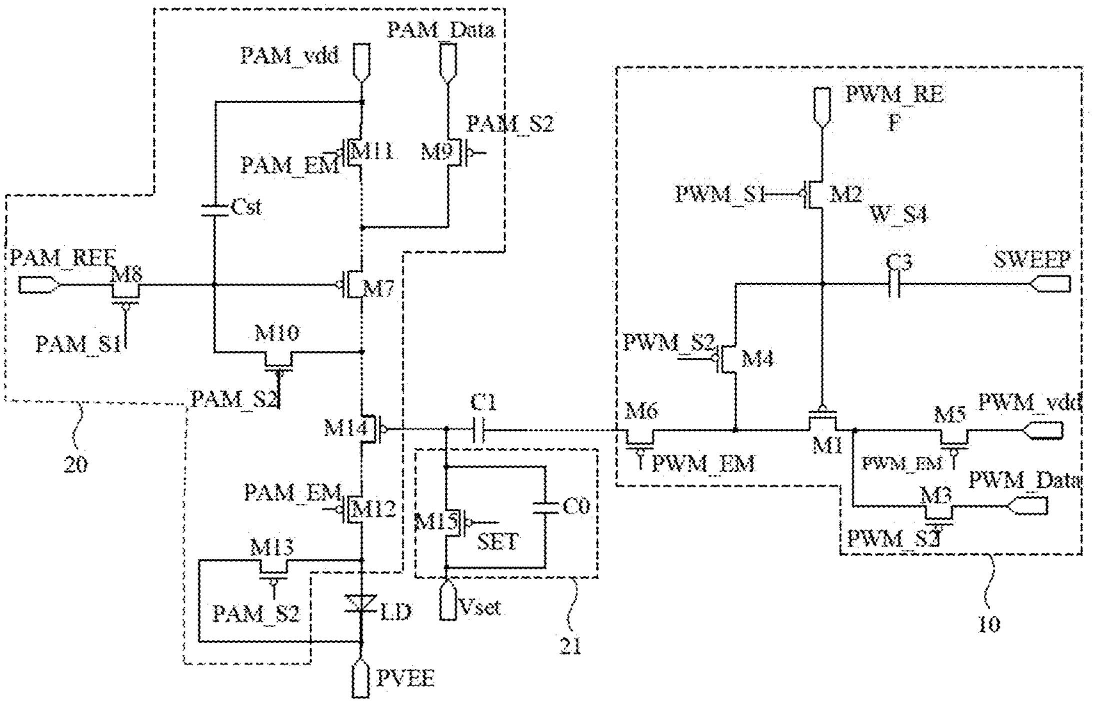
FIG. 9 is a schematic diagram of a pixel circuit according to another embodiment of the present disclosure.

In some embodiments of the present disclosure, the output terminal of the first driving circuit 10 is connected to a light-emitting duration control transistor in the second driving circuit 20 through the first capacitor C1. FIG. 9 is a schematic diagram of a pixel circuit according to another embodiment of the present disclosure. For transistors in the first driving circuit 10 and the second driving circuit 20 in FIG. 9, reference may be made to the embodiment of FIG. 3. As shown in FIG. 9, the second driving circuit 20 includes a storage capacitor Cst. One plate of the storage capacitor Cst is connected to the first power voltage line PAM-vdd and the other plate is connected to the gate of the first driving transistor M7. The second driving circuit 20 further includes a light-emitting duration control transistor M14, and the light-emitting duration control transistor M14 is connected in series between a first power voltage terminal (that is, a signal terminal connected to the first power voltage line PAM-vdd in the second driving circuit 20) and the third power voltage line PVEE. The light-emitting duration control transistor M14 is electrically connected between the first driving transistor M7 and the light-emitting element LD. The second plate of the first capacitor C1 is electrically connected to a gate of the light-emitting duration control transistor M14. In some embodiments of the present disclosure, only when the light-emitting duration control transistor M14 is turned on, the driving current generated by the first driving transistor M7 can be provided for the light-emitting element LD.

Figure 10:
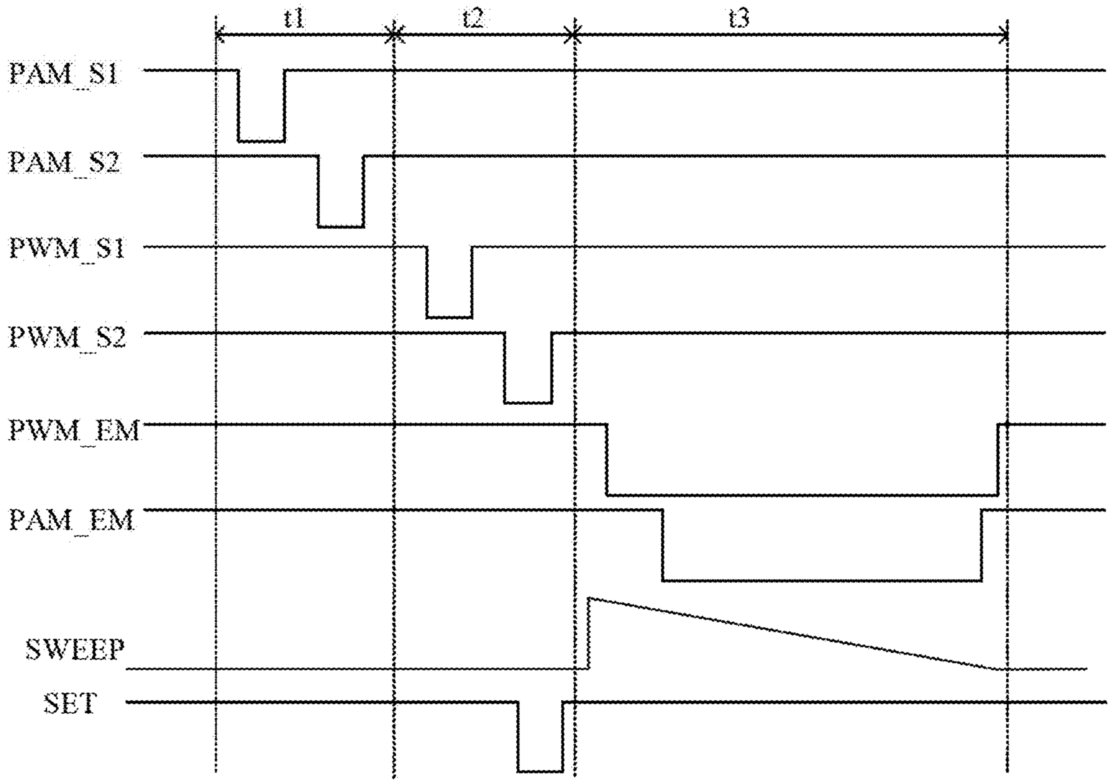
FIG. 10 is a signal timing diagram according to another embodiment of the present disclosure.

FIG. 10 is a signal timing diagram according to another embodiment of the present disclosure. The pixel circuit provided in the embodiment of FIG. 9 may also be driven through the signal timing in FIG. 10. As shown in FIG. 10, in the light-emitting stage t3, the second light-emitting control signal PAM-EM controls the second control transistor M11 and the fourth control transistor M12 to be turned on, and the first driving transistor M7 generates the driving current under control of the gate voltage of the first driving transistor M7, and controls the light-emitting duration control transistor M14 to be turned on, so that the second driving circuit 20 provides the driving current for the light-emitting element LD. The first light-emitting control signal PWM-EM controls the first control transistor M6 and the third control transistor M5 to be turned on, and at the same time, a voltage value of a sweep signal SWEEP gradually changes, and a gate voltage of the second driving transistor M1 changes due to a coupling action of the third capacitor C3. When the gate voltage of the second driving transistor M1 is equal to (or smaller than) a difference between a source voltage of the second driving transistor M1 and an absolute value of a threshold voltage, the second driving transistor M1 is turned on, and the potential of the first plate of the first capacitor C1 is gradually raised. Finally, the second power voltage PWM-vdd is supplied to the first plate of the first capacitor C1 through the first control transistor M6, so that the voltage of the first plate of the first capacitor C1 changes.

There is a process of charge accumulation in the voltage change on the first plate, which is equivalent to providing a control current for the first plate of the first capacitor C1. Further, a gate voltage of the light-emitting duration control transistor M14 changes through a coupling action of the first capacitor C1, so that the light-emitting duration control transistor M14 is turned off, thereby stopping providing the driving current for the light-emitting element LD. In the light-emitting stage t3, the control current is generated based on control of the first data voltage PWM-Vdata and the sweep signal SWEEP in the first driving circuit 10, so as to control a time for which the second driving circuit 20 provides the driving current, and adjust effective light-emitting duration of the light-emitting element LD, thereby controlling light-emitting brightness and grayscale of the light-emitting element LD.

In some embodiments of the present disclosure, the first driving circuit 10 is connected to the light-emitting duration control transistor M14 in the second driving circuit 20 through the first capacitor C1. When the output signal of the first driving circuit 10 controls the voltage change ΔV on the first plate of the first capacitor C1 (that is, a difference between a voltage value on the first plate and an original voltage value on the first plate after the output signal of the first driving circuit 10 is written into the first plate), a gate voltage of the light-emitting duration control transistor M14 also changes by ΔV due to a coupling action of the first capacitor C1. When a voltage difference between the gate voltage and the source voltage of the light-emitting duration control transistor M14 is equal to (or smaller than) an absolute value of a threshold voltage, the light-emitting duration control transistor M14 is turned off, a path between the first driving transistor M7 and the light-emitting element LD is cut off, and the second driving circuit 20 stops providing the driving current for the light-emitting element LD, thereby controlling the flowing period of the driving current. There is no direct correlation between the gate voltage of the light-emitting duration control transistor M14 and the control current provided by the first driving circuit 10, so that the light-emitting duration control transistor M14 can be controlled more accurately to be turned off, thereby improving the performance stability of the pixel circuit. In addition, a magnitude relationship does not necessarily exist between a voltage value of a signal at the output terminal of the first driving circuit 10 and the source voltage of the light-emitting duration control transistor M14, thereby reducing a correlation between signals required for operating of the first driving circuit 10 and operating of the second driving circuit 20.

As shown in FIG. 9, the second driving circuit 20 further includes a light-emitting reset circuit 21. The light-emitting reset circuit 21 is connected between a first reset signal line Vset and the gate of the light-emitting duration control transistor M14, and the light-emitting reset circuit 21 is configured to reset the gate of the light-emitting duration control transistor M14 by using a first reset signal Vset provided by the first reset signal line Vset. A control terminal of the light-emitting reset circuit 21 is connected to a reset control line SET, and the reset control line SET provides a reset control signal SET. As shown in FIG. 10, before the light-emitting stage t3, the reset control line SET provides an enable signal to control the light-emitting reset circuit 21 to be turned on, so that the first reset signal Vset resets the gate of the light-emitting duration control transistor M14.

As shown in FIG. 9, the light-emitting reset circuit 21 includes a light-emitting reset transistor M15. A gate of the light-emitting reset transistor M15 is connected to the reset control line SET, and a first electrode of the light-emitting reset transistor M15 is connected to the first reset signal line Vset and a second electrode of the light-emitting reset transistor M15 is connected to the gate of the light-emitting duration control transistor M14. The light-emitting reset circuit 21 further includes a stabilizing capacitor C0. The stabilizing capacitor C0 is configured to stabilize a potential of the gate of the light-emitting duration control transistor M14, and one plate of the stabilizing capacitor C0 is connected to the first reset signal line Vset and the other plate is connected to the gate of the light-emitting duration control transistor M14.

Figure 11:
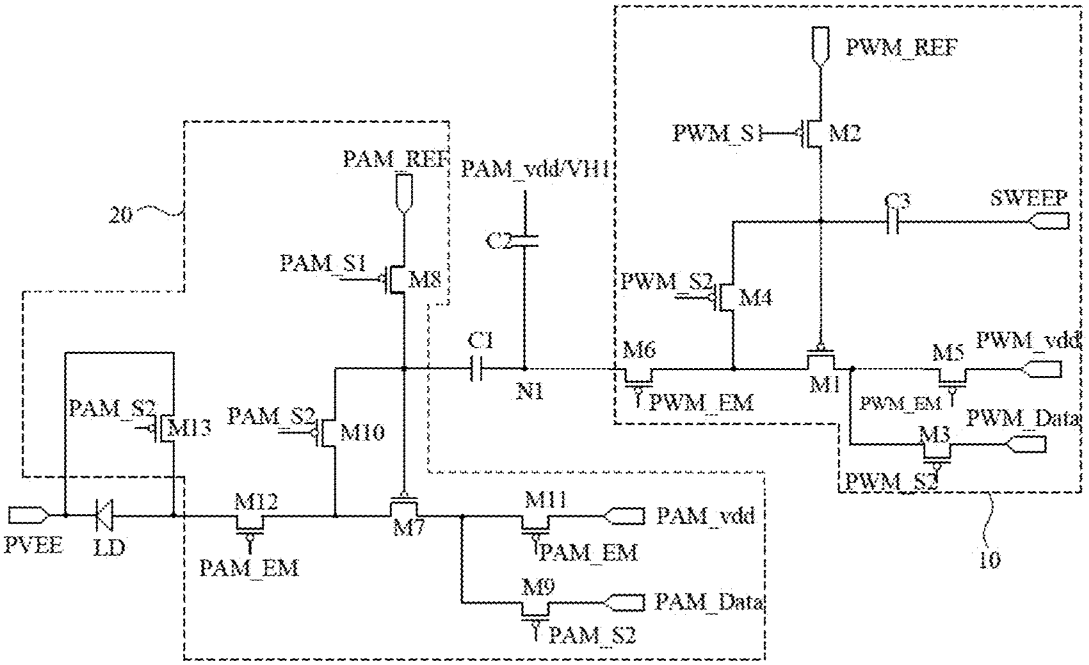
FIG. 11 is a schematic diagram of a pixel circuit according to another embodiment of the present disclosure.

FIG. 11 is a schematic diagram of a pixel circuit according to another embodiment of the present disclosure. In some embodiments of the present disclosure, as shown in FIG. 11, the first plate of the first capacitor C1 and the output terminal of the first driving circuit 10 are electrically connected to a first node N1. The pixel circuit further includes a second capacitor C2 electrically connected to the first node N1, and the first plate of the first capacitor C1 is electrically connected to a first plate of the second capacitor C2. The second capacitor C2 is at least configured to stabilize a potential of the first node N1 in a period in which the potential of the first node N1 floats. The potential floating period means that no active signal is written at a position of the node. In the potential floating period, the potential of the first node N1 is easily fluctuated by another signal, and disposing of the second capacitor C2 can stabilize the potential of the first node N1, thereby ensuring stable operating of the pixel circuit. Optionally, the first capacitor C1 and the second capacitor C2 share one plate.

With reference to the timing diagram shown in FIG. 4, in the light-emitting stage t3, as the voltage value of the sweep signal SWEEP gradually changes, the gate voltage of the second driving transistor M1 is decreased. When a difference between the gate voltage and the source voltage of the second driving transistor M1 is equal to (or smaller than) an absolute value of a threshold voltage, the second driving transistor M1 is turned on, and the potential of the first node N1 is gradually raised. Finally, the first driving circuit 10 writes the second power voltage PWM-vdd into the first node N1. At shown in FIG. 4, a moment t3' is a critical moment, and is also a moment of switching the first driving circuit 10 from being turned off to being turned on, and the first driving circuit 10 provides the control current starting from this moment. In this case, a potential of the first plate of the first capacitor (that is, the output terminal of the first driving circuit 20) is gradually raised until a gate potential of the first driving transistor M7 is raised to a certain value through coupling so that the first driving transistor M7 is turned off. In other words, the first node N1 is in a potential floating state before the moment t3'. The potential floating moment of the first node N1 includes at least the gate reset stage t11 and the data writing stage t12 in which the second driving circuit 20 operates, and a stage in which the second driving circuit 20 generates the driving current.

It should be noted that the gate potential of the first driving transistor M7 starts to be raised to the certain value through coupling so that the first driving transistor M7 is completely turned off, which takes a certain amount of time and cannot be completed in an instant. Before the first driving transistor M7 is completely turned off, the second driving circuit 20 provides the driving current for the light-emitting element LD to control the light-emitting element LD to emit light. A time length for which the gate potential of the first driving transistor M7 starts to be raised through coupling so that the first driving transistor M7 is completely turned off is very small in the light-emitting stage t3, and the time length is also very short compared with an actual light-emitting period of the light-emitting element LD. In FIG. 4, only the moment t3', a moment at which the second driving transistor M1 is turned on and the first driving circuit 10 starts to provide the control current for the first capacitor C1, and a moment at which the first driving transistor M7 is completely turned off (that is, a moment at which the second driving circuit 20 stops providing the driving current for the light-emitting element LD) are simplified. A moment t3" is a moment at which the second driving circuit 20 switches from providing the driving current to not providing the driving current.

In the gate reset stage t11 in which the second driving circuit 20 operates, the second gate reset transistor M8 is turned on to reset the gate of the first driving transistor M7. In this stage, the second capacitor C2 can stabilize the potential of the first node N1, and prevent potential fluctuation of the first node N1 from affecting the gate reset of the first driving transistor M7.

In the data writing stage t12 in which the second driving circuit 20 operates, the second data writing transistor M9 and the second compensation transistor M10 are turned on to write the second data signal PAM-Data into the gate of the first driving transistor M7 and perform threshold compensation. In this stage, the potential of the first node N1 is stabilized through the second capacitor C2, and the first capacitor C1 can serve as a storage capacitor to ensure that the second data signal PAM-Data is accurately written into the gate of the first driving transistor M7.

In the light-emitting stage t3, a period t31 between an initial moment at which the second light-emitting control signal PAM-EM provides an enable signal to the moment t3" is a period in which the second driving circuit 20 provides the driving current, that is, an actual light-emitting period of the light-emitting element LD. The moment t3' is a moment at which the first driving circuit 10 starts to provide the control current, the moment t3' is earlier than the moment t3", and the first node N1 is in a potential floating state before the moment t3'. When the light-emitting element LD emits light, a grayscale displayed by the light-emitting element LD is related to a time length of the period t31 and a voltage value of the second data signal PAM-Data. The period t31 covers the moment t3', and a time interval between the moment t3' and the moment t3" is relatively short, that is, an actual light-emitting time before the moment t3' accounts for most of the actual light-emitting period t31. In some embodiments of the present disclosure, before the moment t3', the potential of the first node N1 is stabilized by using the second capacitor C2, so that the gate voltage of the first driving transistor M7 can be stabilized. Therefore, the second driving circuit 20 can stably provide the driving current, thereby ensuring accuracy of displaying a grayscale by the light-emitting element LD.

In some embodiments of the present disclosure, the second capacitor C2 is at least configured to stabilize the potential of the first node N1 when the first control transistor M6 is turned on (i.e., on) and the second driving transistor M1 is turned off (i.e., off). Referring to FIG. 11, the first control transistor M6 is connected to the first node N1. In a period in which the first control transistor M6 is turned on and the second driving transistor M1 is turned off, because the second driving transistor M1 is in an off state, even if the first control transistor M6 is turned on, no signal is written into the first node N1, and therefore the first node N1 is in a potential floating state. Referring to FIG. 4, in the light-emitting stage t3, the moment t3' is a moment at which the first driving circuit 10 switches from being turned off to being turned on. In a period in which the second light-emitting control signal PAM-EM provides an enable signal, the first control transistor M6 is in an on state, and a period t32 is a period in which the first control transistor M6 is turned on and the second driving transistor M1 is turned off. If a start moment at which the first light-emitting control signal PWM-EM is an enable signal is not later than a start moment at which the second light-emitting control signal PAM-EM is an enable signal, the period t32 covers the actual light-emitting period t31 of the light-emitting element LD. In at least the period t32, the potential of the first node N1 is stabilized by using the second capacitor C2, and further, the gate voltage of the first driving transistor M7 is stabilized, so that the second driving circuit 20 can stably provide the driving current, thereby ensuring accuracy of displaying a grayscale by the light-emitting element LD.

In some embodiments of the present disclosure, as shown in FIG. 11, the second capacitor C2 includes the first plate electrically connected to the first node N1 and the second plate electrically connected to a first constant-voltage signal line VH1, and the first constant-voltage signal line VH1 provides a constant-voltage signal, so that the potential of the first node N1 can be stabilized by using the second capacitor C2.

The constant-voltage signal may be, for example, one of the second power voltage PWM-vdd, the first power voltage PAM-vdd, the third reset signal PWM-REF, the second reset signal PAM-REF, and a third power voltage PVEE (provided by the third power voltage line PVEE).

In some embodiments of the present disclosure, the second capacitor C2 includes the first plate electrically connected to the first node N1 and the second plate electrically connected to the first power voltage line PAM-vdd. The first power voltage line PAM-vdd is reused as the first constant-voltage signal line VH1. That is, the second plate of the second capacitor C2 and the second control transistor M11 are connected to a same signal line. In this way, wiring in the display panel can be reduced, and in the gate reset stage t11 and the data writing stage t12 in which the second driving circuit 20 operates, the first capacitor C1 and the second capacitor C2 can jointly serve as a storage capacitor in the second driving circuit 20.

There may be two wiring manners applied to the display panel. In a first cabling manner, the first power voltage line PAM-vdd extending in a fixed direction is connected to both the second control transistor M11 and the second capacitor C2. In a second cabling manner, one of two electrically connected first power voltage lines PAM-vdd with intersecting extension directions is connected to the second control transistor M11 and the other is connected to the second capacitor C2.

Figure 12:
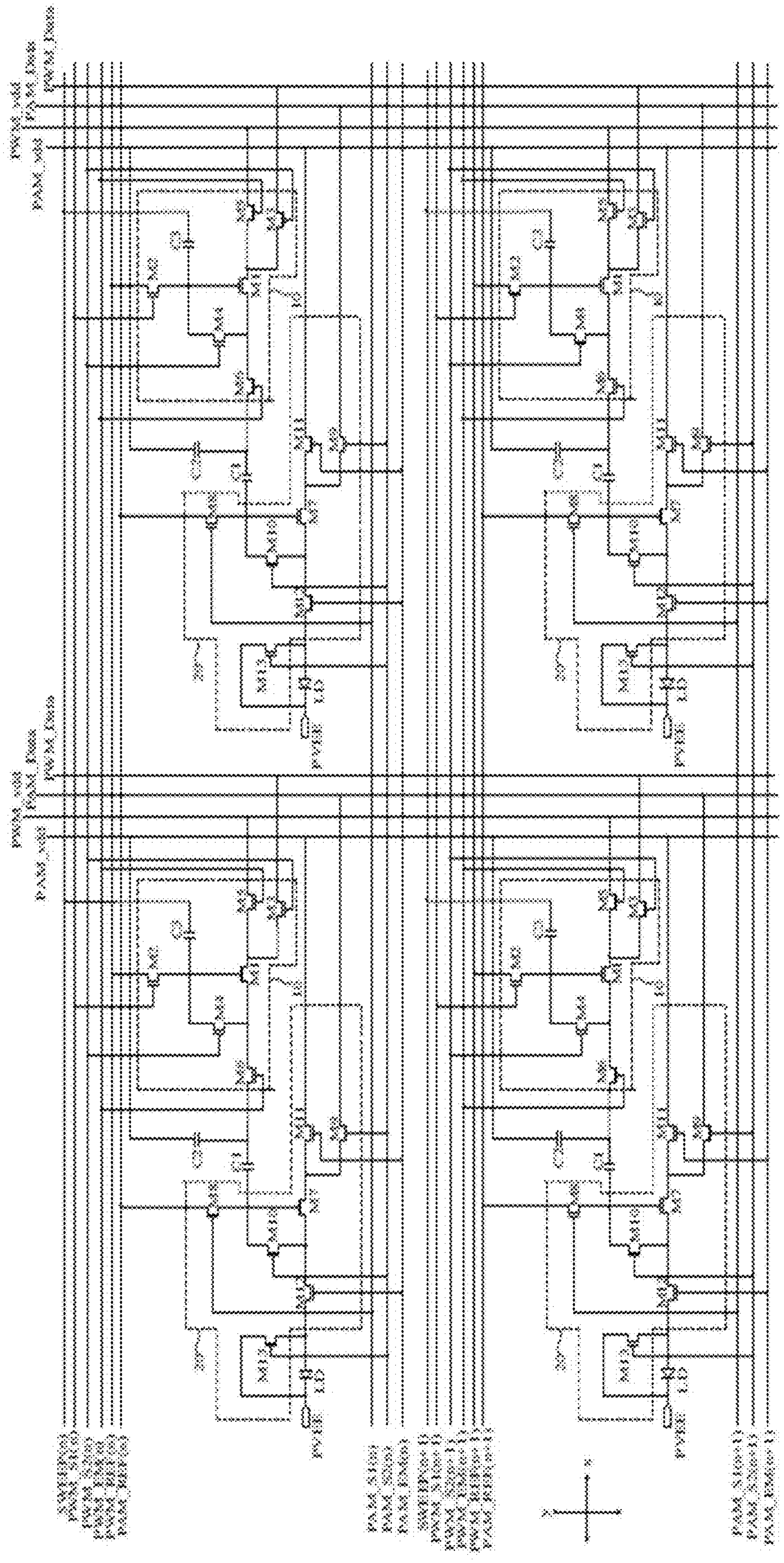
FIG. 12 is a schematic diagram of a display panel according to an embodiment of the present disclosure.

FIG. 12 is a schematic diagram of a display panel according to an embodiment of the present disclosure. In some embodiments of the present disclosure, the pixel circuit in FIG. 12 is illustrated by using the structure in FIG. 11. FIG. 12 illustrates a total of four pixel circuits: two pixel circuits in an $n^{th}$ row and two pixel circuits in an $(n+1)^{th}$ row, where n is a positive integer. A light-emitting element LD connected to the pixel circuit is further illustrated. As shown in FIG. 12, a signal line extending in a first direction x and a signal line extending in a second direction y are disposed on the display panel, and the first direction x and the second direction y intersect each other. For example, a sweep signal line SWEEP (n) provides a sweep signal SWEEP for the pixel circuit in the $n^{th}$ row, and a first light-emitting control line PWM-EM (n) is a first light-emitting control line PWM-EM connected to the pixel circuit in the $n^{th}$ row. Other signal lines can be understood with reference, and details are not described herein again. It can be learned from FIG. 12 that a first power voltage line PAM-vdd and a second power voltage line PWM-vdd are disposed on the display panel, the first driving circuit 10 is connected to the second power voltage line PWM-vdd, and the second driving circuit 20 is connected to the first power voltage line PAM-vdd.

FIG. 12 illustrates that both the first power voltage line PAM-vdd and the second power voltage line PWM-vdd extend in the second direction y. In some embodiments of the present disclosure, one of the first power voltage line PAM-vdd and the second power voltage line PWM-vdd extends in the second direction y and the other extends in the first direction x. In some embodiments of the present disclosure, the first power voltage line PAM-vdd and the second power voltage line PWM-vdd that extend in the second direction y and the first power voltage line PAM-vdd and the second power voltage line PWM-vdd that extend in the first direction x may be disposed on the display panel.

Taking the pixel circuit illustrated in FIG. 11 an example, when the second plate of the second capacitor C2 is connected to the first power voltage line PAM-vdd, in the gate reset stage t11 and the data writing stage t12 in which the second driving circuit 20 operates, the first capacitor C1 and the second capacitor C2 can jointly serve as a storage capacitor in the second driving circuit 20. In an actual light-emitting period of the light-emitting stage t3, the second driving circuit 20 provides the driving current for the light-emitting element LD, and the driving current is $Id=K*(V_{PAM-Data}-V_{PAM-vdd})^2$, where $V_{PAM-Data}$ represents a voltage value of the second data signal PAM-Data, $V_{PAM-vdd}$ represents a voltage value of the first power voltage PAM-vdd, and K is a constant related to a characteristic of the first driving transistor M7. When a plurality of pixel circuits are disposed in the display panel, values of first power voltages PAM-vdd received by second driving circuits 20 in the pixel circuits at different positions in the panel are different. This is because the first power voltage line PAM-vdd disposed in the panel has an impedance, and when the first power voltage line PAM-vdd has a current, a voltage drop exists in the signal line. Because of the voltage drop, there is a deviation in the first power voltages PAM-vdd received by the second driving circuits 20 at different positions. A larger sum of driving currents generated by second driving circuits 20 connected to first power voltage lines PAM-vdd leads to a larger deviation between the first power voltages PAM-vdd. The deviation of the first power voltages PAM-vdd is a difference between a voltage value actually received by the second driving circuit 20 and a voltage value provided by a driving chip. This difference affects a magnitude of the driving current Id, and further affects luminous brightness of the light-emitting element LD, resulting in the problem of display heterogeneity.

Figure 13:
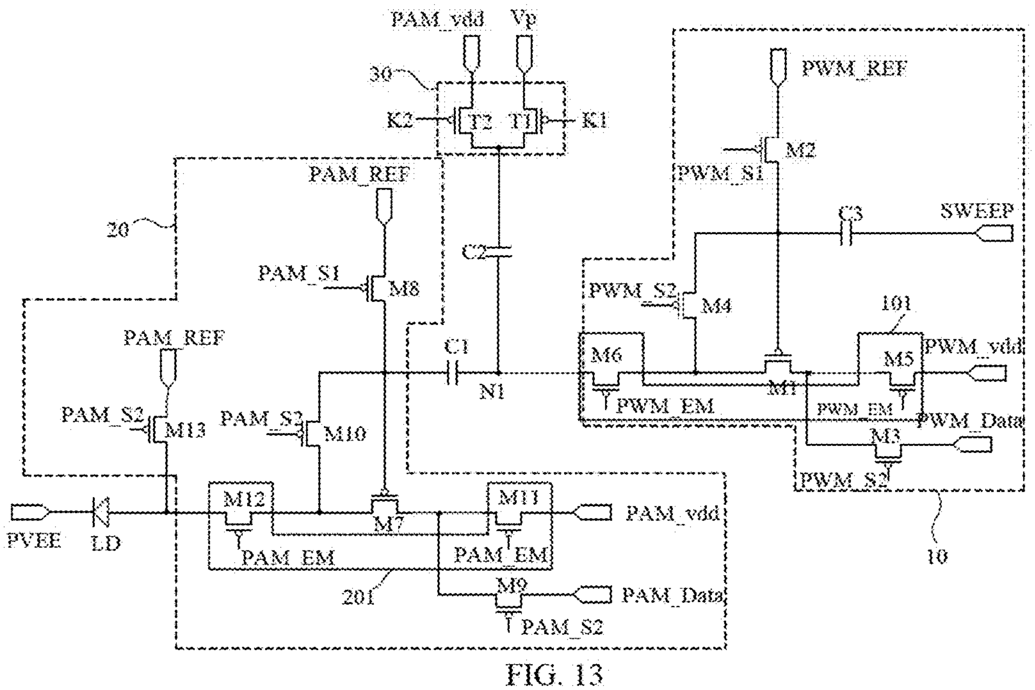
FIG. 13 is a schematic diagram of a pixel circuit according to another embodiment of the present disclosure.

To further resolve the problem of display heterogeneity, the present disclosure further provides a pixel circuit, and a compensation module is disposed in the pixel circuit. FIG. 13 is a schematic diagram of a pixel circuit according to another embodiment of the present disclosure. In some embodiments of the present disclosure, as shown in FIG. 13, the pixel circuit includes the first capacitor C1, the second capacitor C2, and a compensation module 30. The first plate of the first capacitor C1 and the output terminal of the first driving circuit 10 are electrically connected to a first node N1. The second capacitor C2 includes a first plate electrically connected to the first node N1 and a second plate electrically connected to the compensation module 30. The compensation module 30 is configured to write a reference voltage Vp into the second plate of the second capacitor C2 in a first period in which the second driving circuit 20 operates, and write the first power voltage PAM-vdd into the second plate of the second capacitor C2 in a second period in which the second driving circuit 20 operates. The first period and the second period do not overlap in an operating cycle of the pixel circuit.

The compensation module 30 can write different voltages into the second plate of the second capacitor C2 in different periods in which the second driving circuit 20 operates. For example, the second period includes at least a period in which the second driving circuit 20 generates the driving current (for example, the period t31 shown by the timing diagram in FIG. 4), and the first period is before the period in which the second driving circuit 20 generates the driving current. Optionally, the first period includes a gate reset stage t11 and/or a data writing stage t12 in which the second driving circuit 20 operates.

Examples in which the first period includes the data writing stage t12 are used.

In the gate reset stage t11 in which the second driving circuit 20 operates, the second gate reset transistor M8 is turned on to reset the gate of the first driving transistor M7. In the data writing stage t12 in which the second driving circuit 20 operates, the second data writing transistor M9 and the second compensation transistor M10 are turned on to write the second data signal PAM-Data into the gate of the first driving transistor M7 and perform threshold compensation, and a voltage of the gate of the first driving transistor M7 is $V_{PAM-vdd}-|Vth|$. In this case, the compensation module 30 writes the reference voltage Vp into the second plate of the second capacitor C2.

In the actual light-emitting period t31 of the light-emitting stage t3, the compensation module 30 writes the first power voltage PAM-vdd into the second plate of the second capacitor C2, and when a voltage of the second plate of the second capacitor C2 jumps from the reference voltage Vp to the first power voltage PAM-vdd, a voltage variation is $V_{PAM-vdd}-Vp$. A gate voltage of the first driving transistor M7 jumps to $V_{PAM-Data}-|Vth|+V_{PAM-vdd}-Vp$ due to coupling actions of the first capacitor C1 and the second capacitor C2. In the actual light-emitting period t31, the second control transistor M11 and the fourth control transistor M12 are turned on, and the first driving transistor M7 generates the driving current under control of the gate voltage of the first driving transistor M7. A formula for calculating the driving current is as follows: The driving current is $Id=K*(Vgs-|Vth|)^2$, where Vgs is a voltage difference between a gate and a source of a driving transistor. In application to the first driving transistor M7, if the gate voltage of the first driving transistor M7 is $V_{PAM-Data}-|Vth|+V_{PAM-vdd}-Vp$ and a source voltage of the first driving transistor M7 is $V_{PAM-vdd}$, $Vsg=V_{PAM-vdd}-(V_{PAM-Data}-|Vth|+V_{PAM-vdd}-Vp)=V_{PAM-Data}-|Vth|-Vp$, and $Id=K*(V_{PAM-Data}-Vp)^2$. In this case, the driving current is related to the second data signal PAM-Data and the reference voltage Vp, and is not related to the threshold voltage and the first power voltage PAM-vdd. Therefore, the compensation module 30 compensates for a deviation of the first power voltage PAM-vdd that affects the driving current, so that the driving current is no longer affected by the deviation of the first power voltage PAM-vdd, thereby avoiding display heterogeneity caused by the deviation of the first power voltage PAM-vdd and improving display uniformity.

It should be noted herein that because the time interval between the moment t3' and the moment t3" is very short, the compensation module 30 can play a role in most of the actual light-emitting period t31 to improve display uniformity.

In some embodiments of the present disclosure, a voltage value of the reference voltage Vp is greater than or equal to a voltage value of the first power voltage PAM-vdd. The reference voltage Vp is an ideal voltage, that is, a voltage without any current loss, and the reference voltage Vp may be considered as a power voltage that is provided by the driving chip and that does not have a voltage drop loss. In application to the display panel, voltage values of reference voltages Vp received by compensation modules 30 in pixel circuits at different positions on the display panel are equal. Therefore, it can be ensured that a driving current generated by the pixel circuit is not affected by a voltage drop, and the problem of display heterogeneity caused by the voltage drop is improved. In the display panel, a dedicated line may be used to provide the reference voltage Vp, so that no voltage drop exists during transmission of the reference voltage Vp, and voltage values of reference voltages Vp received by pixel circuits at positions on the display panel are the same.

In some embodiments of the present disclosure, as shown in FIG. 13, the third control transistor M5 in the first driving circuit 10 is connected between the second power voltage line PWM-vdd and the second driving transistor M1. Optionally, the second power voltage PWM-vdd provided by the second power voltage line PWM-vdd is reused as the reference voltage Vp, that is, the driving chip provides a same voltage for a reference voltage line (configured to transmit the reference voltage Vp) and the second power voltage line PWM-vdd. In this way, a quantity of signals output by the driving chip can be reduced, thereby simplifying a design of the driving chip.

In some embodiments of the present disclosure, the compensation module 30 is connected to the second power voltage line PWM-vdd, that is, the reference voltage Vp is provided by the second power voltage line PWM-vdd. Compared with the first power voltage line PAM-vdd, the second power voltage line PWM-vdd has no large-load current, a load on the second power voltage line PWM-vdd is small, and the second power voltage PWM-vdd provided by the second power voltage line PWM-vdd has no current loss. It can be understood that the second power voltage PWM-vdd is a power voltage without a voltage drop loss. Therefore, it can be ensured that a driving current generated by the pixel circuit is not affected by a voltage drop, and the problem of display heterogeneity caused by the voltage drop is improved.

In some embodiments of the present disclosure, as shown in FIG. 13, the compensation module 30 includes a first transistor T1 and a second transistor T2. A gate of the first transistor is connected to a first control signal line K1, the first control signal line K1 provides a first control signal K1, and a first electrode of the first transistor T1 receives the reference voltage Vp and a second electrode of the second transistor T1 is connected to the second plate of the second capacitor C2. A gate of the second transistor T2 is connected to a second control signal line K2, the second control signal line K2 provides a second control signal K2, and a first electrode of the second transistor T2 is connected to the first power voltage line PAM-vdd and a second electrode of the second transistor T2 is connected to the second plate of the second capacitor C2. In the first period, the first control signal K1 is an enable signal to control the first transistor T1 to be turned on to write the reference voltage Vp into the second plate of the second capacitor C2. In the second period, the second control signal K2 is an enable signal to control the second transistor T2 to be turned on to write the first power voltage PAM-vdd into the second plate of the second capacitor C2.

Figure 14:
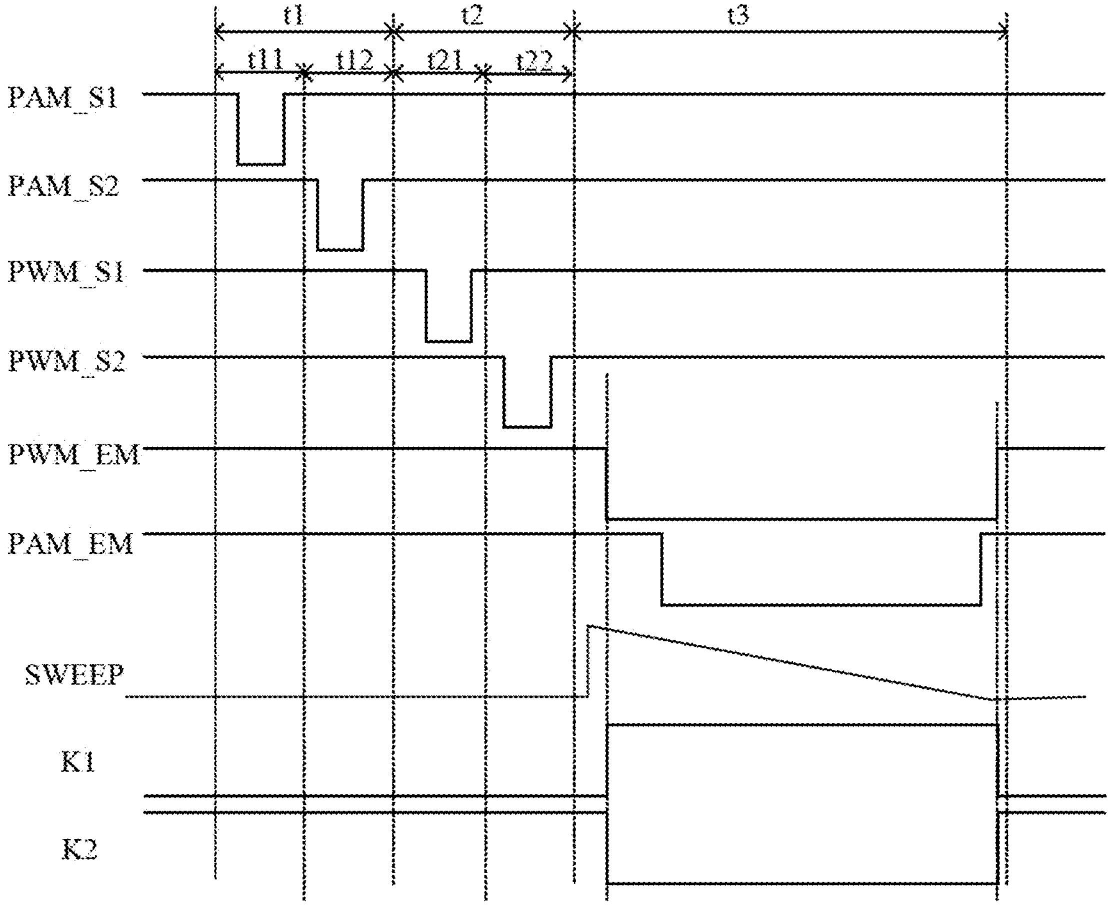
FIG. 14 is a signal timing diagram according to another embodiment of the present disclosure.

FIG. 14 is a signal timing diagram according to another embodiment of the present disclosure. The signal timing provided in the embodiment of FIG. 14 can be used to drive the pixel circuit provided in the embodiment of FIG. 13. As shown in FIG. 14, the first control signal K1 and the second control signal K2 are mutually phase-inverted signals. When the first transistor T1 and the second transistor T2 are of a same type, it can be ensured that a turning-on period of the first transistor T1 and a turning-on period the second transistor T2 do not overlap, and a period in which the compensation module 30 writes the reference voltage Vp into the second plate of the second capacitor C2 and a period in which the compensation module 30 writes the first power voltage PAM-vdd into the second plate of the second capacitor C2 do not overlap.

As shown in FIG. 13, the first driving circuit 10 includes a first light-emitting control module 101. The first light-emitting control module 101 is connected in series with the second driving transistor M1, and a control terminal of the first light-emitting control module 101 receives a first light-emitting control signal PWM-EM. The second driving circuit 20 includes a second light-emitting control module 201. The second light-emitting control module 201 is connected in series with the first driving transistor M7, and a control terminal of the second light-emitting control module 201 receives a second light-emitting control signal PAM-EM. FIG. 13 illustrates that the first light-emitting control module 101 includes a first control transistor M6 and a third control transistor M5, and the second light-emitting control module 201 includes a second control transistor M11 and a fourth control transistor M12.

In some embodiments of the present disclosure, the first light-emitting control module 101 includes at least a first control transistor M6. The first control transistor M6 is connected between the second driving transistor M1 and the first capacitor C1, a gate of the first control transistor M6 receives the first light-emitting control signal PWM-EM, and the gate of the first control transistor M6 and a gate of the third control transistor M5 may receive different signals. The second light-emitting control module 201 includes a second control transistor M11. The second control transistor M11 is connected between the second driving transistor M7 and the light-emitting element LD, a gate of the second control transistor M11 receives the second light-emitting control signal PAM-EM, and the gate of the second control transistor M11 and a gate of the fourth control transistor M12 may receive different signals. This part is described in the following related embodiments.

With reference to the timing diagram in FIG. 14, timing of the second control signal K2 is the same as timing of the first light-emitting control signal PWM-EM, that is, the second control signal K2 is reused as the first light-emitting control signal PWM-EM. When the first light-emitting control module 101 includes the first control transistor M6 and the third control transistor M5, the gate of the first control transistor M6 receives the second control signal K2, and the gate of the third control transistor M5 receives the second control signal K2. The second control signal K2 is reused as the original control signal, thereby reduce wiring in the display panel and saving wiring space.

In the light-emitting stage t3, the second control signal K2 provides an enable signal to control the second transistor T2 to be turned on to write the first power voltage PAM-vdd into the second plate of the second capacitor C2. The light-emitting stage t3 is after the first input stage t1 in which the second driving circuit 20 operates. In at least the first input stage t1 in which the second driving circuit 20 operates, the first control signal K1 provides an enable signal to control the first transistor T1 to be turned on to write the reference voltage Vp into the second plate of the second capacitor C2. In this way, a voltage of the second plate of the second capacitor C2 jumps at an initial moment of the light-emitting stage t3. The gate voltage of the first driving transistor M7 jumps correspondingly due to a coupling action of the capacitor, and a voltage variation is related to the first power voltage PAM-vdd. In a period in which the second control transistor M11 and the fourth control transistor M12 are turned on, the driving current generated by the first driving transistor M7 is not related to the first power voltage PAM-vdd. Therefore, the compensation module 30 compensates for a deviation of the first power voltage PAM-vdd that affects the driving current, so that the driving current is no longer affected by the deviation of the first power voltage PAM-vdd, thereby improving display uniformity.

In some embodiments of the present disclosure, timing of the second control signal K2 is the same as timing of the second light-emitting control signal PAM-EM, and the second control signal K2 is reused as the second light-emitting control signal PAM-EM. Because a transistor controlled by the second light-emitting control signal PAM-EM is connected in series with the first driving transistor M7, an enable signal of the second light-emitting control signal PAM-EM affects a period in which the first driving transistor M7 generates the driving current. If the second control signal K2 is set to be reused as the second light-emitting control signal PAM-EM, the second control signal K2 controls the second transistor T2 to write the first power voltage PAM-vdd into the second plate of the second capacitor C2 at an initial moment at which the gate of the first driving transistor M7 generates the driving current, so that the gate voltage of the first driving transistor M7 changes and a change value of the gate voltage is related to the first power voltage PAM-vdd. In this case, the driving current is not related to the first power voltage PAM-vdd in the period in which the first driving transistor M7 generates the driving current. Therefore, the compensation module 30 compensates for a deviation of the first power voltage PAM-vdd that affects the driving current, thereby improving display uniformity.

Figure 15:
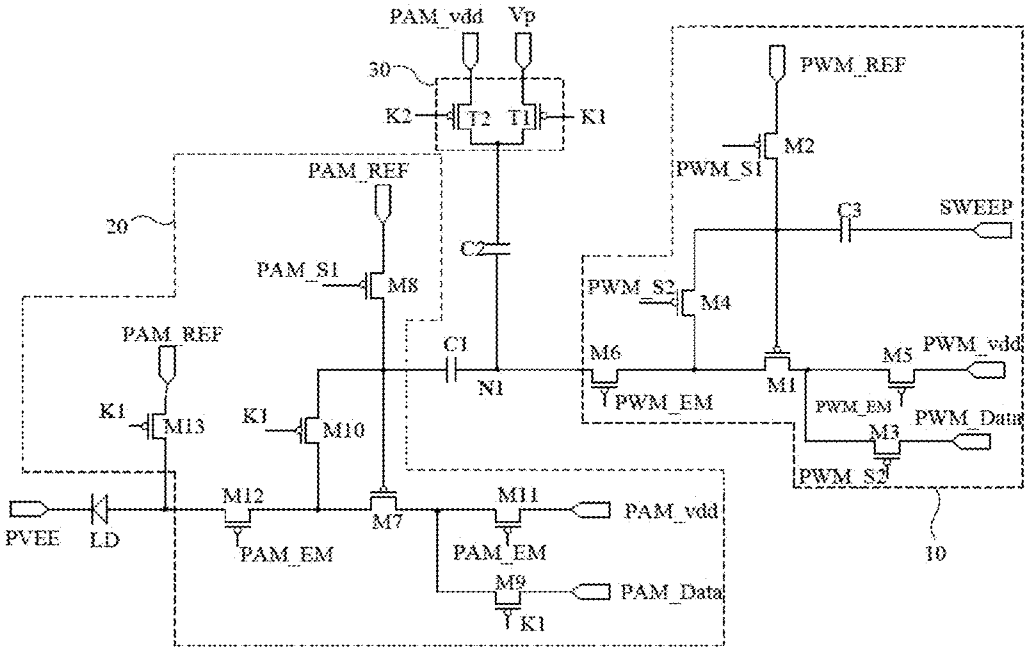
FIG. 15 is a schematic diagram of a pixel circuit according to another embodiment of the present disclosure.
Figure 16:
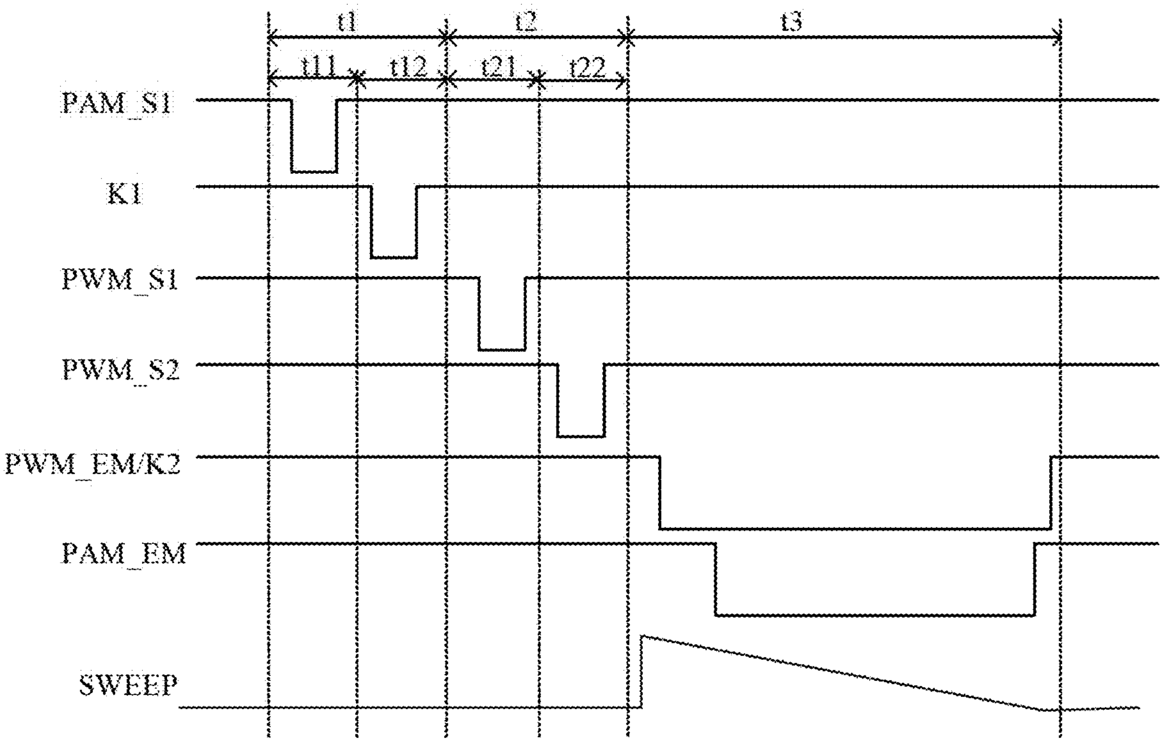
FIG. 16 is a signal timing diagram according to another embodiment of the present disclosure.

FIG. 15 is a schematic diagram of a pixel circuit according to another embodiment of the present disclosure, and FIG. 16 is a signal timing diagram according to another embodiment of the present disclosure. In some embodiments of the present disclosure, as shown in FIG. 15, the gate of the second data writing transistor M9 in the second driving circuit 20 receives the first control signal K1. That is, the second data writing transistor M9 and the first transistor T1 share a control signal. FIG. 15 illustrates that a gate of the second compensation transistor M10 and a gate of the electrode reset transistor M13 also receive the first control signal K1. With reference to the embodiments of FIG. 3 and FIG. 4, the second scan signal PAM-S2 may be reused as the first control signal K1. In application, a signal line connected to the gate of the second data writing transistor M9 and a signal line connected to a gate of the first transistor T1 may be a same signal line or different signal lines. When different signal lines are connected, the different signal lines transmit the same first control signal K1, and the different signal lines herein mean that wiring positions of the signal lines in the display panel are different.

In some embodiments of the present disclosure, the first period in which the compensation module 30 operates includes the data writing stage in which the second driving circuit 20 operates.

FIG. 16 illustrates that the second control signal K2 and the first light-emitting control signal PWM-EM are a same signal. In the data writing stage t12 in which the second driving circuit 20 operates, the first control signal K1 is at an enable level to control the first transistor T1 to write the reference voltage Vp into the second plate of the second capacitor C2. In this stage, the first capacitor C1 and the second capacitor C2 jointly serve as a storage capacitor. The first control signal K1 further controls the second data writing transistor M9 and the second compensation transistor M10 to be turned on to write the second data signal PAM-Data into the gate of the first driving transistor M7 and perform threshold compensation. In the light-emitting stage t3, the second control signal K2 controls the second transistor T2 to be turned on to write the first power voltage PAM-vdd into the second plate of the second capacitor C2, so that a voltage of the second plate of the second capacitor C2 jumps, and the gate voltage of the first driving transistor M7 jumps and a variation of the gate voltage is related to the first power voltage PAM-vdd. When the second light-emitting control signal PAM-EM controls the second control transistor M11 and the fourth control transistor M12, the first driving transistor M7 generates the driving current under control of the gate voltage of the first driving transistor M7. In this case, a magnitude of the driving current is not related to the first power voltage PAM-vdd. Therefore, the compensation module 30 compensates for a deviation of the first power voltage PAM-vdd that affects the driving current, thereby improving display uniformity. In some embodiments of the present disclosure, the first transistor T1 and a transistor in the second driving circuit 20 share a control signal, thereby reducing wiring in the display panel and saving wiring space.

Figure 17:
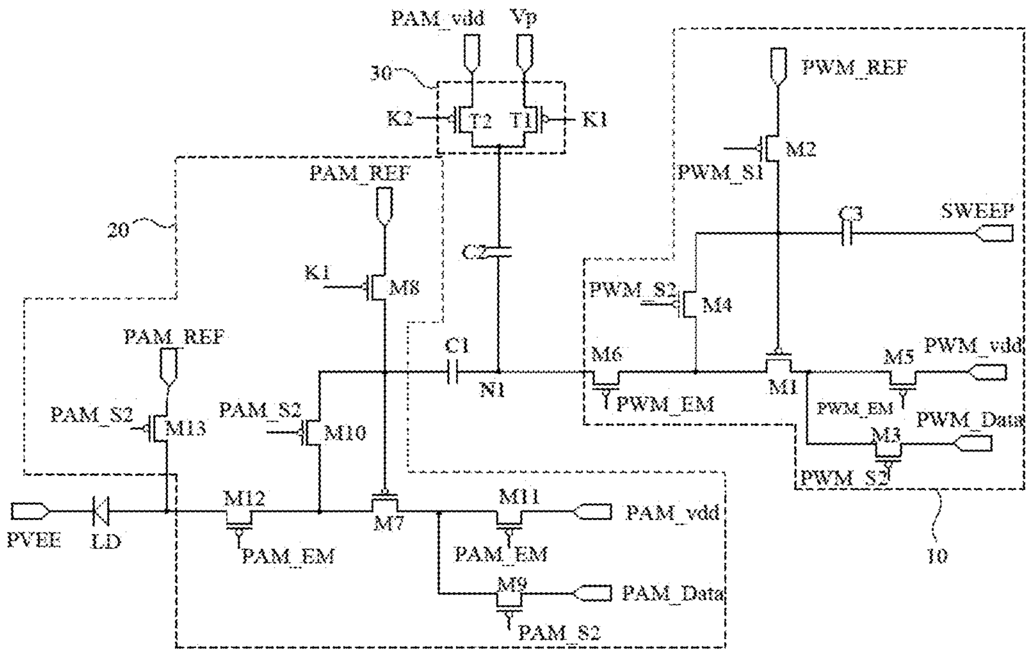
FIG. 17 is a schematic diagram of a pixel circuit according to another embodiment of the present disclosure.

FIG. 17 is a schematic diagram of a pixel circuit according to another embodiment of the present disclosure. In some embodiments of the present disclosure, as shown in FIG. 17, the gate of the second gate reset transistor M8 in the second driving circuit 20 receives the first control signal K1. That is, the second gate reset transistor M8 and the first transistor T1 share a control signal. With reference to the embodiments of FIG. 3 and FIG. 4, the first scan signal PAM-S1 may be reused as the first control signal K1. In application, a signal line connected to the gate of the second gate reset transistor M8 and a signal line connected to a gate of the first transistor T1 may be a same signal line or different signal lines. When different signal lines are connected, the different signal lines transmit the same first control signal K1, and the different signal lines herein mean that wiring positions of the signal lines in the display panel are different.

In some embodiments of the present disclosure, the first period in which the compensation module 30 operates includes the gate reset stage in which the second driving circuit 20 operates.

Figure 18:
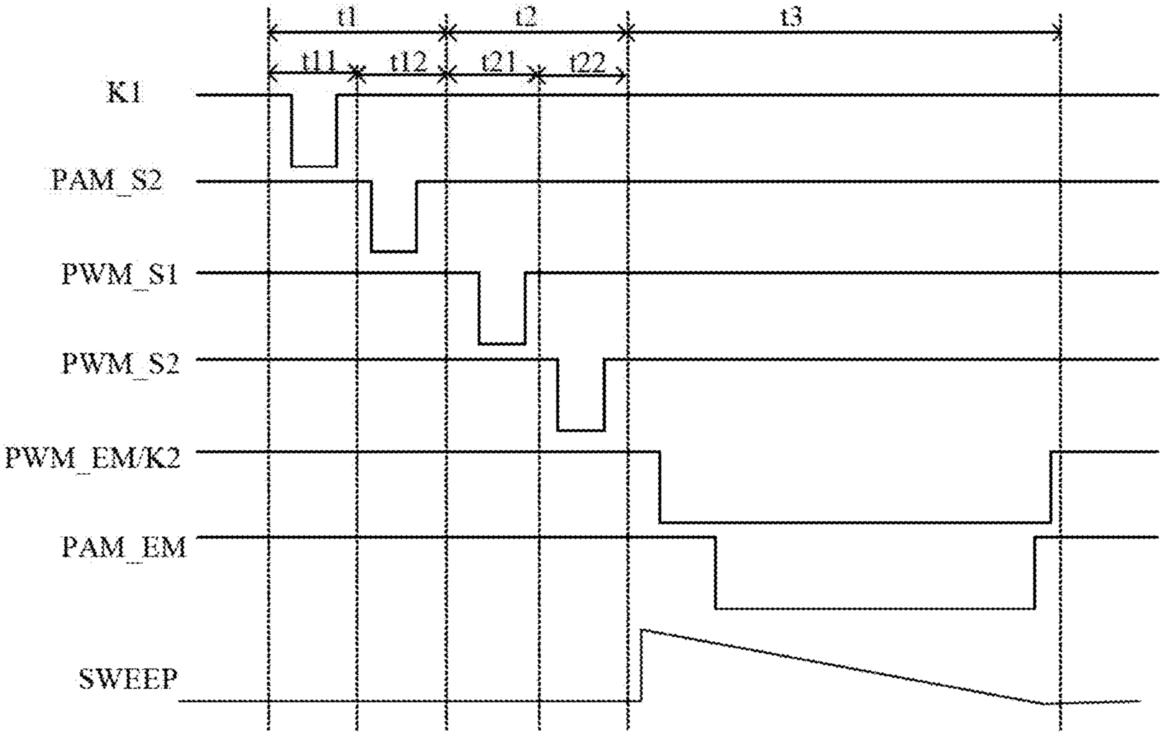
FIG. 18 is a signal timing diagram according to another embodiment of the present disclosure.

FIG. 18 is a signal timing diagram according to another embodiment of the present disclosure. The pixel circuit provided in the embodiment of FIG. 17 can be driven through the signal timing provided in the embodiment of FIG. 18. In FIG. 18, the second control signal K2 and the first light-emitting control signal PWM-EM are a same signal. In some embodiments of the present disclosure, in the gate reset stage t11 in which the second driving circuit 20 operates, the first control signal K1 is at an enable level to control the first transistor T1 to be turned on to write the reference voltage Vp into the second plate of the second capacitor C2, and the first control signal K1 controls the second gate reset transistor M8 to be turned on to reset the gate of the first driving transistor M7. In this stage, the first capacitor C1 and the second capacitor C2 jointly serve as a storage capacitor. In the light-emitting stage t3, the second control signal K2 controls the second transistor T2 to be turned on to write the first power voltage PAM-vdd into the second plate of the second capacitor C2, so that a voltage of the second plate of the second capacitor C2 jumps, and the gate voltage of the first driving transistor M7 jumps and a variation of the gate voltage is related to the first power voltage PAM-vdd. In this case, a magnitude of the driving current is not related to the first power voltage PAM-vdd. Therefore, the compensation module 30 compensates for a deviation of the first power voltage PAM-vdd that affects the driving current, thereby improving display uniformity. In some embodiments of the present disclosure, the first transistor T1 and a transistor in the second driving circuit 20 share a control signal, thereby reducing wiring in the display panel and saving wiring space.

Figure 19:
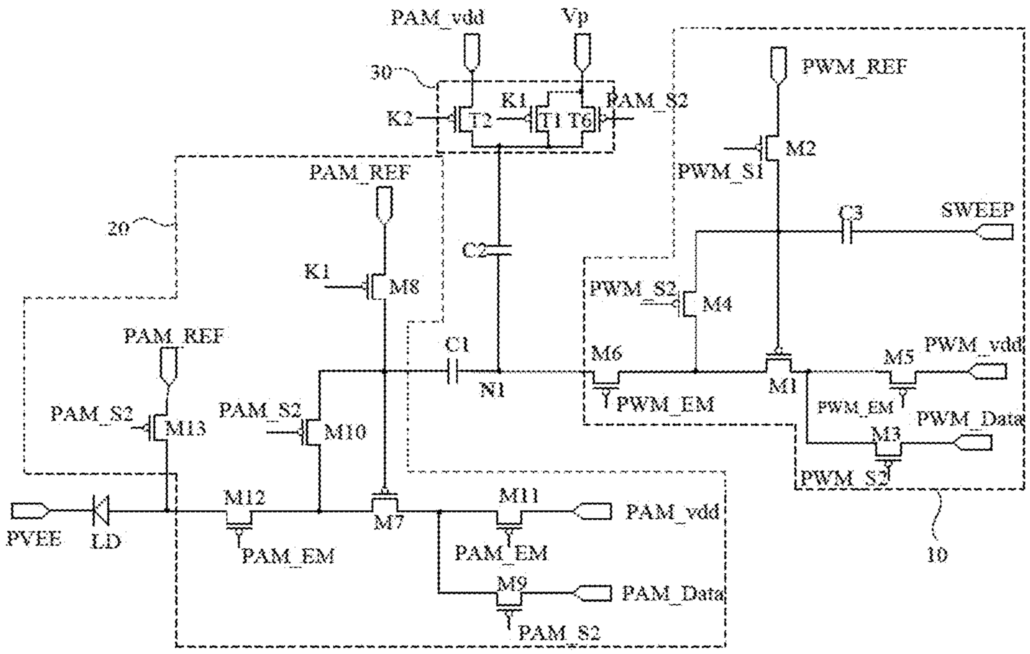
FIG. 19 is a schematic diagram of a pixel circuit according to another embodiment of the present disclosure.

FIG. 19 is a schematic diagram of a pixel circuit according to another embodiment of the present disclosure. In some embodiments of the present disclosure, as shown in FIG. 19, the compensation module 30 includes a first transistor T1, a second transistor T2, and a sixth transistor T6. The first transistor T1 and the sixth transistor T6 are connected in parallel. A first electrode of the first transistor T1 receives the reference voltage Vp and a second electrode of the first transistor T1 is connected to the second plate of the second capacitor C2, and a first electrode of the sixth transistor T6 receives the reference voltage Vp and a second electrode of the sixth transistor T6 is connected to the second plate of the second capacitor C2. A first electrode of the second transistor T2 is connected to the first power voltage line PAM-vdd and a second electrode of the second transistor T2 is connected to the second plate of the second capacitor C2. A gate of the first transistor T1 receives the first control signal K1, and the second gate reset transistor M8 and the first transistor T1 share a control signal. A gate of the second transistor T2 receives the second control signal K2, and a gate of the sixth transistor T6 and the second data writing transistor M9 share a control signal.

Figure 20:
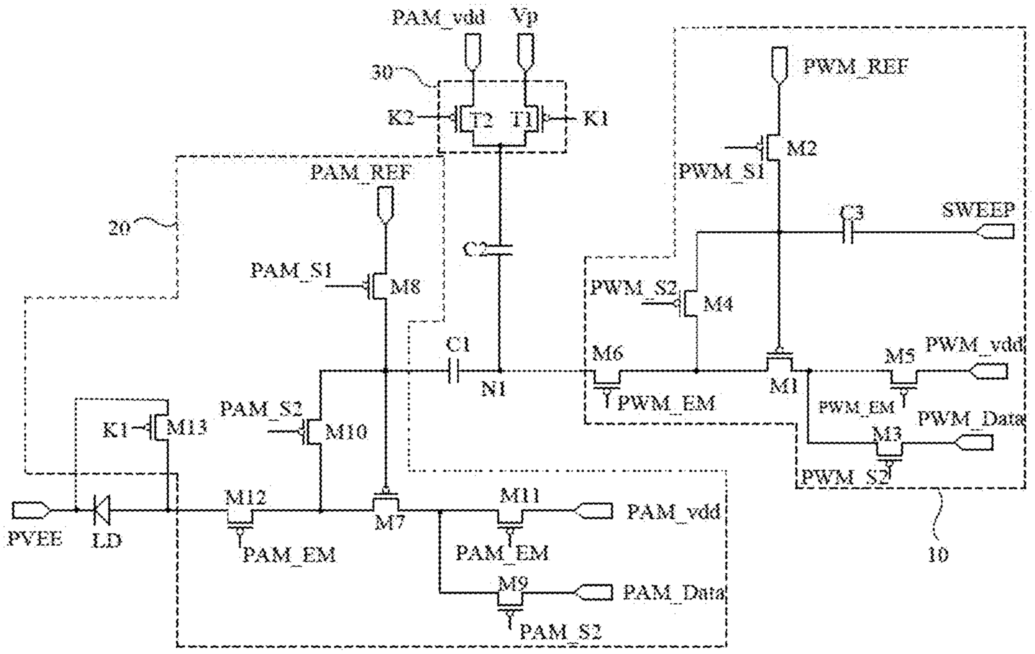
FIG. 20 is a schematic diagram of a pixel circuit according to another embodiment of the present disclosure.
Figure 21:
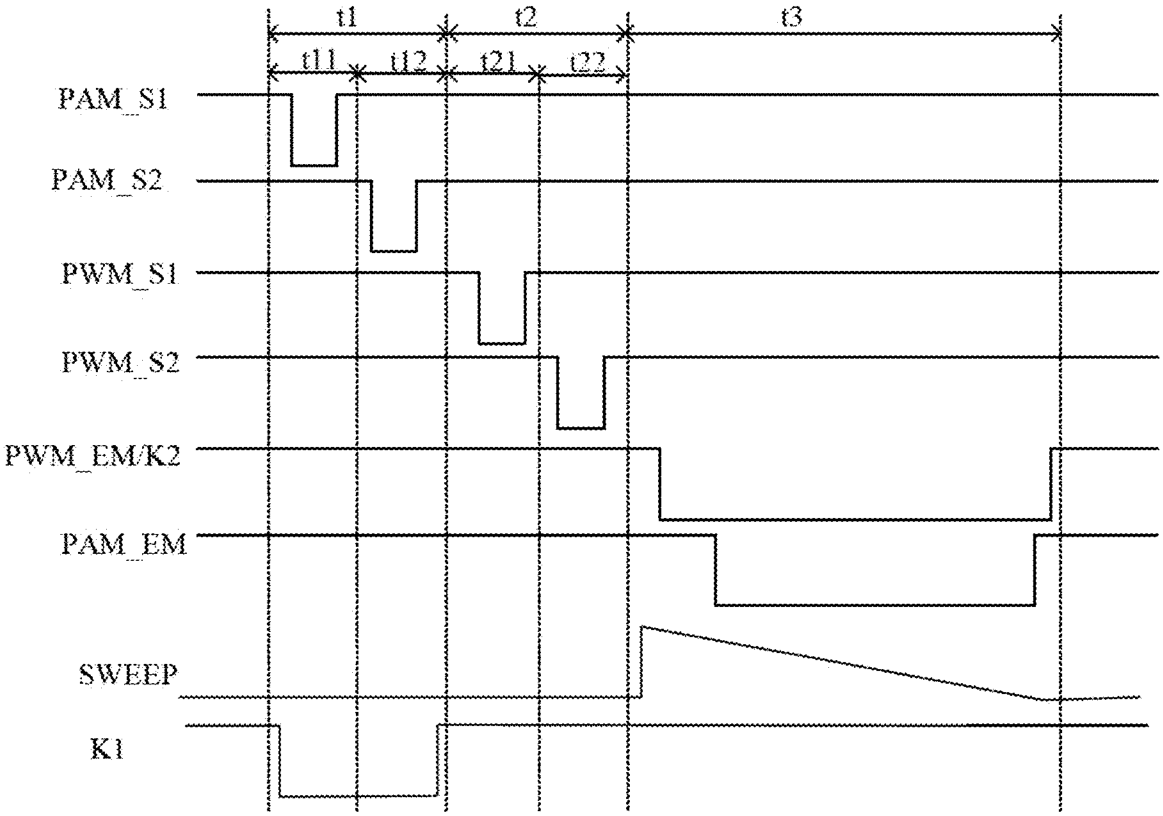
FIG. 21 is a signal timing diagram according to another embodiment of the present disclosure.

FIG. 20 is a schematic diagram of a pixel circuit according to another embodiment of the present disclosure. In some embodiments of the present disclosure, as shown in FIG. 20, the gate of the electrode reset transistor M13 in the second driving circuit 20 receives the first control signal K1. That is, the electrode reset transistor M13 and the first transistor T1 share a control signal. FIG. 21 is a signal timing diagram according to another embodiment of the present disclosure. The pixel circuit provided in the embodiment of FIG. 20 can be driven through the signal timing provided in FIG. 21. In FIG. 21, the second control signal K2 and the first light-emitting control signal PWM-EM are a same signal.

As shown in FIG. 21, a period in which the first control signal K1 is continuously at the enable level covers at least the gate reset stage t11 and the data writing stage t12 in which the second driving circuit 20 operates, that is, the first period in which the compensation module 30 operates includes the gate reset stage t11 and the data writing stage t12 in which the second driving circuit 20 operates. In some embodiments of the present disclosure, in the gate reset stage t11 and the data writing stage t12 in which the second driving circuit 20 operates, if the first control signal K1 continuously controls the first transistor T1 to be turned on, the first capacitor C1 and the second capacitor C2 can jointly serve as a storage capacitor, so that the gate of the first driving transistor M7 is accurately reset and then the second data signal is accurately written.

In some embodiments of the present disclosure, a period in which the first control signal K1 is continuously at the enable level covers at least the gate reset stage t11 and the data writing stage t12 in which the second driving circuit 20 operates. A falling edge of the first control signal K1 is not later than a falling edge of the first scan signal PAM-S1, and a rising edge of the first control signal K1 is not earlier than a rising edge of the second scan signal PAM-S2, that is, a pulse width of an enable signal of the first control signal K1 is greater than a sum of a pulse width of an enable signal of the first scan signal PAM-S1 and a pulse width of an enable signal of the second scan signal PAM-S2. Alternatively, a falling edge of the first control signal K1 overlaps a falling edge of the first scan signal PAM-S1 (that is, being a falling edge at the same time), and a rising edge of the first control signal K1 overlaps a rising edge of the second scan signal PAM-S2 (that is, being a rising edge at the same time).

Figure 22:
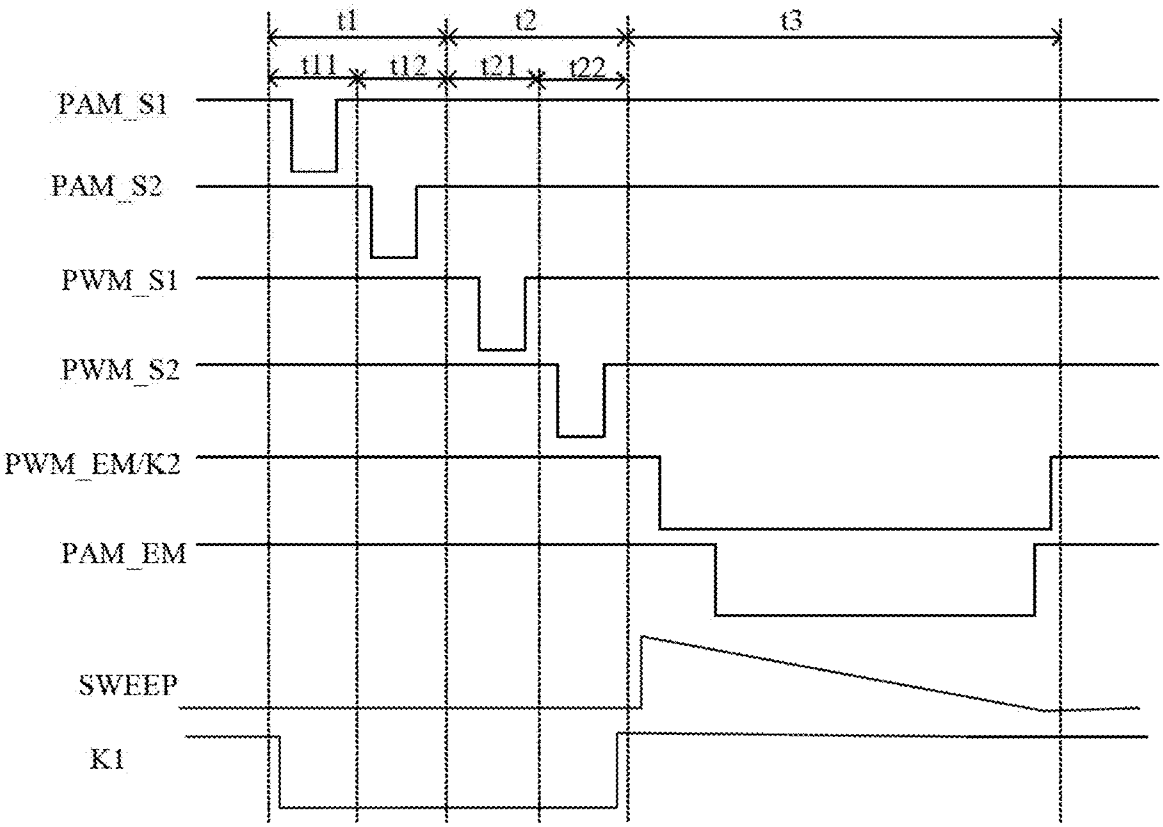
FIG. 22 is a signal timing diagram according to another embodiment of the present disclosure.

FIG. 22 is a signal timing diagram according to another embodiment of the present disclosure. In some embodiments of the present disclosure, the signal timing provided in FIG. 22 can be used to drive the pixel circuit provided in the embodiment of FIG. 13 or FIG. 20. As shown in FIG. 22, the first input stage t1 in which the second driving circuit 20 operates does not overlap the second input stage t2 in which the first driving circuit 10 operates, and the first period in which the compensation module 30 operates includes the first input stage t1 in which the second driving circuit 20 operates and the second input stage t2 in which the first driving circuit 10 operates. A period in which the first control signal K1 is continuously at the enable level covers the first input stage t1 and the second input stage t2. In some embodiments of the present disclosure, the compensation module 30 continuously writes the reference voltage Vp into the second plate of the second capacitor C2 in the first input stage t1 and the second input stage t2. Then, in at least a part of a period after the second input stage t2, for example, at least a period in which the first light-emitting control signal PWM-EM (or the second light-emitting control signal PAM-EM) is at an enable level, the first power voltage PAM-vdd is written into the second plate of the second capacitor C2. Therefore, the compensation module 30 compensates for a deviation of the first power voltage PAM-vdd that affects the driving current, thereby improving display uniformity.

In some embodiments of the present disclosure, the first period in which the compensation module 30 operates includes the first input stage t1 in which the second driving circuit 20 operates and a part of the second input stage t2 in which the first driving circuit 10 operates. That is, a period in which the first control signal K1 is continuously at the enable level covers the first input stage t1 and the part of the second input stage t2. No drawing is shown again herein.

Figure 23:
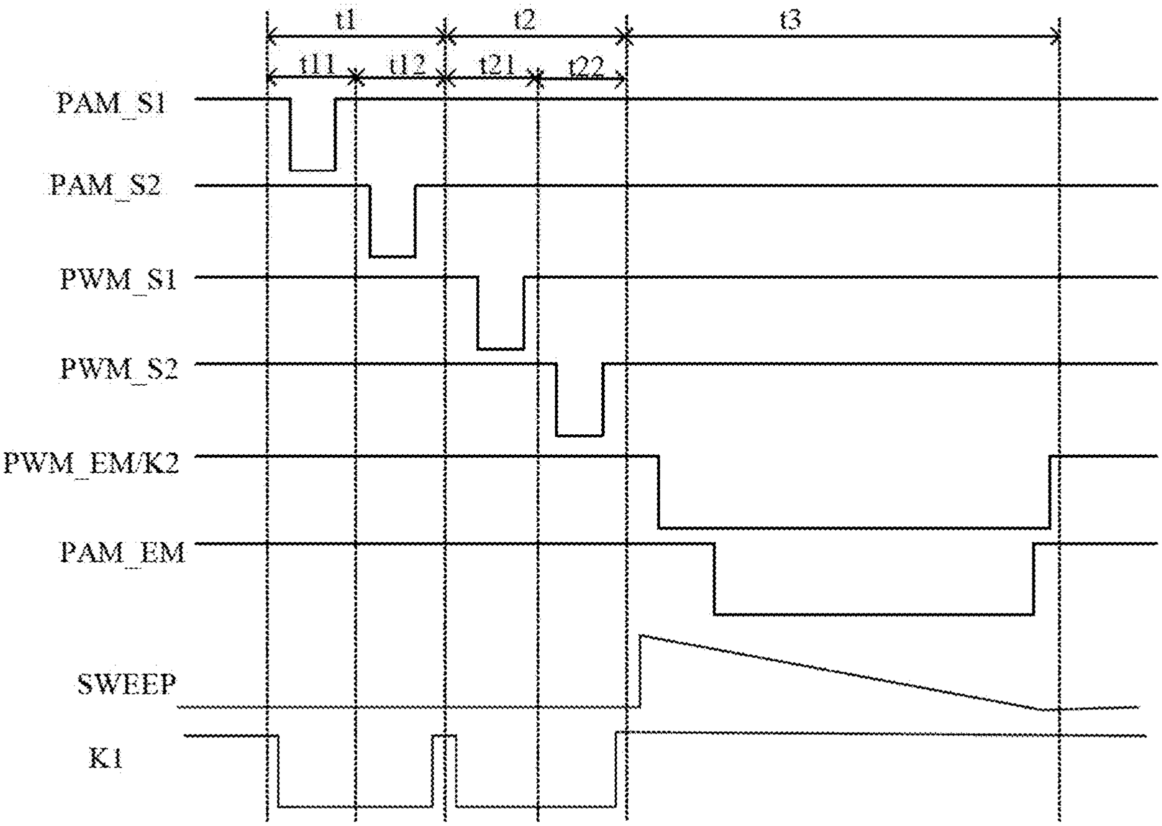
FIG. 23 is a signal timing diagram according to another embodiment of the present disclosure.

FIG. 23 is a signal timing diagram according to another embodiment of the present disclosure. In some embodiments of the present disclosure, the signal timing provided in FIG. 23 can be used to drive the pixel circuit provided in the embodiment of FIG. 13 or FIG. 20. As shown in FIG. 23, the first input stage t1 in which the second driving circuit 20 operates does not overlap the second input stage t2 in which the first driving circuit 10 operates, and the first period in which the compensation module 30 operates includes the first input stage t1 in which the second driving circuit 20 operates and the second input stage t2 in which the first driving circuit 10 operates. A period of a first enable level of the first control signal K1 covers the first input stage t1, and a period of a second enable level of the first control signal K1 covers the second input stage t2.

In some embodiments of the present disclosure, the pixel circuit includes a first pixel circuit and a second pixel circuit. The first pixel circuit is coupled to a first light-emitting element, and the second pixel circuit is coupled to a second light-emitting element. Emitted light colors of the first light-emitting element and the second light-emitting element are different. Both the first pixel circuit and the second pixel circuit include the first capacitor C1 and the second capacitor C2. A capacitance value of the second capacitor C2 in the first pixel circuit is different from a capacitance value of the second capacitor C2 in the second pixel circuit.

In some periods in which the pixel circuit operates, the second capacitor C2 and the first capacitor C1 need to jointly serve as a storage capacitor in the second driving circuit 20. A larger capacitance value of the second capacitor C2 indicates a larger amount of charge that can be stored in the second capacitor C2, so that a gate potential of the first driving transistor M7 can be maintained for a longer time in the light-emitting stage. In addition, generally, a capacitance value of the second capacitor C2 indicates a larger area occupied by the second capacitor C2 in the display panel. The corresponding second capacitor C2 is disposed differently according to a light-emitting color difference of the light-emitting element, so that light-emitting luminance requirements of light-emitting elements of different colors can be met, and space on the display panel can be properly utilized.

In some embodiments of the present disclosure, the first light-emitting element emits red light, and the second light-emitting element emits blue light or green light. A capacitance value of the second capacitor C2 in the first pixel circuit is greater than a capacitance value of the second capacitor C2 in the second pixel circuit. In this way, light-emitting luminance requirements of light-emitting elements of different colors can be met, and space on the display panel can be properly utilized.

In some embodiments of the present disclosure, capacitors of second capacitors C2 in pixel circuits connected to light-emitting elements of different colors in the display panel are equal.

Figure 24:
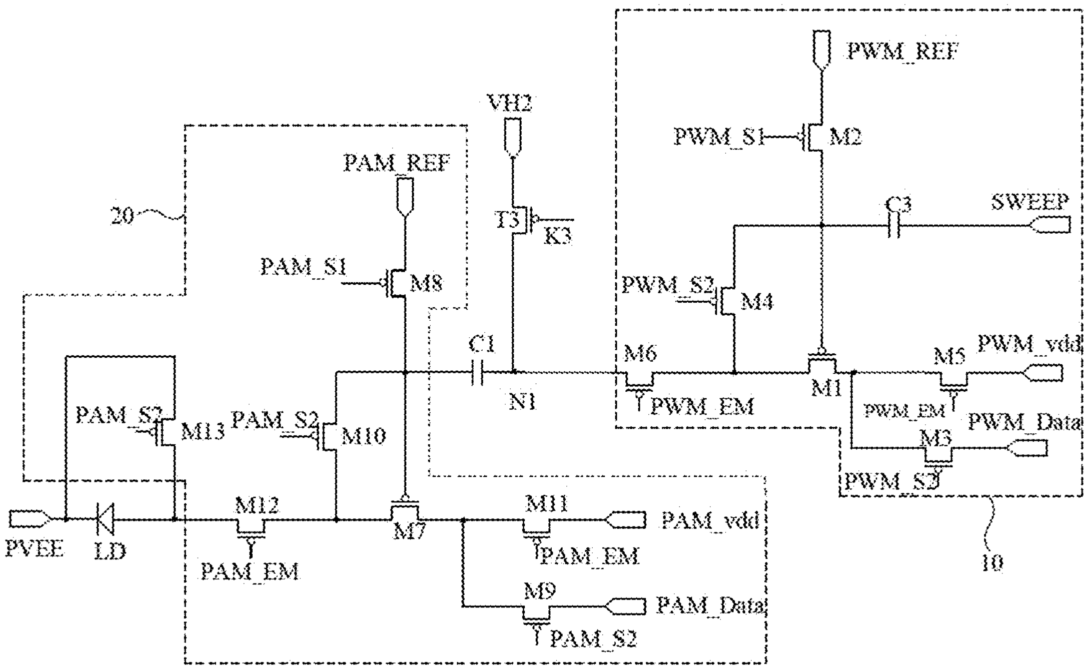
FIG. 24 is a schematic diagram of a pixel circuit according to another embodiment of the present disclosure.

FIG. 24 is a schematic diagram of a pixel circuit according to another embodiment of the present disclosure. In some embodiments of the present disclosure, as shown in FIG. 24, the first plate of the first capacitor C1 and the output terminal of the first driving circuit 10 are electrically connected to a first node N1. The pixel circuit further includes a third transistor T3. A gate of the third transistor T3 receives a third control signal K3, and a first electrode of the third transistor T3 is connected to a second constant-voltage signal line VH2 and a second electrode of the third transistor T3 is connected to the first node N1. The second constant-voltage signal line VH2 and a second reset signal line PAM-REF may transmit a same signal. In some embodiments of the present disclosure, when the third transistor T3 is turned on, the first plate of the first capacitor C1 and the second constant-voltage signal line VH2 may be turned on to reset the first node N1. In addition, a potential of the first node N1 can be stabilized. In this case, the first capacitor C1 may serve as a storage capacitor in the second driving circuit 20.

When the third control signal K3 is at an enable level, the third transistor T3 is turned on to write, into the first node N1, a constant-voltage signal transmitted by the second constant-voltage signal line VH2. The first control transistor M6 in the first driving circuit 10 is connected to the first node N1, and the first control transistor M6 is connected in series with the second driving transistor M1, so that the potential of the first node N1 is gradually raised after the second driving transistor M1 is turned on. Finally, the second power voltage PWM-vdd is transmitted to the first node N1 through the first control transistor M6, to regulate the flowing period in which the second driving circuit 20 provides the driving current. In some embodiments of the present disclosure, a period in which the third control signal K3 is at an enable level does not overlap a period in which the first control transistor M6 receives an enable level, so that it can be ensured that the third transistor T3 resets the first node N1 in some periods. The potential of the first node N1 can change after the second driving transistor M1 is turned on, that is, the potential of the first plate of the first capacitor C1 changes, and the gate potential of the first driving transistor M7 is controlled through a coupling action, thereby regulating the flowing period in which the second driving circuit 20 provides the driving current.

In some embodiments of the present disclosure, a voltage value of the second constant-voltage signal provided by the second constant-voltage signal line VH2 is $V_1$, and a voltage value of the second power voltage provided by the second power voltage line PWM-vdd is $V_2$, where $V_2>V_1$. Optionally, $V_2-V_1\geq3V$. After the third transistor $T_3$ is turned on, the second constant-voltage signal is written into the first node N1, that is, to the first plate of the first capacitor C1. After the second driving transistor M1 is turned on, the second power voltage is written into the first plate of the first capacitor C1 through the first control transistor M6, so that the potential of the first plate of the first capacitor C1 changes. A voltage difference between $V_2$ and $V_1$ is a potential variation of the first plate of the first capacitor C1, and the potential variation affects a coupling effect of the gate potential of the first driving transistor M7. $V_2-V_1\geq3V$ is set, so that it can be ensured that the first capacitor C1 has a better coupling effect to control a change of the gate potential of the first driving transistor M7.

In some embodiments of the present disclosure, the second gate reset transistor M8 in the second driving circuit 20 is configured to transmit the second reset signal PAM-REF to the gate of the first driving transistor M7 for resetting. The second constant-voltage signal line VH2 provides the second reset signal PAM-REF. Alternatively, the light-emitting element LD is connected to the third power voltage line PVEE, and the third power voltage line PVEE and the second constant-voltage signal line VH2 transmit a same signal. In this way, the second constant-voltage signal line VH2 can transmit a signal with a relatively low voltage value, thereby meeting a coupling action requirement of the first capacitor C1. In addition, an original signal required by the pixel circuit can be shared, and a quantity of signals required to drive the pixel circuit is not increased, thereby simplifying a design of the driving chip.

Figure 25:
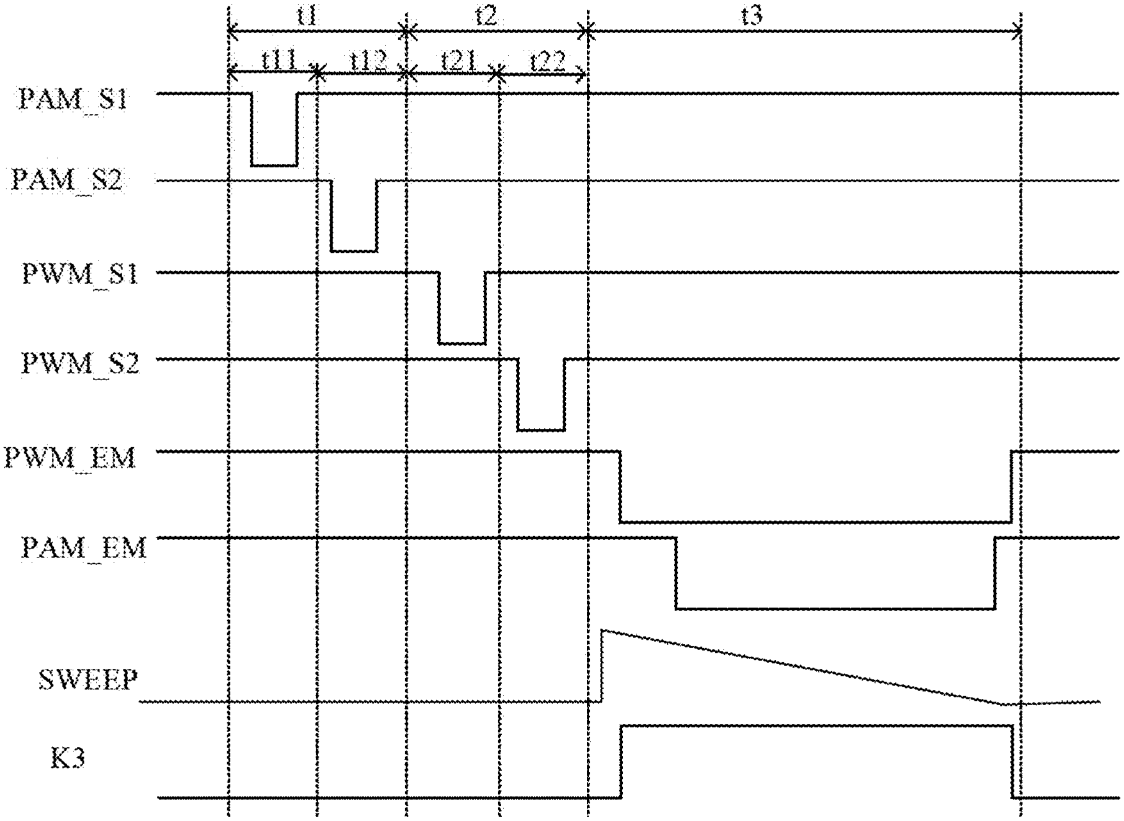
FIG. 25 is a signal timing diagram according to another embodiment of the present disclosure.

FIG. 25 is a signal timing diagram according to another embodiment of the present disclosure. The signal timing provided in FIG. 25 can be used to drive the pixel circuit provided in the embodiment of FIG. 24. In some embodiments of the present disclosure, as shown in FIG. 25, the third control signal K3 and the first light-emitting control signal PWM-EM received by the gate of the first control transistor M6 are mutually phase-inverted signals. In this way, generation of the third control signal K3 can be facilitated, and a design of the driving chip can be simplified.

Figure 26:
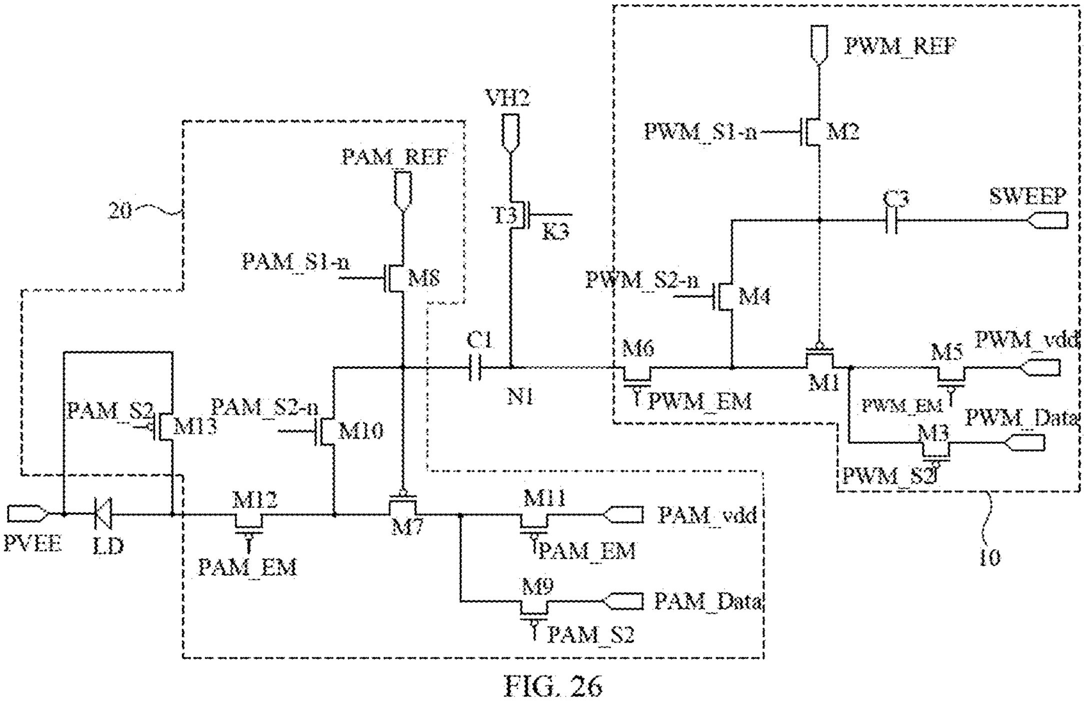
FIG. 26 is a schematic diagram of a pixel circuit according to another embodiment of the present disclosure.

FIG. 26 is a schematic diagram of a pixel circuit according to another embodiment of the present disclosure. In some embodiments of the present disclosure, as shown in FIG. 26, one of the first control transistor M6 and the third transistor T3 is a p-type transistor and the other is an n-type transistor. The gate of the first control transistor M6 receives the third control signal K3. In other words, the gate of the first control transistor M6 and the gate of the third transistor T3 receive a same signal. When the third control signal K3 is at an enable level to control the first control transistor M6 to be turned on, the third control signal K3 controls the third control transistor T3 to be turned off. When the third control signal K3 is in at an enable level to control the third transistor T3 to be turned on, the third control signal K3 controls the first control transistor M6 to be turned off.

FIG. 26 illustrates that the first control transistor M6 is a p-type transistor, and the third transistor T3 is an n-type transistor. FIG. 26 further illustrates that the first gate reset transistor M2 and the first compensation transistor M4 are n-type transistors, and the second gate reset transistor M8 and the second compensation transistor M10 are n-type transistors. The gate of the first gate reset transistor M2 receives a fifth scan signal PWM-S1-*n*, the gate of the first compensation transistor M4 receives a sixth scan signal PWM-S2-*n*, the gate of the second gate reset transistor M8 receives a seventh scan signal PAM-S1-*n*, and the gate of the second compensation transistor M10 receives an eighth scan signal PAM-S2-*n*. In some embodiments of the present disclosure, a drain current to the gate of the second driving transistor M1 can be reduced when the first gate reset transistor M2 and the first compensation transistor M4 are turned off, and a drain current to the gate of the first driving transistor M7 can be also reduced when the second gate reset transistor M8 and the second compensation transistor M10 are turned off. On this basis, one of the first control transistor M6 and the third transistor T3 is set to be an n-type transistor, and no new process is needed.

Figure 27:
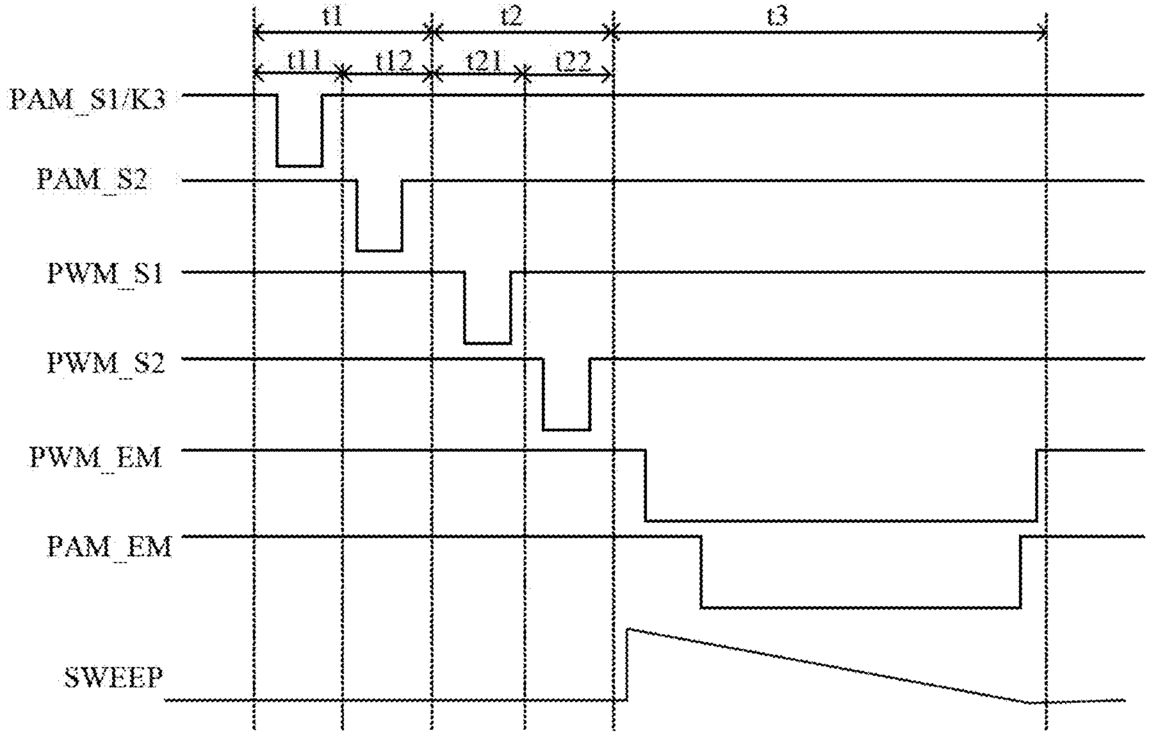
FIG. 27 is a signal timing diagram according to another embodiment of the present disclosure.

In some embodiments of the present disclosure, the gate of the second gate reset transistor M8 and the gate of the third transistor T3 receive a same signal. In other words, the gate of the second gate reset transistor M8 receives the third control signal K3. FIG. 27 is a signal timing diagram according to another embodiment of the present disclosure. The signal timing provided in FIG. 27 can be used to drive the pixel circuit provided in FIG. 24. As shown in FIG. 27, in the gate reset stage t11 in which the second driving circuit 20 operates, the third control signal K3 is at an enable level to control the third transistor T3 to be turned on, to connect the first node N1 to the second constant-voltage signal line VH2, so that the potential of the first node N1 is stabilized and the first node N1 is reset. When the third control signal K3 controls the second gate reset transistor M8 to be turned on to reset a gate of the second driving transistor M7, the first capacitor C1 can serve as a storage capacitor.

Figure 28:
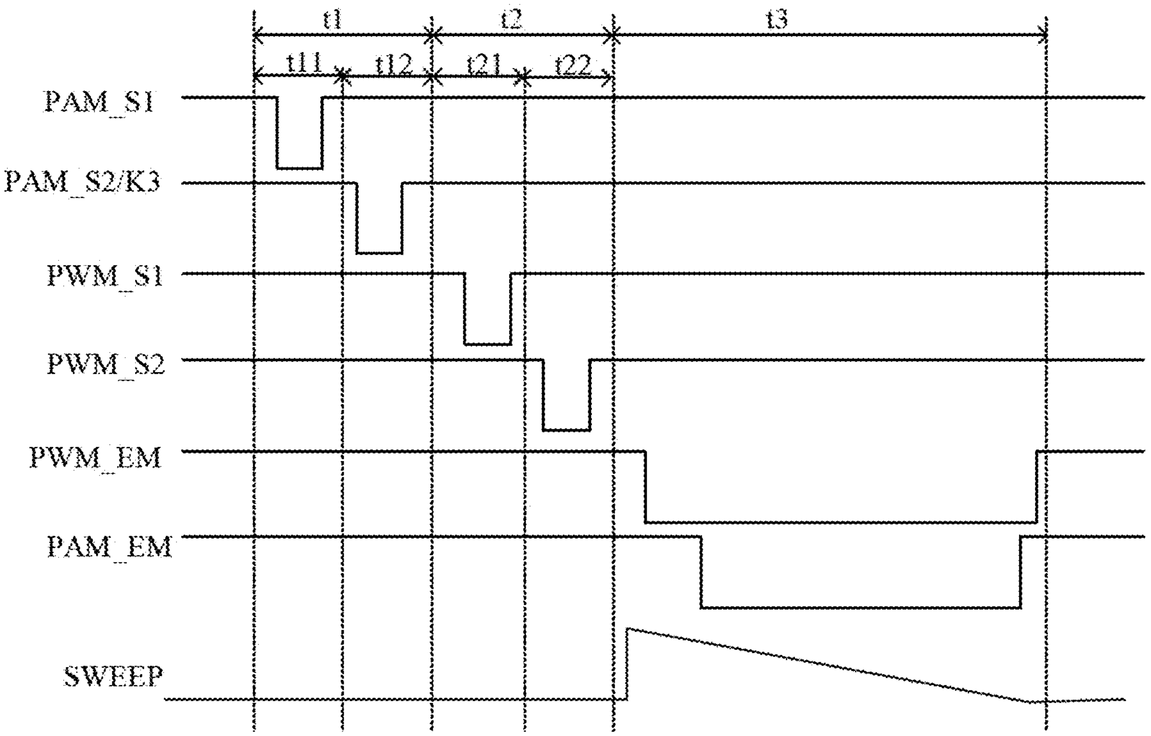
FIG. 28 is a signal timing diagram according to another embodiment of the present disclosure.

In some embodiments of the present disclosure, the gate of the second data writing transistor M9 and the gate of the third transistor T3 receive a same signal. In other words, the gate of the second data writing transistor M9 receives the third control signal K3. FIG. 28 is a signal timing diagram according to another embodiment of the present disclosure. The signal timing provided in FIG. 28 can be used to drive the pixel circuit provided in FIG. 24. As shown in FIG. 28, in the data writing stage t12 in which the second driving circuit 20 operates, the third control signal K3 is at an enable level to control the third transistor T3 to be turned on, to connect the first node N1 to the second constant-voltage signal line VH2, so that the potential of the first node N1 is stabilized and the first node N1 is reset. When the third control signal K3 controls the second data writing transistor M9 to be turned to write the second data signal PAM-Data into the gate of the second driving transistor M7, the first capacitor C1 can serve as a storage capacitor.

Figure 29:
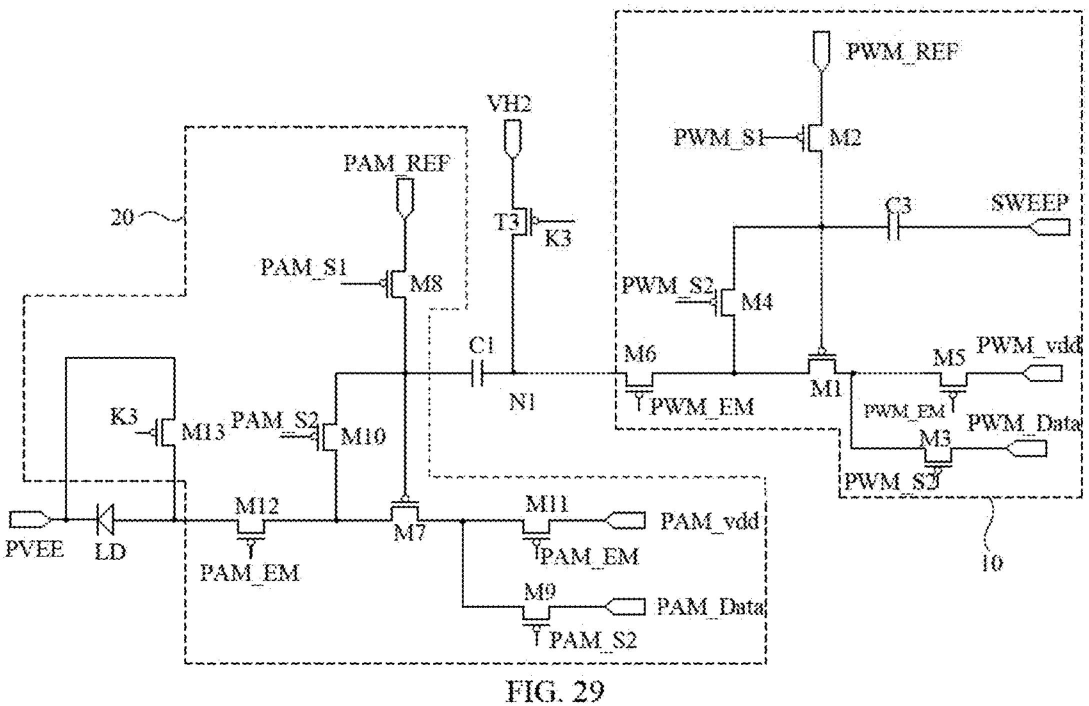
FIG. 29 is a schematic diagram of a pixel circuit according to another embodiment of the present disclosure.
Figure 30:
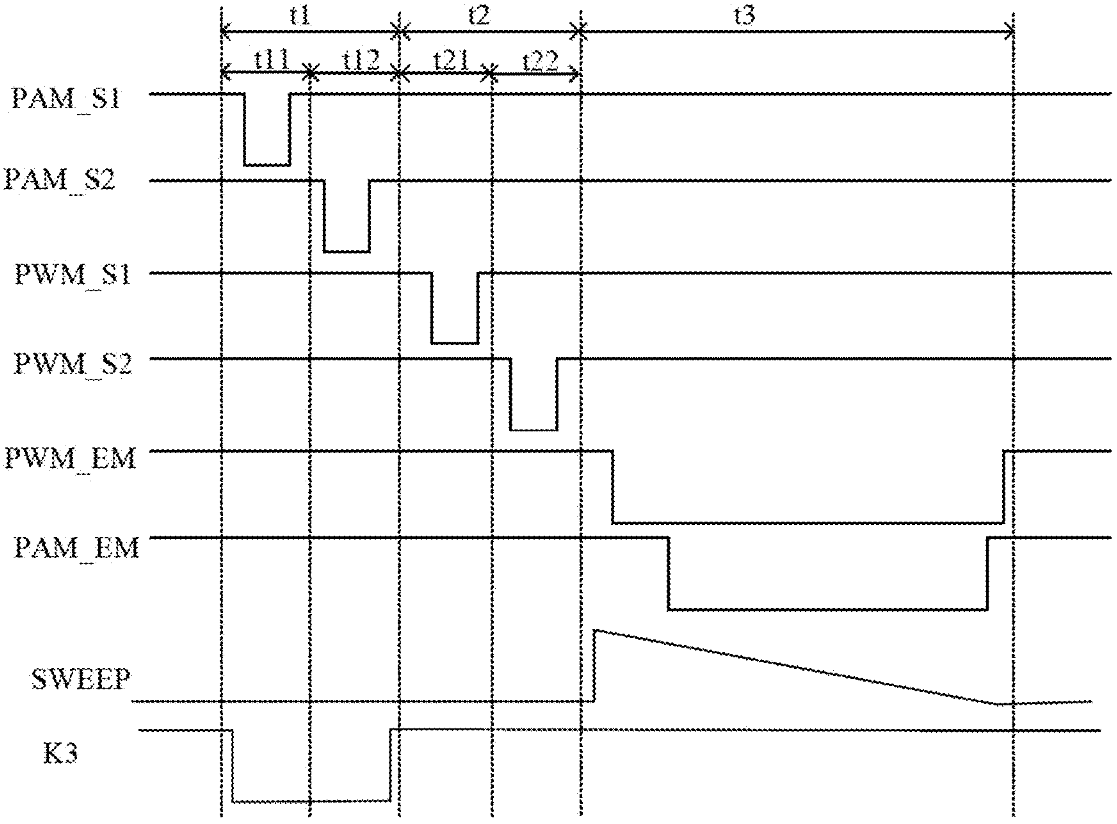
FIG. 30 is a signal timing diagram according to another embodiment of the present disclosure.

FIG. 29 is a schematic diagram of a pixel circuit according to another embodiment of the present disclosure. FIG. 30 is a signal timing diagram according to another embodiment of the present disclosure. The signal timing provided in FIG. 30 can be used to drive the pixel circuit provided in FIG. 29. In some embodiments of the present disclosure, as shown in FIG. 29, the gate of the electrode reset transistor M13 receives the third control signal K3. In other words, the gate of the electrode reset transistor M13 and the gate of the third transistor T3 receive a same signal. As shown in FIG. 30, in the first input stage t1 in which the second driving circuit 20 operates, the third control signal K3 is at an enable level to control the electrode reset transistor M13 to be turned on, to reset the electrode of the light-emitting element LD. In addition, the third control signal K3 is at an enable level to control the third transistor T3 to be turned on, to connect the first node N1 to the second constant-voltage signal line VH2, so that the potential of the first node N1 is stabilized and the first node N1 is reset. In this way, in both the gate reset stage t11 and the data writing stage t12 in which the second driving circuit 20 operates, the first capacitor C1 can serve as a storage capacitor.

In some embodiments of the present disclosure, the second driving circuit 20 includes a data writing circuit. The data writing circuit is configured to write the second data signal PAM-Data into the second driving circuit 20 under control of a control terminal signal of the data writing circuit; and the data writing circuit includes the second data writing transistor M9 and the second compensation transistor M10 illustrated in FIG. 24. The second driving circuit 20 further includes a second gate reset transistor M8 and an electrode reset transistor M13. The second gate reset transistor M8 is connected to the gate of the first driving transistor M7, and the electrode reset transistor M13 is connected to the light-emitting element LD. A width and a length of a channel of the third transistor T3 are respectively the same as a width and a length of a channel of at least one of the second data writing transistor M9, the second compensation transistor M10, the second gate reset transistor M8, and the electrode reset transistor M13. In this way, a characteristic of the third transistor T3 is basically the same as a switching characteristic of at least one of the foregoing transistors. Two transistors with a same channel width and length may be turned off under control of a same voltage (referred to as a same voltage value), or may be turned on under control of a same voltage. Therefore, transistors with a same switching characteristic may be controlled by using a same signal. For example, if the width and the length of the channel of the third transistor T3 are respectively the same as a width and a length of a channel of the second gate reset transistor M8, the gate of the third transistor T3 and the gate of the second gate reset transistor M8 may be set to receive the third control signal K3. In this case, both the third transistor T3 and the second gate reset transistor M8 may be p-type transistors, or both may be n-type transistors. For another example, if the width and the length of the channel of the third transistor T3 are respectively the same as a width and a length of a channel of the second data writing transistor M9, the gate of the third transistor T3 and the gate of the second data writing transistor M9 may be set to receive the third control signal K3.

Figure 31:
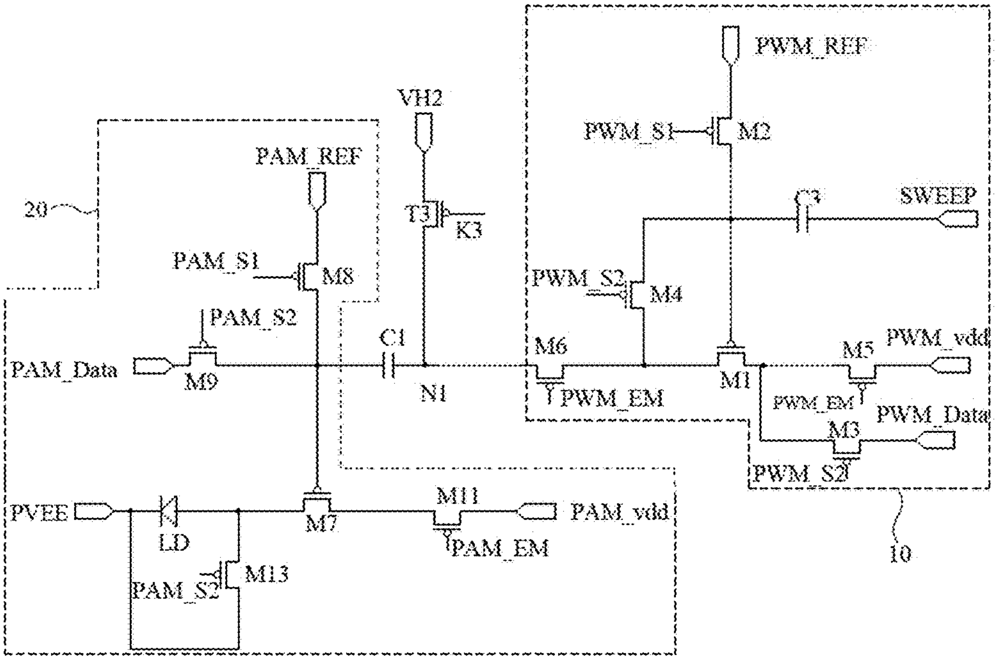
FIG. 31 is a schematic diagram of a pixel circuit according to another embodiment of the present disclosure.

FIG. 31 is a schematic diagram of a pixel circuit according to another embodiment of the present disclosure. In some embodiments of the present disclosure, as shown in FIG. 31, the second driving circuit 20 includes a first driving transistor M7, a second data writing transistor M9, a second gate reset transistor M8, and an electrode reset transistor M13. The second data writing transistor M9 is configured to write the second data signal PAM-Data into the second driving circuit 20 under control of a gate signal of the second data writing transistor M9. The second data writing transistor M9 and the second gate reset transistor M8 are separately connected to a gate of the first driving transistor M7, and the electrode reset transistor M13 is connected to the light-emitting element. A width and a length of a channel of the third transistor T3 are respectively the same as a width and a length of a channel of at least one of the second data writing transistor M9, the second gate reset transistor M8, and the electrode reset transistor M13. In this way, a characteristic of the third transistor T3 is basically the same as a characteristic of at least one of the foregoing transistors, and transistors with a same characteristic may be controlled by using a same signal.

It should be noted that, in some embodiments of the present disclosure, circuit structures of the first driving circuit 10 and the second driving circuit 20 are similar, and the two circuits include a driving transistor, a data writing transistor, a gate reset transistor, a compensation transistor, and a light-emitting control transistor. In a specific embodiment, for example, the first driving circuit 10 includes the second driving transistor M1, the first gate reset transistor M2, the first data writing transistor M3, the first compensation transistor M4, the first control transistor M6, and the third control transistor M5. The second driving circuit 20 includes the first driving transistor M7, the second gate reset transistor M8, the second data writing transistor M9, the second compensation transistor M10, the second control transistor M11, and the fourth control transistor M12.

Figure 32:
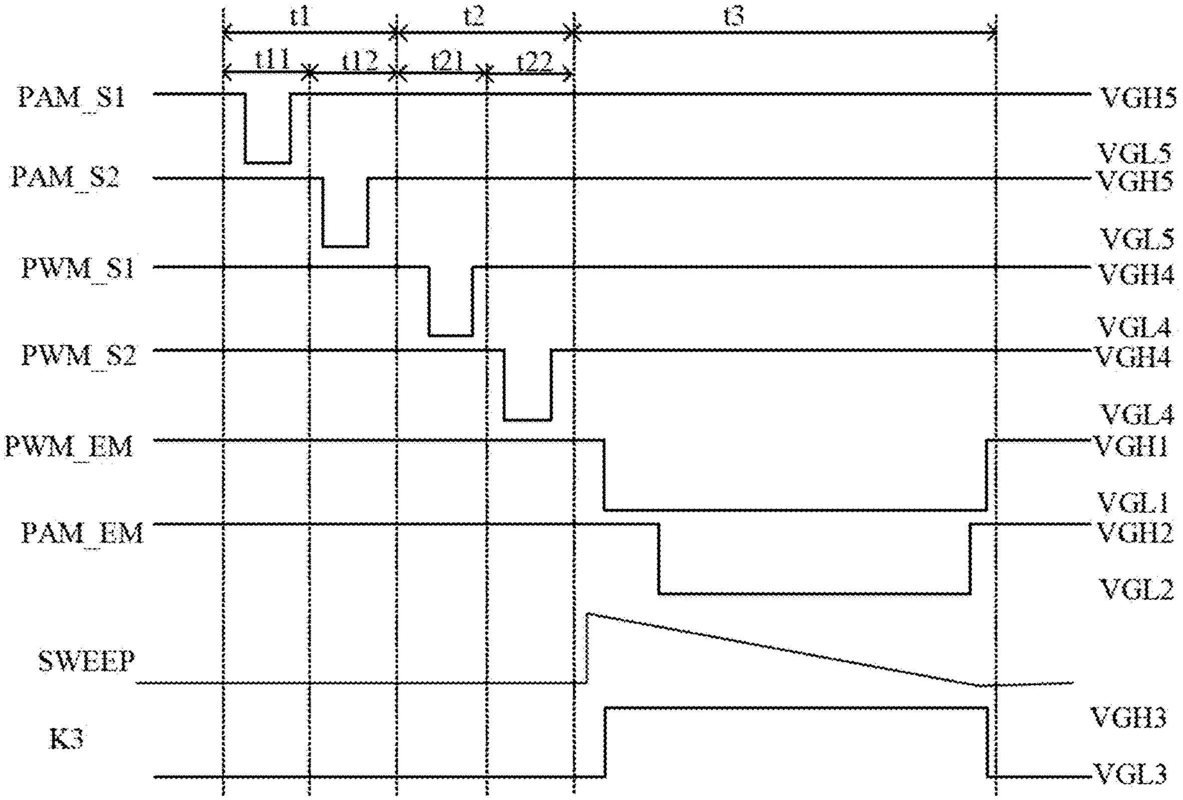
FIG. 32 is a signal timing diagram according to another embodiment of the present disclosure.

FIG. 32 is a signal timing diagram according to another embodiment of the present disclosure, which can be used to drive the pixel circuit shown in FIG. 24. In some embodiments of the present disclosure, referring to FIG. 24, the first driving circuit 10 includes a second driving transistor M1 and a first control transistor M6. The first control transistor M6 is connected between the first node N1 and the second driving transistor M1, and a gate of the first control transistor M6 receives a first light-emitting control signal PWM-EM. The second driving circuit 20 includes a first driving transistor M7 and a fourth control transistor M12. The fourth control transistor M12 is connected between the light-emitting element LD and the first driving transistor M7, and a gate of the fourth control transistor M12 receives a second light-emitting control signal PAM-EM. A high-level voltage value VGH1 of the first light-emitting control signal PWM-EM is different from a high-level voltage value VGH2 of the second light-emitting control signal PAM-EM and/or a low-level voltage value VGL1 of the first light-emitting control signal PWM-EM is different from a low-level voltage value VGL2 of the second light-emitting control signal PAM-EM. A high-level voltage value VGH3 of the third control signal K3 is the same as the high-level voltage value VGH1 of the first light-emitting control signal PWM-EM, and a low-level voltage value VGL3 of the third control signal is the same as the low-level voltage value VGL1 of the first light-emitting control signal PWM-EM. In FIG. 32, only optional timing of the third control signal K3 is illustrated.

In some embodiments of the present disclosure, differential setting is performed on high-level or low-level voltage values of light-emitting control signals separately required by the first driving circuit 10 and the second driving circuit 20, so that control transistors in the two driving circuits can be precisely controlled, operating stability of the pixel circuit can be improved, and a display failure risk can be reduced. In addition, high-level or low-level voltage values of the third control signal K3 and the first light-emitting control signal PWM-EM are set to be equal, which may be combined with the scheme in which the length and the width of the channel of the third transistor T3 are respectively the same as a length and a width of a channel of the first control transistor M6. In this way, a characteristic of the third transistor T3 is basically the same as a characteristic of the first control transistor M6. Further, the third control signal K3 and the first light-emitting control signal PWM-EM are set to be mutually phase-inverted signals, so that it can be ensured that the third transistor T3 plays a role of stabilizing the potential of the first node N1 in some periods, without affecting an output signal of the output terminal of the first driving circuit 10. In addition, generation of the third control signal K3 can be facilitated, and a design of the driving chip can be simplified.

In some embodiments of the present disclosure, the first driving circuit 10 includes a first-type transistor, and the second driving circuit 20 includes a second-type transistor. Referring to FIG. 24, the first-type transistor in the first driving circuit 10 includes at least one of a first data writing transistor M3 and a first gate reset transistor M2. The first data writing transistor M3 is connected to a first electrode of the second driving transistor M1, and the first gate reset transistor M2 is connected to a gate of the second driving transistor M1. The second-type transistor in the second driving circuit 20 includes at least one of a second data writing transistor M9, a second gate reset transistor M8, and an electrode reset transistor M13. The second data writing transistor M9 is connected to a first electrode of the first driving transistor M7, the second gate reset transistor M8 is connected to a gate of the first driving transistor M7, and the electrode reset transistor M13 is connected to the light-emitting element LD.

A gate of the first-type transistor receives a first-type control signal, and a gate of the second-type transistor receives a second-type control signal. Referring to FIG. 32, an example in which the gates of the first data writing transistor M3 and the first gate reset transistor M2 all receive the first-type control signal, and the gates of the second data writing transistor M9, the second gate reset transistor M8, and the electrode reset transistor M13 all receive the second-type control signal is used. The first-type control signal includes a third scan signal PWM-S1 and a fourth scan signal PWM-S2, and the second-type control signal includes a first scan signal PAM-S1 and a second scan signal PAM-S2.

A high-level voltage value VGH4 of the first-type control signal is different from a high-level voltage value VGH5 of the second-type control signal and/or a low-level voltage value VGL4 of the first-type control signal is different from a low-level voltage value VGL5 of the second-type control signal. A high-level voltage value VGH3 of the third control signal K3 is the same as the high-level voltage value VGH5 of the second-type control signal, and a low-level voltage value VGL3 of the third control signal K3 is the same as the low-level voltage value VGL5 of the second-type control signal.

In some embodiments of the present disclosure, differential setting is performed on high-level or low-level voltage values of scan signals separately required by the first driving circuit 10 and the second driving circuit 20, so that transistors in the two driving circuits can be precisely controlled by using scan signals, operating stability of the pixel circuit can be improved, and a display failure risk can be reduced. In addition, high-level or low-level voltage values of the third control signal K3 and the second-type control signal are set to be equal. With reference to the design of the length and the width of the channel of the third transistor T3, the length and the width of the channel of the third transistor T3 may be set to be the same as a length and a width of a channel of the second-type transistor. In this way, a characteristic of the third transistor T3 is basically the same as a characteristic of the second-type transistor. Further, the third control signal K3 and the second-type control signal may be set to be a same signal, so that it can be ensured that the third transistor T3 plays a role of stabilizing the potential of the first node N1 in some periods, without affecting an output signal of the output terminal of the first driving circuit 10. For example, when the second-type transistor includes the second data writing transistor M9, if the length and the width of the channel of the third transistor T3 are set to be the same as a length and a width of a channel of the second data writing transistor M9, both the gate of the second data writing transistor M9 and the gate of the third transistor T3 may be set to receive the third control signal K3.

Figure 33:
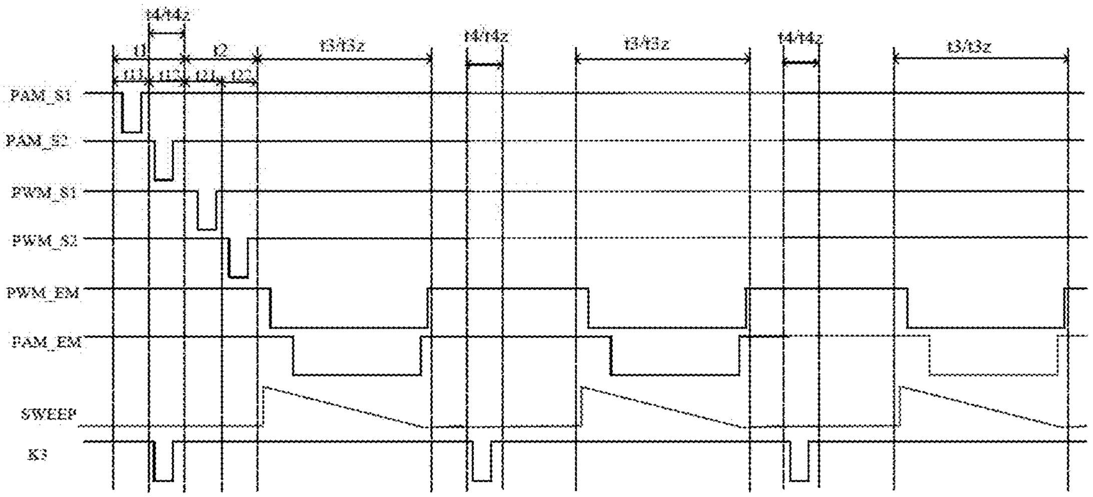
FIG. 33 is a signal timing diagram according to another embodiment of the present disclosure.

FIG. 33 is a signal timing diagram according to another embodiment of the present disclosure, which can be used to drive the pixel circuit shown in FIG. 29. In some embodiments of the present disclosure, as shown in FIG. 33, an operating cycle of the pixel circuit includes a light-emitting stage t3 and a reset stage t4. The reset stage t4 includes N reset sub-stages t4*z* that are set sequentially, and the light-emitting stage t3 includes M light-emitting sub-stages t3*z* that are set sequentially. A first reset sub-stage t4*z* is before a first light-emitting sub-stage t3*z*, two adjacent light-emitting sub-stages t3*z* include the reset sub-stage t4*z*, and both N and M are positive integers. Optionally, N and M are the same. FIG. 33 illustrates that N=M=3.

Referring to FIG. 29 and FIG. 33, in the reset sub-stage t4*z*, the third control signal K3 provides an enable level to control the third transistor T3 to be turned on, to connect the first node N1 to the second constant-voltage signal line VH2, so that the first node N1 can be reset.

In a light-emitting sub-stage t3*z*, the first light-emitting control signal PWM-EM provides an enable level, and the second light-emitting control signal PAM-EM also provides an enable level. The second light-emitting control signal PAM-EM provides an enable level to control the second control transistor M11 and the fourth control transistor M12 to be turned on, and the first driving transistor M7 generates the driving current under control of the gate voltage of the first driving transistor M7, so that the second driving circuit 20 provides the driving current for the light-emitting element LD. The first light-emitting control signal PWM-EM provides an enable level to control the first control transistor M6 and the third control transistor M5 to be turned on, and at the same time, a voltage value of a sweep signal SWEEP gradually changes and a voltage of the gate of the second driving transistor M1 changes through a coupling action. When the second driving transistor M1 is turned on, the first driving circuit 10 provides the control current for the first plate of the first capacitor C1, so that the voltage of the first plate of the first capacitor C1 changes, and the gate voltage of the first driving transistor M7 changes through a coupling action of the first capacitor C1. Therefore, the first driving transistor M7 is turned off, so that the second driving circuit 20 stops providing the driving current for the light-emitting element LD.

Two adjacent light-emitting sub-stages t3*z* are set to include the reset sub-stage t4*z*, so that there is a non-light-emitting period between two actual light-emitting stages of the light-emitting element LD. Therefore, after the second data signal PAM-Data is written once, the pixel circuit can control the light-emitting element LD to emit light several times, so that flickering of a screen can be reduced, and more driving manners can be adapted. Before the first light-emitting sub-stage t3*z*, the second input stage t2 of the first driving circuit 10 and the first input stage t1 of the second driving circuit 20 are completed. The first reset sub-stage t4*z* is set to be earlier than the first light-emitting sub-stage t3*z*, so that the first node N1 can be reset and the potential of the first node N1 can be stabilized through the first reset sub-stage t4*z*, and the first capacitor C1 can serve as a storage capacitor of the second driving circuit 20.

In some embodiments of the present disclosure, with reference to FIG. 29 and FIG. 33, the gate of the electrode reset transistor M13 receives the third control signal K3. In the reset sub-stage t4*z*, the gate of the electrode reset transistor M13 receives an enable level of the third control signal K3, and the electrode reset transistor M1 is turned on to reset the electrode of the light-emitting element LD. In some embodiments of the present disclosure, in the reset sub-stage t4*z*, the first node N1 is reset and the electrode of the light-emitting element LD is also reset, so that the light-emitting element LD can be controlled to emit light several times.

FIG. 29 illustrates that the gate of the electrode reset transistor M13 and the gate of the third transistor T3 receive a same signal. In some embodiments of the present disclosure, the gate of the electrode reset transistor M13 and the gate of the third transistor T3 receive different signals, and the electrode reset transistor M13 can also be controlled to reset the electrode of the light-emitting element LD in the reset sub-stage t4*z*. The following will be described in detail.

In some embodiments of the present disclosure, the second driving circuit 20 includes a second data writing module, and the second data writing module is configured to write the second data signal PAM-Data into the second driving circuit 20 under control of the second scan signal PAM-S2. The second data writing module may include the second data writing transistor M9 and the second compensation transistor M10 illustrated in FIG. 29, and the second data writing module may also include the second data writing transistor M9 illustrated in FIG. 31.

The operating cycle of the pixel circuit further includes a first gate reset stage and a first data writing stage that are set sequentially. The first gate reset stage is the gate reset stage t11 in which the second driving circuit 20 operates, and the first data writing stage is the data writing stage t12 in which the second driving circuit 20 operates. Referring to FIG. 33, in the gate reset stage t11 in which the second driving circuit 20 operates, the first scan signal PAM-S1 is at an enable level to control the second gate reset transistor M8 to be tuned on, to reset the gate of the first driving transistor M7. In the data writing stage t12 in which the second driving circuit 20 operates, the second scan signal PAM-S2 is at an enable level to control the second data writing module to be turned on, to write the second data signal PAM-Data into the second driving circuit 20. The first reset sub-stage t4*z* covers the data writing stage t12 in which the second driving circuit 20 operates. In this stage, the third transistor T3 is turned on to connect the second constant-voltage signal line VH2 to the first node N1, so as to reset the first node N1 and stabilize the potential of the first node N1, so that the first capacitor C1 can serve as a storage capacitor of the second driving circuit 20, thereby ensuring writing accuracy of the second data signal PAM-Data.

In some embodiments of the present disclosure, the first reset sub-stage t4*z* covers the gate reset stage t11 in which the second driving circuit 20 operates, that is, covers the first gate reset stage. In the gate reset stage t11, the third transistor T3 is turned on to connect the second constant-voltage signal line VH2 to the first node N1, so as to reset the first node N1 and stabilize the potential of the first node N1, so that the first capacitor C1 can serve as a storage capacitor of the second driving circuit 20, thereby ensuring that the second driving transistor M7 is completely reset.

Figure 34:
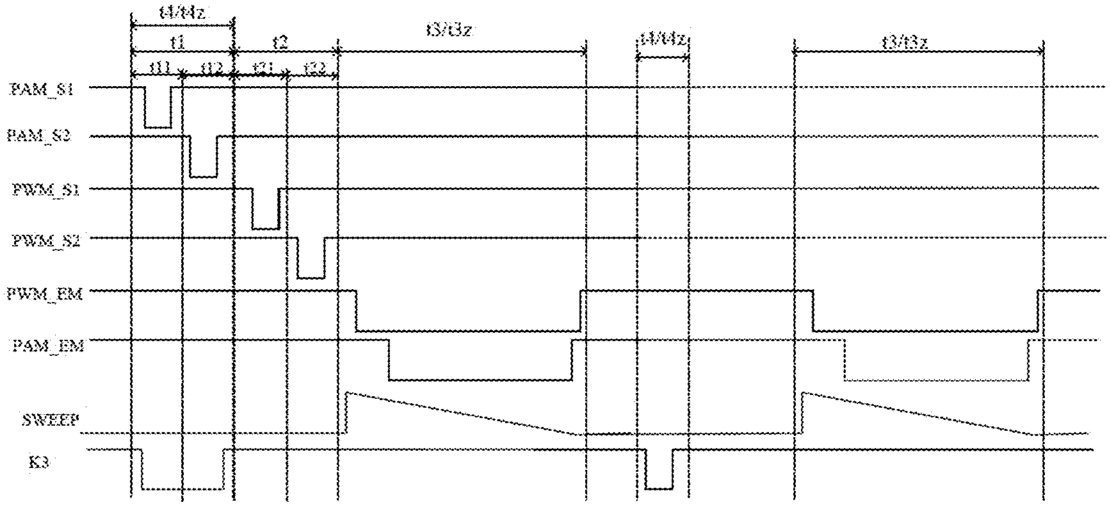
FIG. 34 is a signal timing diagram according to another embodiment of the present disclosure.

FIG. 34 is a signal timing diagram according to another embodiment of the present disclosure, which can be used to drive the pixel circuit shown in FIG. 29. In some embodiments of the present disclosure, as shown in FIG. 34, the first reset sub-stage t4*z* covers the gate reset stage t11 in which the second driving circuit 20 operates and the data writing stage t12 in which the second driving circuit 20 operates, that is, the first reset sub-stage t4*z* covers the first gate reset stage and the first data writing stage. In other words, the first reset sub-stage t4*z* covers the first input stage t1 in which the second driving circuit 10 operates. FIG. 34 illustrates that a pulse width of an enable level of a third control signal K3 in the first reset sub-stage t4*z* is greater than a pulse width of an enable level of a third control signal K3 in a remaining reset sub-stages t4*z*. A pulse width of an enable level is duration of the enable level. In some embodiments of the present disclosure, pulse widths of enable levels of third control signal K3*s* in the reset sub-stages t4*z* are equal.

In some embodiments of the present disclosure, a pulse width of an enable level of the reset sub-stage t4*z* is equal to a pulse width of an enable level of the second scan signal PAM-S2, or the pulse width of the enable level of the reset sub-stage t4*z* is greater than the pulse width of the enable level of the second scan signal PAM-S2. In some embodiments of the present disclosure, the pulse width of the enable level of the reset sub-stage t4*z* is greater than a sum of the pulse width of the enable level of the second scan signal PAM-S2 and a pulse width of an enable level of the first scan signal PAM-S1.

In some embodiments of the present disclosure, the pulse width of the enable level of the reset sub-stage t4*z* is equal to a pulse width of an enable level of the fourth scan signal PWM-S2, or the pulse width of the enable level of the reset sub-stage t4*z* is greater than the pulse width of the enable level of the fourth scan signal PWM-S2. In some embodiments of the present disclosure, the pulse width of the enable level of the reset sub-stage t4*z* is greater than a sum of the pulse width of the enable level of the fourth scan signal PWM-S2 and a pulse width of an enable level of the third scan signal PWM-S1.

In some embodiments, the pulse width of the enable level of the reset sub-stage t4*z* is smaller than one half of a pulse width of an enable level of the first light-emitting control signal PWM-EM and/or the pulse width of the enable level of the reset sub-stage t4*z* is smaller than one half of a pulse width of an enable level of the first light-emitting control signal PWM-EM.

In some embodiments of the present disclosure, the first driving circuit includes a first data writing module. A control terminal of the first data writing module receives the fourth scan signal PWM-S2, and the first data writing module is configured to write the first data signal into the first driving circuit under control of a control terminal voltage of the first data writing module. The first data writing module includes the first data writing transistor M3 illustrated in FIG. 29. The first gate reset transistor M2 is connected to the gate of the second driving transistor M1, and the gate of the first gate reset transistor M2 receives the third scan signal PWM-S1.

The operating cycle of the pixel circuit further includes a second gate reset stage and a second data writing stage that are set sequentially. The second gate reset stage is the gate reset stage t21 in which the first driving circuit 10 operates, and the second data writing stage is the data writing stage t22 in which the first driving circuit 10 operates.

Figure 35:
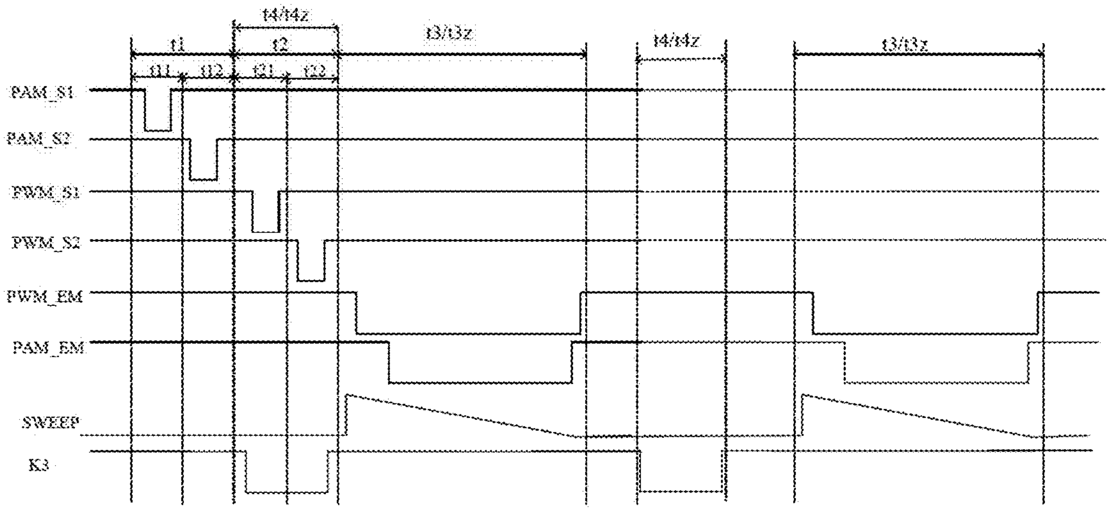
FIG. 35 is a signal timing diagram according to another embodiment of the present disclosure.

FIG. 35 is a signal timing diagram according to another embodiment of the present disclosure. As shown in FIG. 35, in the gate reset stage t21 in which the first driving circuit 10 operates, the third scan signal PWM-S1 is at an enable level to control the first gate reset transistor M2 to be tuned on, to reset the gate of the second driving transistor M1. In the data writing stage t22 in which the first driving circuit 10 operates, the fourth scan signal PWM-S2 is at an enable level to write the first data signal PWM-Data into the gate of the second driving transistor M1. The first reset sub-stage t4*z* covers the gate reset stage t21 and the data writing stage t22 in which the first driving circuit 10 operates, that is, the first reset sub-stage t4*z* covers the second gate reset stage and the second data writing stage. In other words, the first reset sub-stage t4*z* covers the second input stage t2 in which the first driving circuit 10 operates.

In some embodiments of the present disclosure, the first reset sub-stage t4*z* covers only the gate reset stage t21 in which the first driving circuit 10 operates. In some embodiments of the present disclosure, the first reset sub-stage t4*z* covers only the data writing stage t22 in which the first driving circuit 10 operates. In some embodiments of the present disclosure, the first reset sub-stage t4*z* covers the gate reset stage t21 and a part of the data writing stage t22 in which the first driving circuit 10 operates. No drawing is shown again herein.

In some embodiments of the present disclosure, the gate of the first gate reset transistor M2 in the first driving circuit 10 receives the third scan signal PWM-S1, and the control terminal of the first data writing module (refer to the description of the structure of the first data writing module in the foregoing related embodiment) receives the fourth scan signal PWM-S2. The gate of the second gate reset transistor M8 in the second driving circuit 20 receives the first scan signal PAM-S1, and the control terminal of the second data writing module (refer to the description of the structure of the second data writing module in the foregoing related embodiment) receives the second scan signal PAM-S2. A pulse width of an enable level of the third control signal K3 is greater than a pulse width of an enable level of at least one of the first scan signal PAM-S1, the second scan signal PAM-S2, the third scan signal PWM-S1, and the fourth scan signal PWM-S4. The enable level of the third control signal K3 controls the third transistor T3 to be turned on, to connect the second constant-voltage signal line VH2 to the first node N1. Therefore, the pulse width of the enable level of the third control signal K3 affects a maintenance time of stabilizing the potential of the first node N1. The pulse width of the enable level of the third control signal K3 is set to be related to the pulse width of at least one of the foregoing scan signals, so that a period of the enable level of the third control signal K3 is combined with a period of the enable level of the foregoing scan signal. For example, if the pulse width of the enable level of the third control signal K3 is set to be greater than the pulse width of the enable level of the second scan signal PAM-S2, and the period of the enable level of the third control signal K3 covers at least the data writing stage t22 in which the second driving circuit 20 operates, the third transistor T3 is turned on in the data writing stage t22 to stabilize the potential of the first node N1, so that the first capacitor C1 can serve as a storage capacitor of the second driving circuit 20, and accurate writing of the second data signal PAM-Data is ensured.

Figure 36:
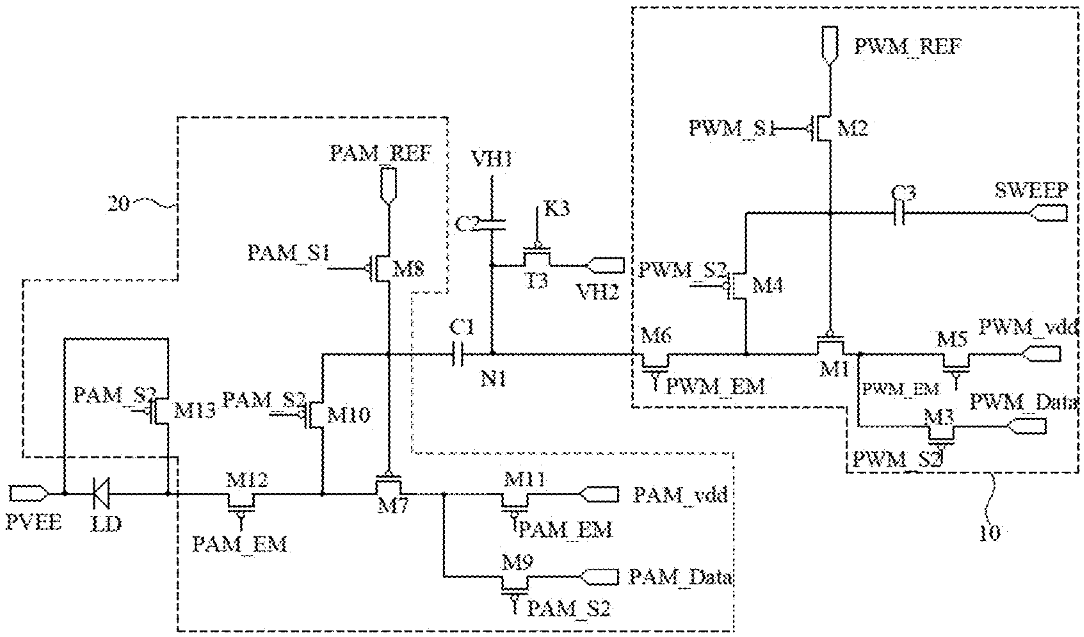
FIG. 36 is a schematic diagram of a pixel circuit according to another embodiment of the present disclosure.

FIG. 36 is a schematic diagram of a pixel circuit according to another embodiment of the present disclosure. In some embodiments of the present disclosure, as shown in FIG. 36, the pixel circuit includes the first driving circuit 10, the second driving circuit 20, the first capacitor C1, the second capacitor C2, and the third transistor T3. In some embodiments of the present disclosure, in at least a part of a period in which the potential of the first node N1 floats, the second capacitor C2 and the third transistor T3 can jointly stabilize the potential of the first node N1, thereby ensuring stable operating of the pixel circuit.

FIG. 36 illustrates that the gate of the third transistor T3 receives the third control signal K3, and the gate of the electrode reset transistor M13 receives the second scan signal PAM-S2. In some embodiments of the present disclosure, the gate of the electrode reset transistor M13 may receive the third control signal K3. With reference to the description of the reset sub-stage in the foregoing embodiment, it can be learned that in this case, the pixel circuit can emit light several times after the second data signal is input once, thereby improving the problem of display flickering.

Figure 37:
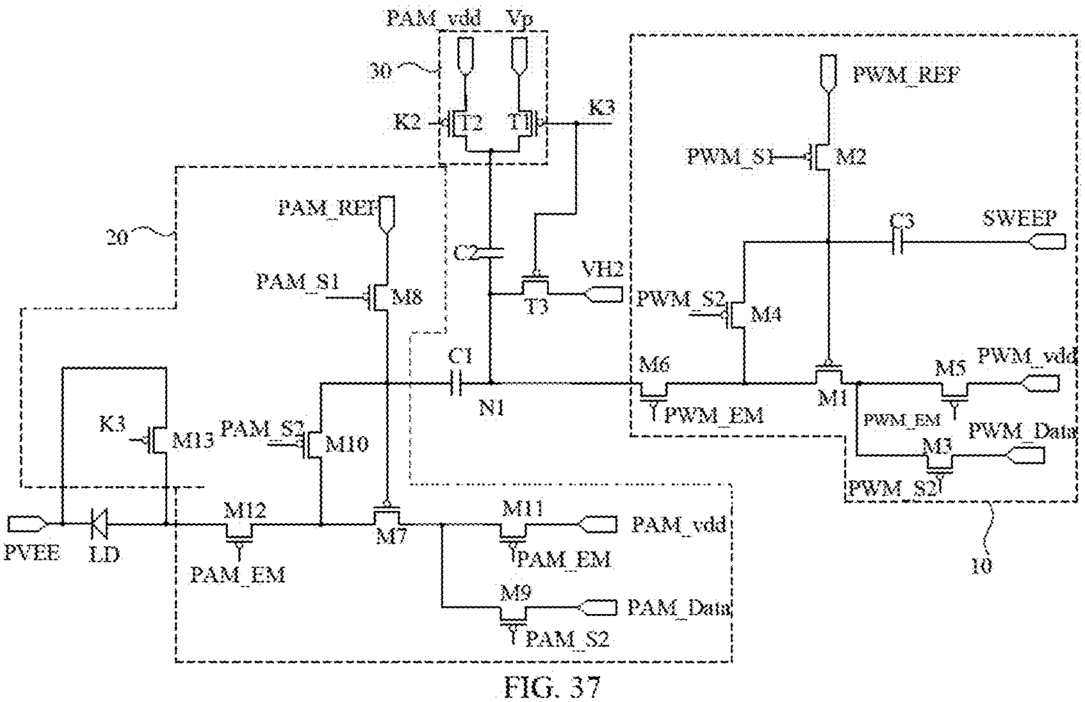
FIG. 37 is a schematic diagram of a pixel circuit according to another embodiment of the present disclosure.

FIG. 37 is a schematic diagram of a pixel circuit according to another embodiment of the present disclosure. In some embodiments of the present disclosure, as shown in FIG. 37, the pixel circuit includes the first driving circuit 10, the second driving circuit 20, the first capacitor C1, the second capacitor C2, the third transistor T3, and the compensation module 30. The second capacitor C2 is at least configured to stabilize the potential of the first node N1 in a period in which the potential of the first node N1 floats, and the second capacitor C2 includes the first plate electrically connected to the first node N1 and the second plate electrically connected to the compensation module 30. The gate of the first transistor T1 in the compensation module 30 receives the third control signal K3 and the gate of the second transistor T2 receives the second control signal K2. With reference to the description of the foregoing embodiment related to the compensation module 30, it can be learned that the compensation module 30 can compensate for a deviation of the first power voltage PAM-vdd that affects the driving current, so that the driving current is no longer affected by the deviation of the first power voltage PAM-vdd, thereby improving display uniformity. The pixel circuit provided in the embodiments of the present disclosure has better stability.

FIG. 37 further illustrates that the gate of the electrode reset transistor M13 receives the third control signal K3. With reference to the foregoing scheme related to a plurality of reset sub-stages and a plurality of light-emitting sub-stages, in the embodiment of FIG. 37, light can be emitted several times after the second data signal is input once.

Figure 38:
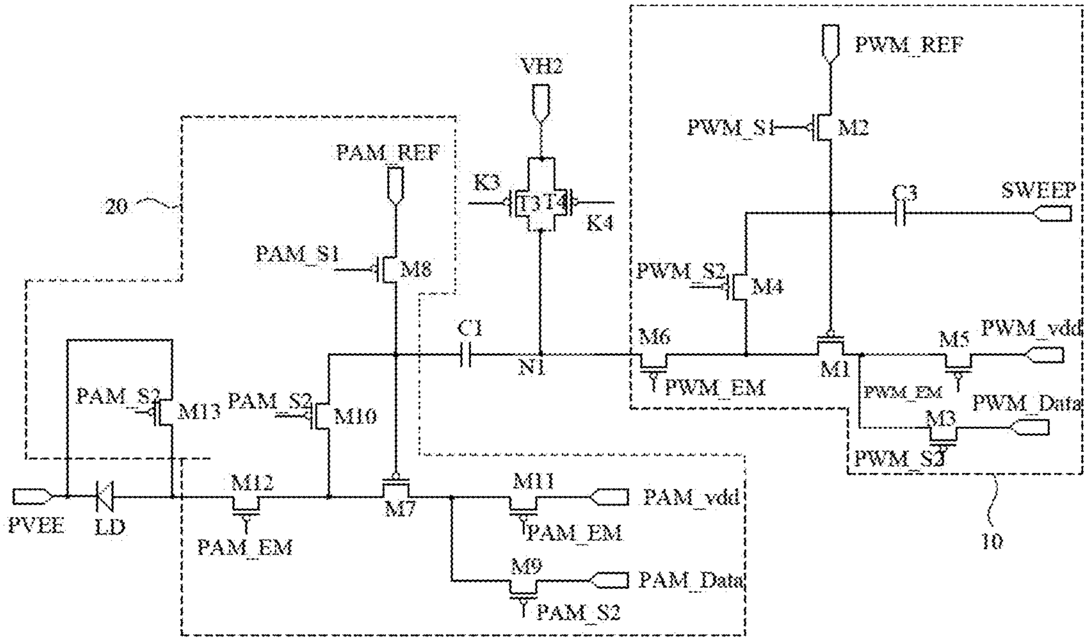
FIG. 38 is a schematic diagram of a pixel circuit according to another embodiment of the present disclosure.

FIG. 38 is a schematic diagram of a pixel circuit according to another embodiment of the present disclosure. In some embodiments of the present disclosure, as shown in FIG. 38, the pixel circuit includes the third transistor T3 and a fourth transistor T4. The gate of the third transistor T3 receives the third control signal K3. The fourth transistor T4 includes a gate configured to receive a fourth control signal K4, a first electrode connected to the second constant-voltage signal line VH2, and a second electrode connected to the first node N1. The third transistor T3 and the fourth transistor T4 are connected in parallel. The gate of the second gate reset transistor M8 in the second driving circuit 20 receives the first scan signal PAM-S1, and the gate of the second data writing transistor M9 receives the second scan signal PAM-S2. The fourth control signal K4 is the same as the first scan signal PAM-S1, and the second scan signal PAM-S2 is the same as the third control signal K3.

In this embodiment of FIG. 38, the signal timing provided in FIG. 4 may be used for driving. Referring to FIG. 4, in the gate reset stage t11 in which the first driving circuit 10 operates, the first scan signal PAM-S1 is at an enable level to control the second gate reset transistor M8 to reset the gate of the first driving transistor M7, and the fourth control signal K4 is at an enable level to control the fourth transistor T4 to be turned on, to connect the second constant-voltage signal line VH2 to the first node N1, so that not only the first node N1 can be reset, but also the first capacitor C1 can serve as a storage capacitor in this stage. In the data writing stage t12 in which the first driving circuit 10 operates, the second scan signal PAM-S2 is at an enable level to control to write the second data signal into the gate of the first driving transistor M7, and the third control signal K3 is at an enable level to control the third transistor T3 to be turned on, to connect the second constant-voltage signal line VH2 to the first node N1, so that not only the first node N1 can be reset, but also the first capacitor C1 can serve as a storage capacitor in this stage, thereby ensuring accuracy of data writing.

Figure 39:
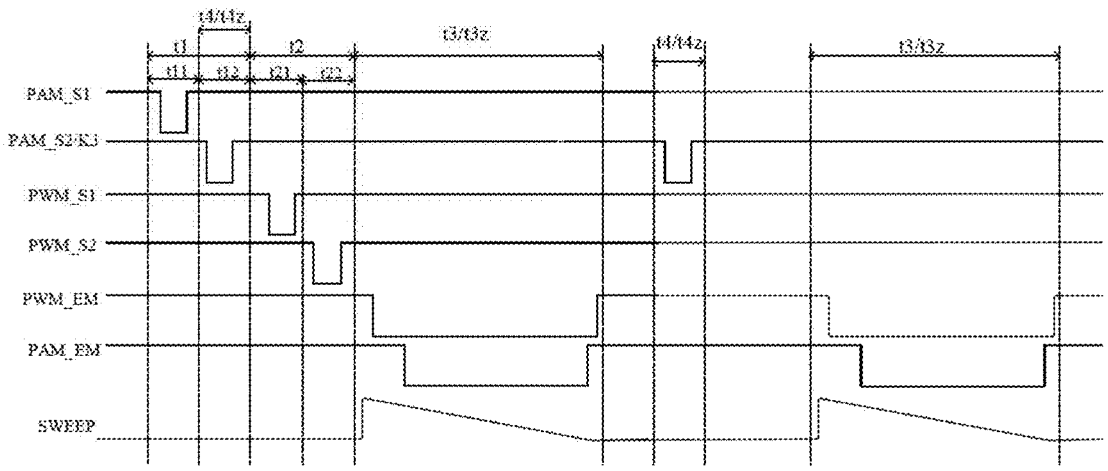
FIG. 39 is a signal timing diagram according to another embodiment of the present disclosure.

FIG. 39 is a signal timing diagram according to another embodiment of the present disclosure, which can be used to drive the pixel circuit shown in FIG. 24. In some embodiments of the present disclosure, as shown in FIG. 24, the gate of the second gate reset transistor M8 receives the first scan signal PAM-S1, and the gate of the second data writing transistor M9 receives the second scan signal PAM-S2.

Referring to FIG. 39, the third control signal K3 is the same as the second scan signal PAM-S2. That is, the gate of the third transistor T3 and the gate of the second data writing transistor M9 receive a same signal. Optionally, the gate of the third transistor T3 and the gate of the second data writing transistor M9 may be connected to a same signal line.

In the gate reset stage t11 in which the second driving circuit 20 operates, the first scan signal PAM-S1 is at an enable level to control the second gate reset transistor M8 to be turned on. In the data writing stage t12 in which the second driving circuit 20 operates, the second scan signal PAM-S2 controls the second data writing transistor M9 to be turned on. Because the third control signal K3 is the same as the second scan signal PAM-S2, the data writing stage t12 in which the second driving circuit 20 operates is the first reset sub-stage t4*z*. In this stage, the third control signal K3 controls the third transistor T3 to be turned on, to reset the first node N1 and maintain stability of the potential of the first node N1. In the reset sub-stage t4*z* after the first reset sub-stage t4*z*, the second scan signal PAM-S2 controls the second data writing transistor M9 to be turned on, and a new second data signal may not be written into the second driving circuit 20 in a manner of controlling a data line not to transmit the second data signal. In addition, in this stage, the third control signal K3 controls the third transistor T3 to be turned on, to reset the first node N1. In this way, the light-emitting element LD can be controlled to emit light several times after the second data signal is input once.

Figure 40:
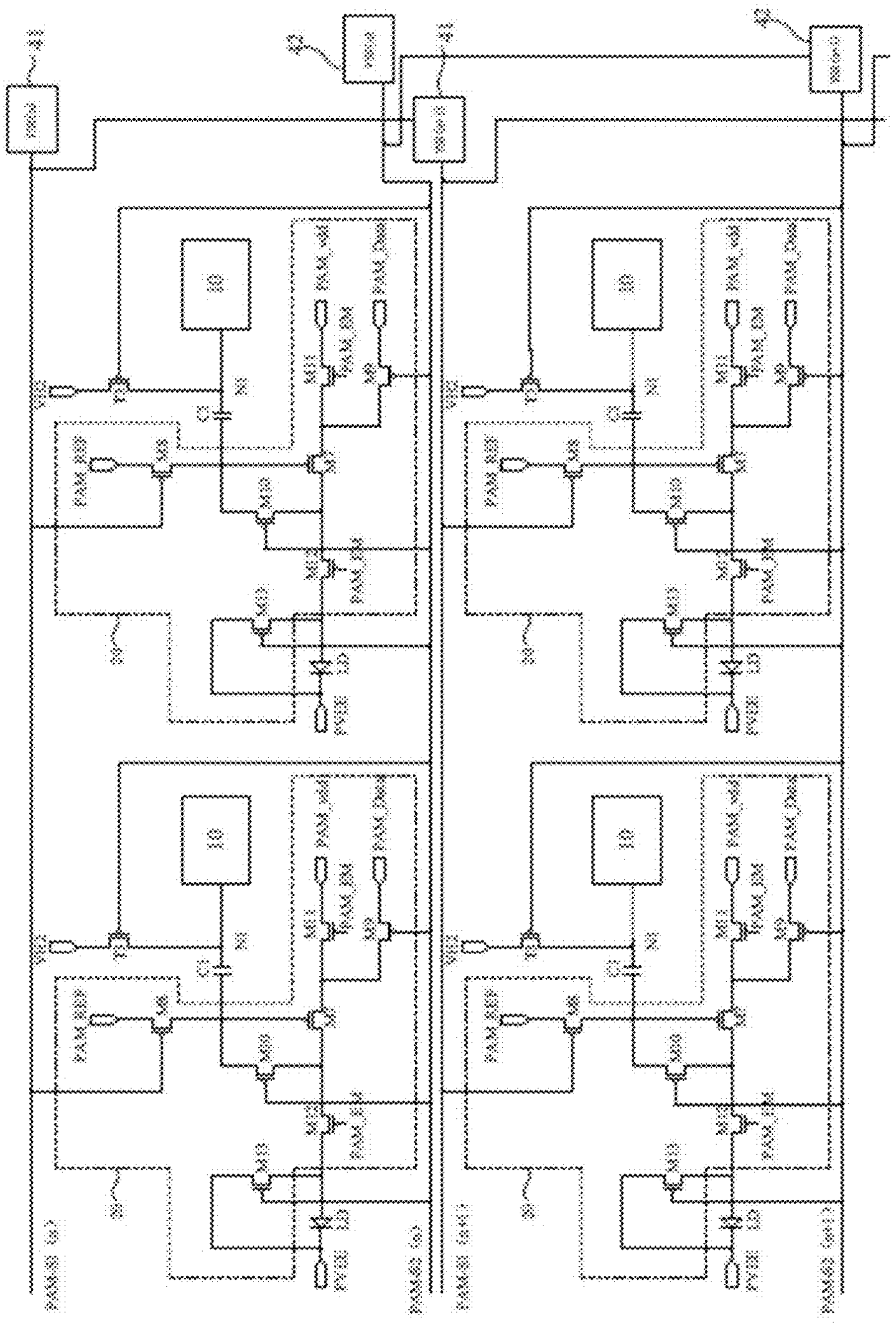
FIG. 40 is a schematic circuit diagram of a display panel according to an embodiment of the present disclosure.

In application to the display panel, the gate of the second gate reset transistor M8 is connected to a first scan signal line, and the first scan signal line provides the first scan signal PAM-S1; and the gate of the second data writing transistor M9 is connected to a second scan signal line, and the second scan signal line provides the second scan signal PAM-S2. FIG. 40 is a schematic circuit diagram of a display panel according to an embodiment of the present disclosure. FIG. 40 is only a simplified schematic diagram of the pixel circuit in the display panel. As shown in FIG. 40, a first scan driving circuit 41 and a second scan driving circuit 42 are disposed on the display panel, and each scan driving circuit includes a plurality of cascaded shift registers VSR. The figure illustrates an $n^{th}$-stage shift register VSR(n) and an $(n+1)^{th}$-stage shift register VSR(n+1) in the first scan driving circuit 41 and an $n^{th}$-stage shift register VSR(n) and an $(n+1)^{th}$-stage shift register VSR(n+1) in the second scan driving circuit 42, where n is a positive integer. The $n^{th}$-stage shift register VSR(n) in the first scan driving circuit 41 is connected to an $n^{th}$ first scan signal line PAM-S1(*n*), and the $(n+1)^{th}$-stage shift register VSR(n+1) is connected to an $(n+1)^{th}$ first scan signal line PAM-S1(*n*+1). The $n^{th}$-stage shift register VSR(n) in the second scan driving circuit 42 is connected to an $n^{th}$ second scan signal line PAM-S2(*n*), and the $(n+1)^{th}$-stage shift register VSR(n+1) is connected to an $(n+1)^{th}$ second scan signal line PAM-S2(*n*+1). That is, the first scan signal line is connected to an output terminal of a shift register in the first scan driving circuit 41, and the second scan signal line is connected to an output terminal of a shift register in the second scan driving circuit 42. In this way, the gate of the third transistor T3 and the gate of the second data writing transistor M9 can receive a same signal, and different scan driving circuits are used to provide scan signals, thereby reducing load on a scan signal line and improving display uniformity.

Figure 41:
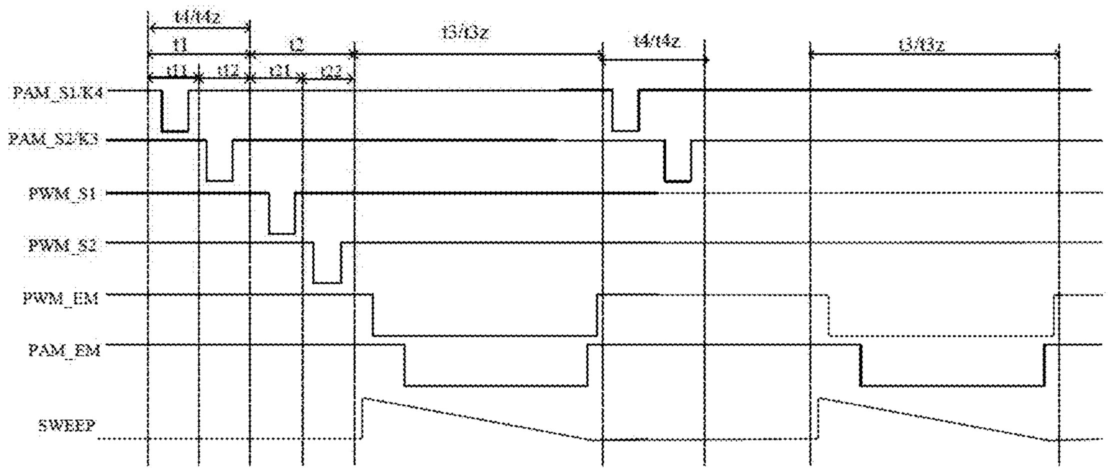
FIG. 41 is a signal timing diagram according to another embodiment of the present disclosure.

FIG. 41 is a signal timing diagram according to another embodiment of the present disclosure, which can be used to drive the pixel circuit shown in FIG. 38. In some embodiments of the present disclosure, referring to FIG. 38, the fourth transistor T4 and the third transistor T3 are connected in parallel, the gate of the fourth transistor T4 receives the fourth control signal K4, and the gate of the third transistor T3 receives the third control signal K3. The third control signal K3 is the same as the second scan signal PAM-S2, and the fourth control signal K4 is the same as the first scan signal PAM-S1. Referring to FIG. 38 and FIG. 41, the reset sub-stage t4*z* includes the gate reset stage t11 and the data writing stage t12 in which the second driving circuit 20 operates and that are set sequentially. In the gate reset stage t11, the first scan signal PAM-S1 is at an enable level to control the second gate reset transistor M8 and the fourth transistor T4 to be separately turned on. In the data writing stage t12, the second scan signal PAM-S2 is at an enable level to control the second data writing transistor M9 and the third transistor T3 to be separately turned on. In this way, the fourth transistor T4 and the third transistor T3 can share an original scan signal, thereby simplifying wiring in the display panel.

In application to the display panel, the first scan signal line and the second scan signal line are disposed in the display panel. The first scan signal line provides the first scan signal PAM-S1, and the second scan signal line provides the second scan signal PAM-S2. The first scan signal line and the second scan signal line are separately connected to cascaded two-stage shift registers in a third scan driving circuit.

Figure 42:
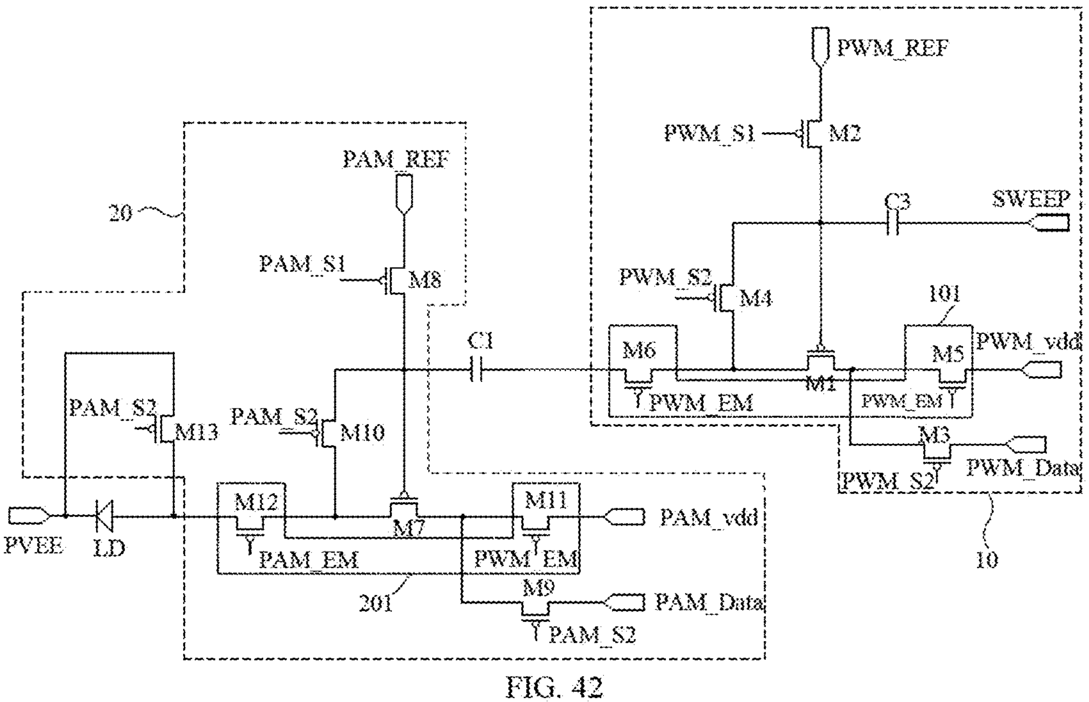
FIG. 42 is a schematic diagram of a pixel circuit according to another embodiment of the present disclosure.

FIG. 42 is a schematic diagram of a pixel circuit according to another embodiment of the present disclosure. In some embodiments of the present disclosure, as shown in FIG. 42, the first control transistor M6 in the first driving circuit 10 is connected between the second driving transistor M1 and the first capacitor C1. The gate of the first control transistor M6 receives the first light-emitting control signal PWM-EM. The second control transistor M11 in the second driving circuit is connected between the first power voltage line PAM-vdd and the first driving transistor M7, and the fourth control transistor M12 is connected between the first driving transistor M7 and the light-emitting element LD. The gate of the second control transistor M11 receives the first light-emitting control signal PWM-EM, and the gate of the fourth control transistor M12 receives the second light-emitting control signal PAM-EM. In the pixel circuit, because the fourth control transistor M12 is connected to the light-emitting element LD, load on a light-emitting control signal line connected to the gate of the fourth control transistor M12 is relatively heavy. In some embodiments of the present disclosure, the first light-emitting control signal PWM-EM that drives the first driving circuit 10 is introduced into the second driving circuit 20, and the gate of the second control transistor M11 receives the first light-emitting control signal PWM-EM, so that the load on the light-emitting control signal line connected to the gate of the fourth control transistor M12 can be reduced, thereby improving display uniformity.

In some embodiments of the present disclosure, the pixel circuit includes a first pixel circuit and a second pixel circuit, and the light-emitting element includes a first light-emitting element and a second light-emitting element that have different emitted light colors. The first pixel circuit is coupled to the first light-emitting element, and the second pixel circuit is coupled to the second light-emitting element. A voltage value of the second data signal received by the first pixel circuit is different from a voltage value of the second data signal received by the second pixel circuit. In some embodiments of the present disclosure, voltage values of second data signals may be set differently according to a difference between light-emitting efficiency of light-emitting elements of different colors. This setting can improve the problem of display color deviation.

In some embodiments of the present disclosure, voltage values of second data signals written into pixel circuits are equal when different grayscales are displayed by light-emitting elements of a same color. In some embodiments of the present disclosure, a grayscale displayed by a light-emitting element is controlled by controlling a flowing period of a driving current.

In some embodiments of the present disclosure, voltage values of second data signals received by pixel circuits coupled to light-emitting elements of different colors during operating are equal. In some embodiments of the present disclosure, a grayscale displayed by a light-emitting element is controlled by controlling a flowing period of a driving current, and a difference between light-emitting efficiency of different light-emitting elements is compensated.

Figure 43:
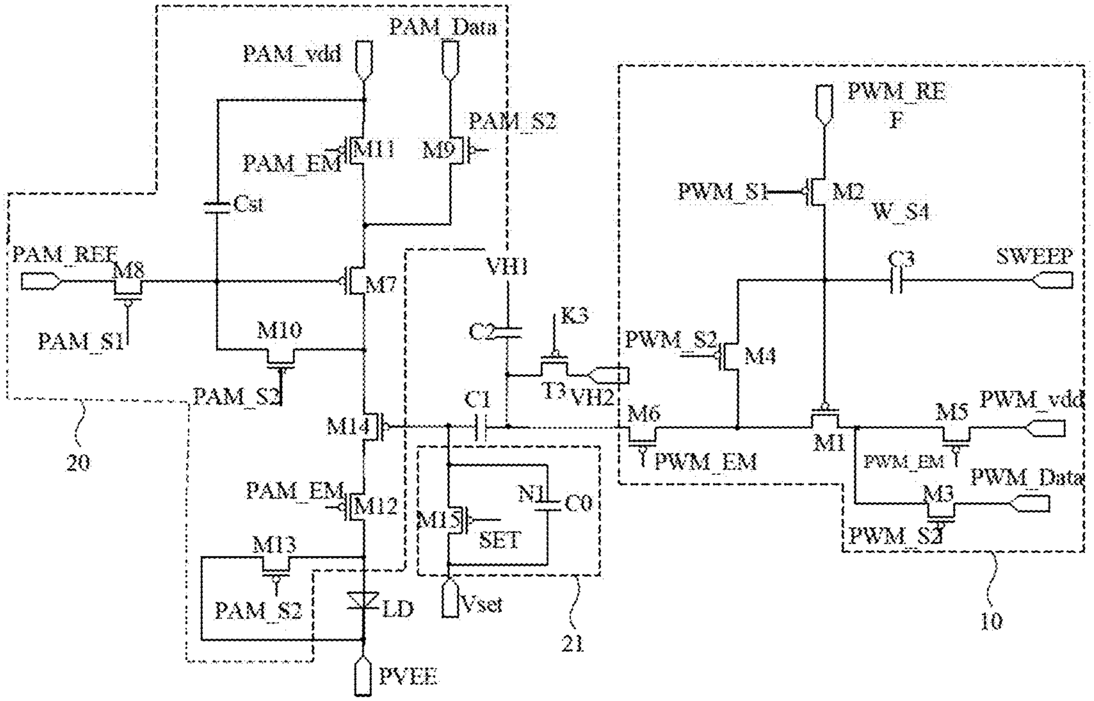
FIG. 43 is a schematic diagram of a pixel circuit according to another embodiment of the present disclosure.

FIG. 43 is a schematic diagram of a pixel circuit according to another embodiment of the present disclosure. Referring to the embodiment of FIG. 9, based on the pixel circuit provided in the embodiment of FIG. 9, the second capacitor C2 and the third transistor T3 are further disposed in the embodiment of FIG. 43. For separate functions and operating periods of the second capacitor C2 and the third transistor T3, refer to the description of the foregoing related embodiment. Details are not described herein again.

It should be noted that the transistor in this embodiment of the present disclosure may be an N-type transistor or a P-type transistor. For an N-type transistor, an enable level is a high level, and a disable level is a low level. That is, when a gate potential of the N-type transistor is at a high level, a first electrode and a second electrode of the N-type transistor are turned on, and when the gate potential of the N-type transistor is at a low level, the first electrode and the second electrode of the N-type transistor are turned off. For a P-type transistor, an enable level is a low level, and a disable level is a high level. That is, when a gate potential of the P-type transistor is at a low level, a first electrode and a second electrode of the P-type transistor are turned on, and when the gate potential of the P-type transistor is at a high level, the first electrode and the second electrode of the P-type transistor are turned on. In some embodiments of the present disclosure, a gate of each of the foregoing transistors is used as a control electrode. In addition, according to a signal and a type of a gate of each transistor, a first electrode of the transistor may be used as a source and a second electrode of the transistor is used as a drain, or a first electrode of the transistor is used as a drain and a second electrode of the transistor is used as a source, which are not distinguished herein. A source and a drain of a transistor may be sometimes used interchangeably, and a source and a drain of a transistor may be sometimes collectively referred to as a source drain. In some embodiments of the present disclosure, an enable level is a general term, and an enable level is any level at which a transistor can be turned on.

Figure 44:
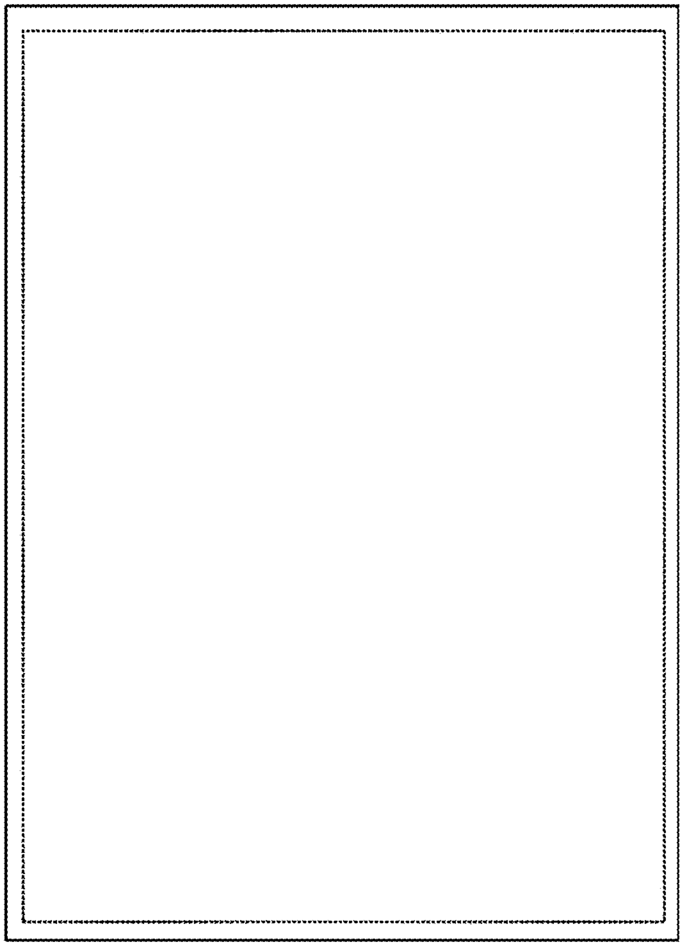
FIG. 44 is a schematic diagram of a display panel according to an embodiment of the present disclosure.

Based on a same inventive concept, the present disclosure further provides a display panel. FIG. 44 is a schematic diagram of a display panel according to an embodiment of the present disclosure. The display panel includes a plurality of pixel circuits, and the pixel circuit is a pixel circuit illustrated in any of the foregoing embodiments. A structure of the pixel circuit has been described in the foregoing embodiments, and details are not described herein again.

Based on a same inventive concept, the present disclosure further provides a display apparatus, and the display apparatus includes a display panel provided in any embodiment of the present disclosure. The display apparatus may be, for example, an electronic device that has a display function, such as a mobile phone, a tablet, a computer, a television, in-vehicle display, or a smart watch.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A pixel circuit, comprising: a first driving circuit, a second driving circuit, and a first capacitor, wherein the first capacitor comprises a first plate electrically connected to an output terminal of the first driving circuit and a second plate electrically connected to the second driving circuit;

wherein the first driving circuit is configured to generate a control current based on a first data signal, and the second driving circuit is configured to generate a driving current based on a second data signal and control a flowing period of the driving current based on the control current;

wherein a light-emitting element is electrically connected to the second driving circuit to receive the driving current;

wherein the first plate of the first capacitor and the output terminal of the first driving circuit are electrically connected to a first node;

the pixel circuit further comprises a second capacitor electrically connected to the first node;

the second driving circuit comprises a first driving transistor, wherein the first driving transistor is configured to generate the driving current under control of a gate voltage of the first driving transistor, and a first terminal of the first driving transistor receives a first power voltage provided by a first power voltage line;

the pixel circuit further comprises a compensation module, wherein the second capacitor comprises a first plate electrically connected to the first node and a second plate electrically connected to the compensation module; and the compensation module is configured to write a reference voltage into the second plate of the second capacitor in a first period in which the second driving circuit operates, and write the first power voltage into the second plate of the second capacitor in a second period in which the second driving circuit operates, wherein the first period and the second period do not overlap in an operating cycle of the pixel circuit.

2. The pixel circuit according to claim 1, wherein the second driving circuit comprises a first driving transistor configured to generate the driving current under control of a gate voltage of the first driving transistor; and the second plate of the first capacitor is electrically connected to a gate of the first driving transistor.

3. The pixel circuit according to claim 1, wherein a voltage value of the reference voltage is greater than or equal to a voltage value of the first power voltage.

4. The pixel circuit according to claim 1, wherein the first driving circuit comprises a second driving transistor and a third control transistor, wherein the third control transistor is connected between a second power voltage line and the second driving transistor; and wherein a second power voltage provided by the second power voltage line is reused as the reference voltage.

5. The pixel circuit according to claim 1, wherein the compensation module comprises a first transistor and a second transistor, wherein the first transistor comprises a gate connected to a first control signal line, a first electrode configured to receive the reference voltage, and a second electrode connected to the second plate of the second capacitor, wherein the first control signal line provides a first control signal; and the second transistor comprises a gate connected to a second control signal line, a first electrode connected to the first power voltage line, and a second electrode connected to the second plate of the second capacitor, wherein the second control signal line provides a second control signal.

6. The pixel circuit according to claim 5, wherein the first control signal and the second control signal are mutually phase-inverted signals.

7. The pixel circuit according to claim 5, wherein the first driving circuit comprises a second driving transistor and a first light-emitting control module, wherein the second driving transistor is configured to generate the control current under control of a gate voltage of the second driving transistor, the first light-emitting control module is connected in series with the second driving transistor, and a control terminal of the first light-emitting control module receives a first light-emitting control signal; and the second driving circuit comprises a second light-emitting control module, wherein the second light-emitting control module is connected in series with the first driving transistor, and a control terminal of the second light-emitting control module receives a second light-emitting control signal, wherein the second control signal is reused as the first light-emitting control signal, or the second control signal is reused as the second light-emitting control signal.

8. The pixel circuit according to claim 5, wherein the first driving circuit comprises a second driving transistor, a first control transistor, and a third control transistor, wherein the second driving transistor is connected between the first control transistor and the third control transistor, and a gate of the first control transistor receives the second control signal and/or a gate of the third control transistor receives the second control signal.

9. A display panel, comprising a pixel circuit, wherein the pixel circuit comprises: a first driving circuit, a second driving circuit, and a first capacitor, wherein the first capacitor comprises a first plate electrically connected to an output terminal of the first driving circuit and a second plate electrically connected to the second driving circuit;

wherein the first driving circuit is configured to generate a control current based on a first data signal, and the second driving circuit is configured to generate a driving current based on a second data signal and control a flowing period of the driving current based on the control current;

wherein a light-emitting element is electrically connected to the second driving circuit to receive the driving current;

wherein the first plate of the first capacitor and the output terminal of the first driving circuit are electrically connected to a first node;

the pixel circuit further comprises a second capacitor electrically connected to the first node;

the second driving circuit comprises a first driving transistor, wherein the first driving transistor is configured to generate the driving current under control of a gate voltage of the first driving transistor, and a first terminal of the first driving transistor receives a first power voltage provided by a first power voltage line;

the pixel circuit further comprises a compensation module, wherein the second capacitor comprises a first plate electrically connected to the first node and a second plate electrically connected to the compensation module; and the compensation module is configured to write a reference voltage into the second plate of the second capacitor in a first period in which the second driving circuit operates, and write the first power voltage into the second plate of the second capacitor in a second period in which the second driving circuit operates, wherein the first period and the second period do not overlap in an operating cycle of the pixel circuit.

10. A display apparatus, comprising a display panel, wherein the display panel comprises a pixel circuit, wherein the pixel circuit comprises: a first driving circuit, a second driving circuit, and a first capacitor, wherein the first capacitor comprises a first plate electrically connected to an output terminal of the first driving circuit and a second plate electrically connected to the second driving circuit;

wherein the first driving circuit is configured to generate a control current based on a first data signal, and the second driving circuit is configured to generate a driving current based on a second data signal and control a flowing period of the driving current based on the control current;

wherein a light-emitting element is electrically connected to the second driving circuit to receive the driving current;

wherein the first plate of the first capacitor and the output terminal of the first driving circuit are electrically connected to a first node;

the pixel circuit further comprises a second capacitor electrically connected to the first node;

the second driving circuit comprises a first driving transistor, wherein the first driving transistor is configured to generate the driving current under control of a gate voltage of the first driving transistor, and a first terminal of the first driving transistor receives a first power voltage provided by a first power voltage line;

the pixel circuit further comprises a compensation module, wherein the second capacitor comprises a first plate electrically connected to the first node and a second plate electrically connected to the compensation module; and the compensation module is configured to write a reference voltage into the second plate of the second capacitor in a first period in which the second driving circuit operates, and write the first power voltage into the second plate of the second capacitor in a second period in which the second driving circuit operates, wherein the first period and the second period do not overlap in an operating cycle of the pixel circuit.

* * * * *